(12) United States Patent
Budagavi et al.

(10) Patent No.: US 10,535,161 B2
(45) Date of Patent: Jan. 14, 2020

(54) POINT CLOUD COMPRESSION USING NON-ORTHOGONAL PROJECTION

(71) Applicant: Samsung Electronics Co., Ltd., Suwon-si, Gyeonggi-do (KR)

(72) Inventors: Madhukar Budagavi, Plano, TX (US); Esmaeil Faramarzi, Richardson, TX (US); Rajan Joshi, San Diego, CA (US); Hossein Najaf-Zadeh, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/182,465

(22) Filed: Nov. 6, 2018

(65) Prior Publication Data

US 2019/0139266 A1    May 9, 2019

Related U.S. Application Data

(60) Provisional application No. 62/583,795, filed on Nov. 9, 2017, provisional application No. 62/618,226, filed on Jan. 17, 2018, provisional application No. 62/653,248, filed on Apr. 5, 2018, provisional application No. 62/653,918, filed on Apr. 6, 2018, provisional application No. 62/656,182, filed on Apr. 11, 2018, provisional application No. 62/656,171, filed on Apr. 11, 2018, provisional application No. 62/688,173, filed on Jun. 21, 2018, provisional
(Continued)

(51) Int. Cl.
*G06T 9/00* (2006.01)
*G06T 17/20* (2006.01)

(52) U.S. Cl.
CPC .............. *G06T 9/001* (2013.01); *G06T 17/20* (2013.01)

(58) Field of Classification Search
CPC ................................ G06T 9/001; G06T 17/20
See application file for complete search history.

(56) References Cited

U.S. PATENT DOCUMENTS

| | | | |
|---|---|---|---|
| 2016/0047903 A1* | 2/2016 | Dussan | G01S 17/87 |
| | | | 356/5.01 |
| 2016/0086353 A1 | 3/2016 | Lukac et al. | |
| 2017/0347100 A1* | 11/2017 | Chou | G06T 9/001 |

OTHER PUBLICATIONS

Faramarzi et al., "CE2.10 on PCC Metadata", ISO/IEC JTC1/SC29/WG11 MPEG2018/m43720, Jul. 2018, 5 pages.
(Continued)

*Primary Examiner* — Ke Xiao
*Assistant Examiner* — Jed-Justin Imperial

(57) ABSTRACT

A decoding device, an encoding device and a method for point cloud decoding is disclosed. The method includes receiving a compressed bitstream. The method also includes decoding the compressed bitstream into 2-D frames that represent a 3-D point cloud. Each of the 2-D frames including a set of patches, and each patch includes a cluster of points of the 3-D point cloud. The cluster of points corresponds to an attribute associated with the 3-D point cloud. One patch of the set of patches, the set of patches, and the 2-D frames correspond to respective access levels representing the 3-D point cloud. The method also includes identifying a first and a second flag. In response to identifying the first and the second flag, the method includes reading the metadata from the bitstream. The method further includes generating, based on metadata and using the sets of 2-D frames, the 3-D point cloud.

20 Claims, 15 Drawing Sheets

Related U.S. Application Data application No. 62/688,835, filed on Jun. 22, 2018, provisional application No. 62/697,842, filed on Jul. 13, 2018, provisional application No. 62/711,955, filed on Jul. 30, 2018.

(56) References Cited

OTHER PUBLICATIONS

Mammou et al. (Eds.), "Second Working draft for Video-based Point Cloud Coding", ISO/IEC JTC1/SC29/WG11 MPEG 2018/N17771, Jul. 2018, 45 pages.

ISA/KR, "International Search Report and Written Opinion of the International Searching Authority," International Application No. PCT/KR2018/013668, dated Feb. 20, 2019, 8 pages.

Houshiar, Hamidreza, et al., "3D Point Cloud Compression using Conventional Image Compression for Efficient Data Transmission," 2015 XXV International Conference on Information, Communication and Automation Technologies (ICAT), Oct. 2015, 8 pages.

Kammerl, Julius, et al., "Real-time Compression of Point Cloud Streams," 2012 IEEE International Conference on Robotics and Automation, RiverCentre, Saint Paul, Minnesota, USA, May 14-18, 2012, 10 pages.

Shishir, Subramanyam, "Inter frame compression of 3D dynamic point clouds," Student theses, Delft University of Technology, Nov. 2, 2017, 77 pages.

Jirka, Simon, et al, Testbed-12 LiDAR Streaming Engineering Report, OGC Engineering Report, Oct. 5, 2016, 38 pages.

\* cited by examiner

POINT CLOUD COMPRESSION USING NON-ORTHOGONAL PROJECTION

CROSS-REFERENCE TO RELATED APPLICATION AND CLAIM OF PRIORITY

This application claims priority under 35 U.S.C. § 119(e) to (i) U.S. Provisional Patent Application No. 62/583,795 filed on Nov. 9, 2017, (ii) U.S. Provisional Patent Application No. 62/618,226 filed on Jan. 17, 2018, (iii) U.S. Provisional Patent Application No. 62/653,248 filed on Apr. 5, 2018, (iv) U.S. Provisional Patent Application No. 62/653,918 filed on Apr. 6, 2018, (v) U.S. Provisional Patent Application No. 62/656,171 filed on Apr. 11, 2018, (vi) U.S. Provisional Patent Application No. 62/656,182 filed on Apr. 11, 2018, (vii) U.S. Provisional Patent Application No. 62/688,173 filed on Jun. 21, 2018, (viii) U.S. Provisional Patent Application No. 62/688,835 filed on Jun. 22, 2018, (ix) U.S. Provisional Patent Application No. 62/697,842 filed on Jul. 13, 2018, and (x) U.S. Provisional Patent Application No. 62/711,955 filed on Jul. 30, 2018. The above-identified provisional patent application is hereby incorporated by reference in its entirety.

TECHNICAL FIELD

This disclosure relates generally to compression and coding of multimedia data. More specifically, this disclosure relates to an apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors track head movement in real-time to determine the region of the 360° video that the user wants to view. 360° video provides a three Degrees of Freedom (3DoF) immersive experience. Six Degrees of Freedom (6DoF) is the next level of immersive experience where in the user can turn his head as well as move around in a virtual/augmented environment. Multimedia data that is three-dimensional (3-D) in nature, such as point clouds, is needed to provide 6DoF experience.

Point clouds and meshes are a set of 3-D points that represent a model of a surface of an object or a scene. Point clouds are common in a variety of applications such as gaming, 3-D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission. Compression hardware and processes of point clouds are different than traditional compression hardware and processes for traditional two-dimensional (2-D) multimedia.

SUMMARY

This disclosure provides point cloud compression using non-orthogonal projection.

In a first embodiment, a decoding device for point cloud decoding is provided. The decoding device includes a communication interface and a processor that is operably coupled to the communication interface. The communication interface is configured to receive a compressed bitstream. The processor is configured to decode the compressed bitstream into 2-D frames that represent a 3-D point cloud. Each of the 2-D frames includes a set of patches and each patch of the set of patches includes a cluster of points of the 3-D point cloud. The cluster of points corresponds to an attribute associated with the 3-D point cloud. One patch of the set of patches, the set of patches, and the 2-D frames correspond to respective access levels that represent the 3-D point cloud. The processor is also configured to identify whether a first flag, that signals when modification of metadata applied to a first access level of the respective access levels is enabled, is included in the compressed bitstream and set to true. The processor is further configured identify whether a second flag, indicating a presence of the metadata associated with modification of the first access level of the respective access levels, is included in the compressed bitstream and set to true. In response to identifying the first flag and the second flag, are included in the compressed bitstream and set to true, the processor is configured to read the metadata from the compressed bitstream. In response to identifying at least one of the first flag or the second flag, are either not included in the compressed bitstream or set to false, the processor is configured to assign a predetermined parameter to the metadata. The processor is additionally configured to generate, based on the metadata and using the sets of 2-D frames and the metadata, the 3-D point cloud.

In another embodiment an encoding device for point cloud encoding is provided. The encoding device includes a processor and a communication interface operably coupled to the processor. The processor is configured to generate 2-D frames that represent a 3-D point cloud. Each of the 2-D frames includes a set of patches and each patch of the set of patches includes a cluster of points of the 3-D point cloud. The cluster of points corresponds to an attribute associated with the 3-D point cloud. One patch of the set of patches, the set of patches, and the 2-D frames correspond to respective access levels that represent the 3-D point cloud. The processor is also configured to generate metadata indicating modification of one of the respective access levels. The processor is further configured to generate a first flag that signals when modification of the metadata applied to a first access level of the respective access levels is enabled and generate a second flag indicating a presence of the metadata associated with modification of the first access level of the respective access levels. The processor is additionally configured to encode the 2-D frames, the first flag, the second flag, and the metadata to generate a compressed bitstream. The communication interface is configured to transmit the compressed bitstream.

In yet another embodiment a method for decoding is provided. The method includes receiving a compressed bitstream. The method also includes decoding the compressed bitstream into 2-D frames that represent a 3-D point cloud. Each of the 2-D frames includes a set of patches and each patch of the set of patches includes a cluster of points of the 3-D point cloud. The cluster of points corresponds to an attribute associated with the 3-D point cloud. One patch of the set of patches, the set of patches, and the 2-D frames correspond to respective access levels that represent the 3-D point cloud. The method includes identifying whether a first flag, that signals when modification of metadata applied to a first access level of the respective access levels is enabled, is included in the compressed bitstream and set to true. The method also includes identifying whether a second flag, indicating presence of the metadata associated with modification of the first access level of the respective access levels, is included in the compressed bitstream and set to true. In response to identifying the first flag and the second flag are included in the compressed bitstream and set to true, the method includes reading the metadata from the compressed bitstream. In response to identifying at least one of the first flag or the second flag, are either not included in the compressed bitstream or set to false, the method includes assigning a predetermined parameter to the metadata. The method also includes generating, based on the metadata and using the sets of 2-D frames and the metadata, the 3-D point cloud.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
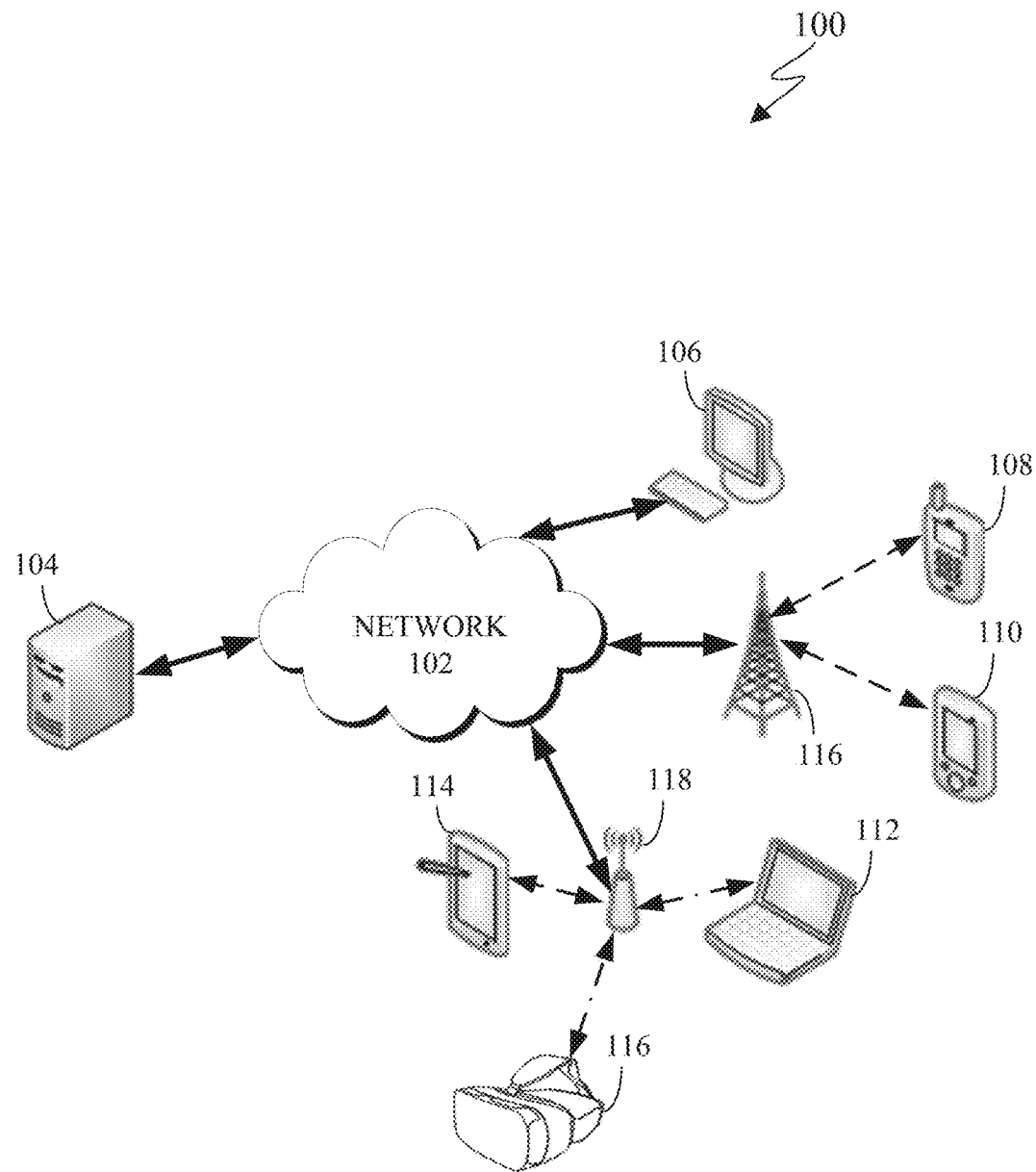
FIG. 1 illustrates an example communication system in accordance with embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual scene. In certain embodiments, VR is a rendered version of both a visual and an audio scene. The rendering is designed to mimic the visual stimuli, and if available audio sensory stimuli, of the real world as naturally as possible to an observer or user as the individual moves within the limits defined by the application or the VR scene. For example, VR places a user into immersive worlds that interact with their head movements. At the video level, VR is achieved by providing a video experience that covers as much of the field of view (FOV) as possible together with the synchronization of the viewing angle of the rendered video with the head movements. Although many different types of devices are able to provide such an experience, head-mounted displays (HMD) are popular devices that enable a user to view the VR scene and adjust the displayed content based on movements of the head of the user. Typically, HMDs rely either on dedicated a screens integrated into the device and running with external computers (tethered) or on a device, such as a smartphone, that is inserted into the HMD (untethered). The first approach utilizes lightweight screens and benefiting from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a 3-D representation of an object that is similar to an object in a VR environment. Similarly, a point mesh is a 3-D representation of an object that is similar to an object in a VR environment. A point cloud or a point mesh can include a scene, such as a surface of objects in an environment.

Generally, a point cloud is a collection of data points defined by a coordinate system. For example, in a 3-D Cartesian Coordinate System, each point of a point cloud is identified by three coordinates, that of X, Y, and Z. When each point is identified by the three coordinates, a precise location in 3-D environment or space is identified, relative to an origin point. The origin point is a location where the X, Y, and Z axes intersect. The points of a point cloud often represent the external surface of the object. Each point of a point cloud is defined by attributes such as a geometric position of each point within the three coordinates and a texture such as color, intensity, normal, reflectance, and the like.

Similarly, a 3-D mesh is a 3-D representation of an object that is similar to a point cloud. A 3-D mesh illustrates the external structure of an object that is built out of polygons. For example, a 3-D mesh is a collection of vertices, edges, and faces that define the shape of an object. For another example, a mesh (or a point cloud) can be rendered on spherical coordinate system. In certain embodiments, each point can be located in the X, Y, Z coordinates that are within a sphere. Similarly, texture coordinates U and V indicate a location of texture of the image. When the object is rendered, the vertices of the mesh, the corresponding texture coordinate, and the texture image are inputted into a graphical processing unit which maps the mesh onto the 3-D geometry. The user can have a FOV that is positioned at the center of the virtual sphere and sees a portion of the 360° scene corresponding to the viewport. In certain embodiments, alternative shapes can be used instead of a sphere such as a cube, an icosahedron, an octahedron, and the like. Point clouds and meshes are illustrated and discussed in greater detail below with reference to FIG. 4.

Point clouds and meshes are commonly used in a variety of applications, including gaming, 3-D mapping, visualization, medicine, augmented reality, VR, autonomous driving, multi-view replay, 6 degrees of freedom immersive media, to name a few. As used hereinafter, the term 'point cloud' also refers to a '3-D point cloud,' and a '3-D mesh'.

Transmitting a point cloud, from one electronic device to another often requires significant bandwidth due to the size and complexity of the data associated with a single point cloud. The transmission of a point cloud often requires specific compression techniques to reduce the size of the data prior to transmission. For example, compressing a point cloud can require dedicated hardware or specific compression algorithms or a combination thereof. Generally, compression algorithms for a point cloud are different from compression algorithms of other multimedia forms, such as images and video, VR, and the like.

As discussed above, a point cloud is a collection of points with attributes, and each attribute requires a certain number of bits. For example, for a point cloud with ten-bit geometry data, thirty bits per point can be used for geometric coordinates (such as an X, Y, and Z coordinate), such that each coordinate is ten bits. Similarly, for a point cloud with eight-bit color data, twenty-four bits per point can be used for a color coordinate (such as red, green, blue (RGB)), such that each coordinate is eight bits color coordinate. Therefore a single point with a ten-bit geometric attribute and an eight-bit color attribute uses fifty-four bits. If a frame includes one million points, the number of bits per frame is fifty-four million bits (fifty-four bits per point times one million points per frame). There are thirty frames per second for each object. Under scenario of no compression, 1.62 gigabytes per second (fifty-four million bits per frame times 30 frames per second) are used to transmit a point cloud, from one electronic device to another. Therefore, significant compression is needed to transmit a point cloud, from one electronic device to another.

Embodiments of the present disclosure take into consideration that due to the size constraints of bandwidth, compressing point clouds is necessary to expedite and improve transmission of a point cloud from a source device to another device (such as a user equipment). That is, an uncompressed point cloud uses significant bandwidth for transmission and causes the rendering of the point cloud to be delayed. Certain dedicated hardware components can be used to meet the real-time demands or reduce delays or lags in the rendering of the point cloud. Such hardware components are often expensive. According to embodiments of the present disclosure, compressing the point cloud using a codec decreases the bandwidth for transmission as well as certain types of hardware. For example, a video codec such as HEVC, AVC, VP9, VP8, JVNET, and the like can be used to compress a point cloud, when the point cloud is manipulated to fit a 2-D frame. For example, the point cloud is manipulated from its original 3-D shape to multiple patches that represent the point cloud in 2-D.

Therefore, embodiments of the present disclosure provide systems and methods for manipulating a 3-D object such as a point cloud. Manipulating the 3-D object includes projecting the 3-D object onto a 2-D frame, such that the frame can be compressed, transmitted to a display device, and the content within the 2-D frame can be reconstructed into the 3-D object and finally rendered such that the 3-D object can be viewed by a user. Various 2-D compression hardware and software components can compress the 3-D point cloud after the point cloud is projected onto multiple 2-D video frames. When the point cloud is deconstructed to fit on multiple 2-D frames, the frames can be transmitted using less bandwidth than transmitting the original point cloud.

A 3-D object can be manipulated by an encoder, transmitted to a decoder, which reconstructs the 3-D object to be viewed by a user. The encoder projects the 3-D object onto one or more 2-D frames, compresses the frames, and generates and transmits a compressed bitstream including the compressed frames. The decoder, receives the bitstream, decompresses the frames, reconstructs, and renders the 3-D object so a user can view the displayed object.

According to embodiments of the present disclosure, architecture for carrying out a point cloud compression using a video codec is provided. Embodiments of the present disclosure provide architecture for point cloud compression using a video codec. A point cloud can be deconstructed, and multiple 2-D frames are generated that include regular patches of the geometry of each point of the point cloud, as well as various attributes or textures of the point cloud. For example, the point cloud can be deconstructed and mapped onto a 2-D frame. The 2-D frame can be compressed using various video or image or both compression.

Embodiments of the present disclosure include methods and systems for manipulating a point cloud. For example, embodiments of the present disclosure include manipulating a sparse point cloud, scaling the point cloud, region of interest (ROI) identification of a point cloud, as well as adaptive point size rendering of the point cloud. Embodiments of the present disclosure include methods and systems for point cloud compression using a non-orthogonal projection. Additionally, embodiments of the present disclosure include metadata that supports the functionalities including the scale, offset, rotation, point size, and point shape.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-116. The client devices 106-116 may be, for example, a smartphone, a tablet computer, a laptop, a personal computer, a wearable device, or a head-mounted display (HMD). The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102. As described in more detail below, the server 104 can transmit a point cloud to one or more display devices, such as a client device 106-116. In certain embodiments, each server 104 can include an encoder.

Each client device 106-116 represents any suitable computing or processing device that interacts with at least one server or other computing device(s) over the network 102. In this example, the client devices 106-116 include a desktop computer 106, a mobile telephone or mobile device 108 (such as a smartphone), a personal digital assistant (PDA) 110, a laptop computer 112, a tablet computer 114, and a HMD 116. However, any other or additional client devices could be used in the system 100. In certain embodiments, each client device 106-116 can include a decoder.

In this example, some client devices 108-116 communicate indirectly with the network 102. For example, the client devices 108 and 110 (mobile devices 108 and PDA 110, respectively) communicate via one or more base stations 118, such as cellular base stations or eNodeBs (eNBs). Mobile device 108 includes smartphones. Also, the client devices 112, 114, and 116 (laptop computer, tablet computer, and HMD, respectively) communicate via one or more wireless access points 120, such as IEEE 802.11 wireless access points. As described in more detail below the HMD 116 can display 360° scenes including one or more point clouds. Note that these are for illustration only and that each client device 106-116 could communicate directly with the network 102 or indirectly with the network 102 via any suitable intermediate device(s) or network(s). In certain embodiments, server 104 or any client device 106-114 can be used to compress a point cloud and transmit the data to another client device such as any client device 106-116.

In certain embodiments, the mobile device 108 (or any other client device 106 116) can transmit information securely and efficiently to another device, such as, for example, the server 104. The mobile device 108 (or any other client device 106-116) can function as a VR display when attached to a headset via brackets, and function similar to HMD 116. The mobile device 108 (or any other client device 106-116) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device 106-116 or the server 104 to compress, transmit, receive, render a point cloud, or a combination thereof. For example, the server 104 can then compress and transmit the point cloud data to client devices 106-116. For another example, any client device 106-116 can compress and transmit point cloud data to any client devices 106-116 or to the server 104.

Figure 2:
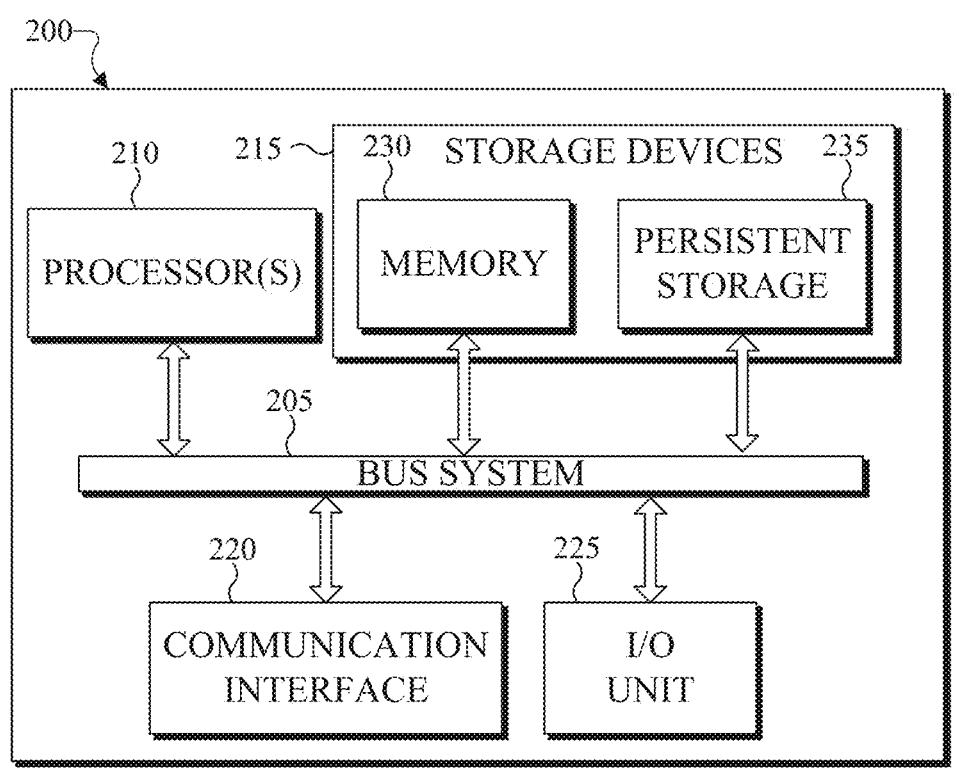
FIG. 2 illustrates an example electronic device in accordance with an embodiment of this disclosure.
Figure 3:
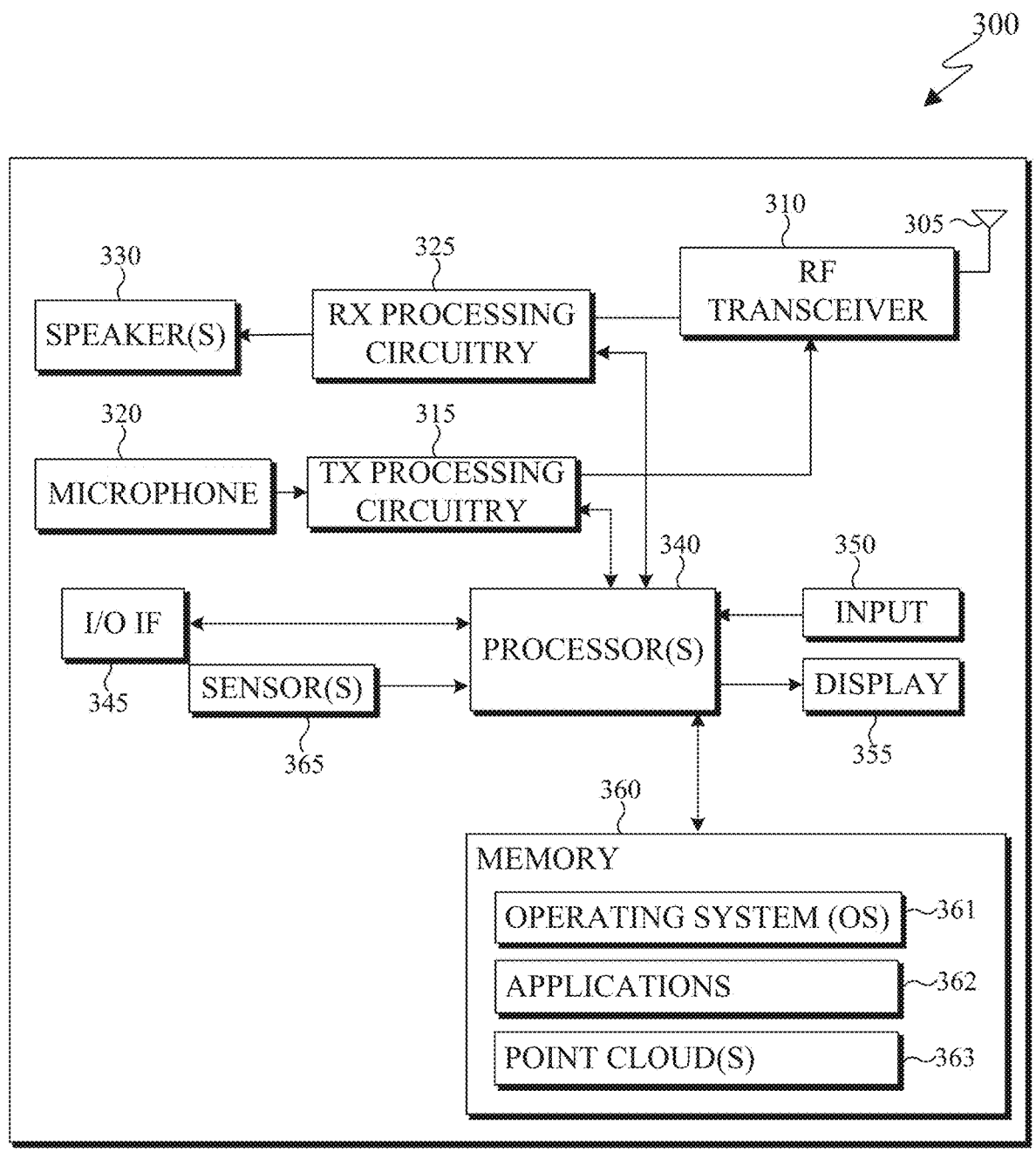
FIG. 3 illustrates an example electronic device in accordance with an embodiment of this disclosure.

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 of FIG. 1, and the electronic device 300 could represent one or more of the client devices 106-116 of FIG. 1.

Server 200 can represent one or more local servers, one or more compression servers, or one or more encoding servers. As shown in FIG. 2, the server 200 includes a bus system 205 that supports communication between at least one processor(s) 210, at least one storage device(s) 215, at least one communications interface 220, and at least one input/output (I/O) unit 225. In certain embodiments, the server 200 is an encoder.

The processor 210 executes instructions that can be stored in a memory 230. The instructions stored in memory 230 can include instructions for decomposing a point cloud, compressing a point cloud. The instructions stored in memory 230 can also include instructions for encoding a point cloud in order to generate a bitstream. The instructions stored in memory 230 can also include instructions for rendering the point cloud on an omnidirectional 360° scene, as viewed through a VR headset, such as HMD 116 of FIG. 1. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready-only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, motion sensors, or any other suitable input device. The I/O unit 225 can also send output to a display, printer, or any other suitable output device.

In certain embodiments, server 200 implements the compression of a point cloud, as will be discussed in greater detail below. In certain embodiments, server 200 generates multiple 2-D frames that correspond to the three dimensions of the point cloud. In certain embodiments, server 200 maps the three dimensions of a point cloud into 2-D. In certain embodiments, server 200 generates a compressed bitstream by encoding the compressed two-dimensional frames that represent the point cloud.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only, and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the client devices 106-116 of FIG. 1 can include the same or similar configuration as electronic device 300. In certain embodiments, electronic device 300 is an encoder, a decoder, or both.

In certain embodiments, electronic device 300 is usable with data transfer, image or video compression, image or video decompression, encoding, decoding, and media rendering applications. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114 of FIG. 1), a head-mounted display (similar to HMD 116 of FIG. 1), and the like.

As shown in FIG. 3, the electronic device 300 includes an antenna 305, a radio-frequency (RF) transceiver 310, a transmit (TX) processing circuitry 315, a microphone 320, and a receive (RX) processing circuitry 325. The electronic device 300 also includes a speaker 330, a one or more processors 340, an input/output (I/O) interface (IF) 345, an input 350, a display 355, and a memory 360. The memory 360 includes an operating system (OS) 361, one or more applications 362, and point clouds 363.

The RF transceiver 310 receives, from the antenna 305, an incoming RF signal transmitted by another component on a system. For example, the RF transceiver 310 receives RF signal transmitted by a BLUETOOTH or WI-FI signal from an access point (such as a base station, WI-FI router, BLUETOOTH device) of the network 102 (such as a WI-FI, BLUETOOTH, cellular, 5G, LTE, LTE-A, WiMAX, or any other type of wireless network). The RF transceiver 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 is also capable of executing other applications 362 resident in the memory 360, such as decompressing and generating a received point cloud.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute the plurality of applications 362 based on the OS 361 or in response to signals received from eNBs (similar to the base stations 118 of FIG. 1) or an operator. The processor 340 is also coupled to the I/O IF 345 that provides the electronic device 300 with the ability to connect to other devices, such as client devices 106-116. The I/O IF 345 is the communication path between these accessories and the processor 340.

The processor 340 is also coupled to the input 350. The operator of the electronic device 300 can use the input 350 to enter data or inputs into the electronic device 300. Input 350 can be a keyboard, touch screen, mouse, track-ball, voice input, or any other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. For example, in the capacitive scheme, the input 350 can recognize touch or proximity. The input 350 can also include a control circuit. Input 350 can be associated with sensor(s) 365 and/or a camera by providing additional input to processor 340. As discussed in greater detail below, sensor 365 includes inertial sensors (such as accelerometers, gyroscope, and magnetometer), optical sensors, motion sensors, cameras, pressure sensors, heart rate sensors, altimeter, and the like. For example, input 350 can utilize motion as detected by a motion sensor, associated with sensor 365, as an input.

The processor 340 is also coupled to the display 355. The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. Display 355 can be sized to fit within a HMD. Display 355 can be a singular display screen or multiple display screens capable of creating a stereoscopic display. In certain embodiments, display 355 is a heads-up display (HUD).

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. The point clouds 363 can include various 3-D point clouds, 3-D meshes, 3-D objects, and the like. In certain embodiments, the point clouds 363 can include projections of patches of a 3-D object on one or more 2-D frames. The point clouds 363 can also include one or more 3-D point clouds that are able to be rendered on the display 355.

Electronic device 300 can further include one or more sensors 365 that meter a physical quantity or detect an activation state of the electronic device 300 and convert metered or detected information into an electrical signal. For example, sensor(s) 365 may include one or more buttons for touch input (located on the headset or the electronic device 300), one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (such as a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensor(s) 365 can further include a control circuit for controlling at least one of the sensors included therein. As will be discussed in greater detail below, one or more of these sensor(s) 365 may be used to control a user interface (UI), detect UI inputs, determine the orientation and facing the direction of the user for three-dimensional content display identification, etc. Any of these sensor(s) 365 may be located within the electronic device 300, within a secondary device operably connected to the electronic device 300, within a headset configured to hold the electronic device 300, or in a singular device where the electronic device 300 includes a headset.

As will be discussed in greater detail below, in this illustrative embodiment, the electronic device 300 receives an encoded and compressed bitstream. The electronic device 300 decodes the received bitstream into multiple 2-D frames. In certain embodiments, the decoded bitstream also includes an occupancy map. The decoded bitstream can also include flags indicating whether certain metadata is applied to modify the point cloud. The electronic device 300 decompresses the multiple 2-D frames. The multiple 2-D frames can include a set of frames that indicates coordinates, such as a geographic location of each point of a point cloud. For example, the frames can include a pictorial depiction, such as one or more patches of each geometric point of the point cloud as represented in 2-D. Another set of frames can include texture that is associated with each point, such as the color of each point. The electronic device 300 can then reconstruct and render the point cloud in three dimensions.

As will be discussed in greater detail below, in this illustrative embodiment, electronic device 300 can be similar to server 200 and encode a point cloud. The electronic device 300 can generate multiple 2-D frames that represent the geometry and texture of the point cloud. The point cloud can be mapped to the one or more 2-D frames. For example, one set of frames can include the geometric points as depicted in patches. In another example, another set of frames can include the texture or color or both of the point cloud.

The 2-D frames represent respective hierarchical levels that represent the 3-D point cloud. For example, the lowest level can be a single patch located on a frame. The single patch is a single cluster of points that represent an attribute of the 3-D point cloud. For example, the cluster of points of a patch can represent geometry of the points, such as the geographic location of each point within the point cloud. In another example, the cluster of points of a patch can represent the color value associated with each point in the cluster. The next level can be a single 2-D frame. The single 2-D frame includes one or more patches that represent the 3-D point cloud. The next level is a group of 2-D frames (GOF). The next level is a sequence. A sequence includes two or more GOF. The largest level is a video that includes two or more sequences. In certain embodiments, more or less levels can represent a 3-D point cloud. For example, the levels may be represented by a patch, frame, and sequence. In another example, an intermediate level can exist between a patch and a frame, referred to as group of patches.

The electronic device 300 can identify metadata within the frames. The metadata can be signaled at different hierarchical levels. The different levels are used to assign one or more flags to indicate whether certain metadata is applied to each respective level. For example, metadata that is applied to a frame modifies each patch in the frame. In another example, metadata that is applied to a GOF is subsequently applied to each patch within each frame of the GOF. In another example, metadata that is applied to a sequence is subsequently applied to each patch within each frame of the GOF, within the particular sequence. In another example, metadata that is applied at the patch level can be applied to a specific patch of a particular frame.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
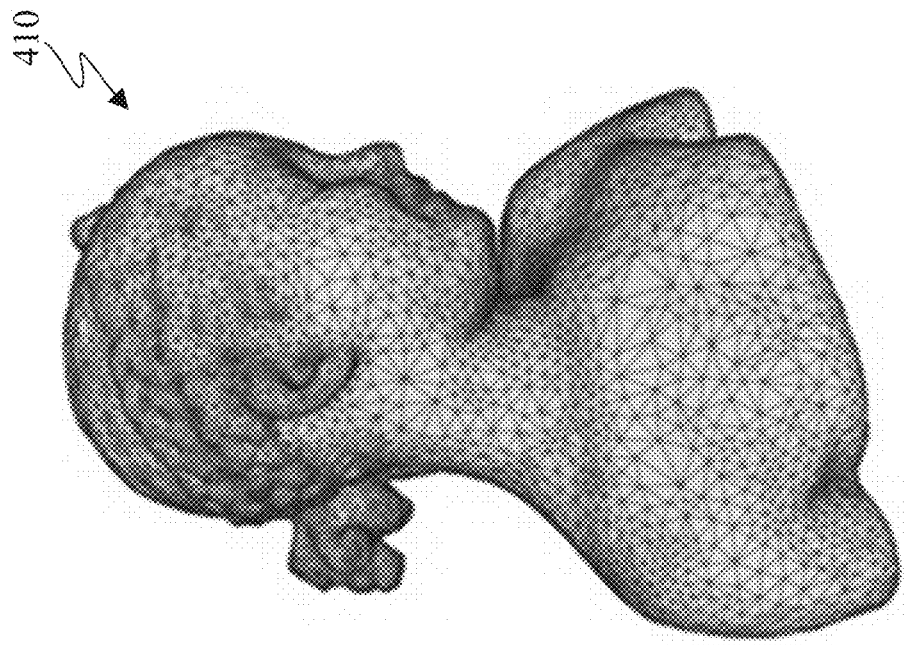
FIG. 4 illustrates a point cloud and an mesh in accordance with an embodiment of this disclosure.
Figure 4:
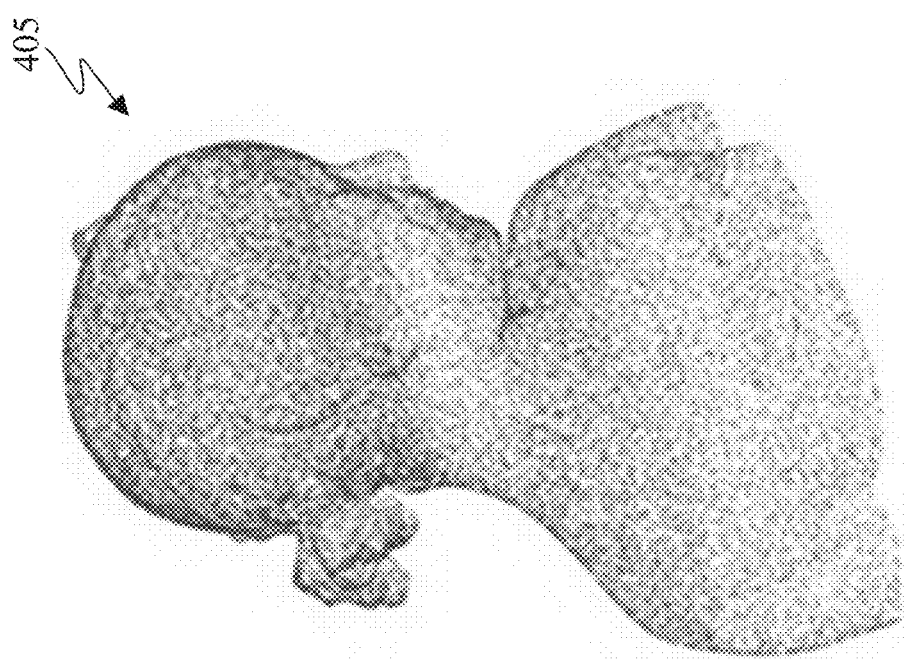

FIG. 4 illustrates a point cloud 405 and an example mesh 410 in accordance with an embodiment of this disclosure. The point cloud 405 depicts an illustration of a point cloud. A point cloud is digitized data that visually defines an object in 3-D space. As depicted, the point cloud 405 includes a number of points, with each point representing an external coordinate of the object, similar to a topographical map. For example, each point can include one or more attributes. The attributes can include a geometry, such as a geographical location. The attributes of each point can also include color, intensity, texture, motion, material properties, and the like. Attributes other than geometry can be referred to as a texture such that texture represents various aspects and properties that are associated with each point of the point cloud.

Similarly, mesh 410 depicts an illustration of a 3-D mesh. The mesh 410 is a digitized data that visually defines an object in 3-D space. The pictorial depiction of the mesh 410 is defined by many polygonal or triangular interconnectivity of information between the various points. Each polygon can include various information, such as an attribute. The attribute can include geometry and texture. Texture includes color reflectiveness, motion, and the like. For example, topological data provide connectivity information among vertices such as adjacency of vertices, edges, and faces. Geometrical information provides the geometric location of each vertex in 3-D space. Attribute information provides the normal, color, and application dependent information for each individual vertex. The vertices of each polygon are similar to the points in the point cloud 405. Each polygon of the mesh 410 represents the external surface of the object.

Point clouds (such as the point cloud 405) and meshes (such as the mesh 410), utilize substantial bandwidth to transmit from one computing device to another. Compression is necessary to reduce storage and bandwidth requirements. For example, lossy compression can compress a point cloud and mesh while maintaining the distortion within a tolerable level while reducing the size of the data.

Figure 5A:
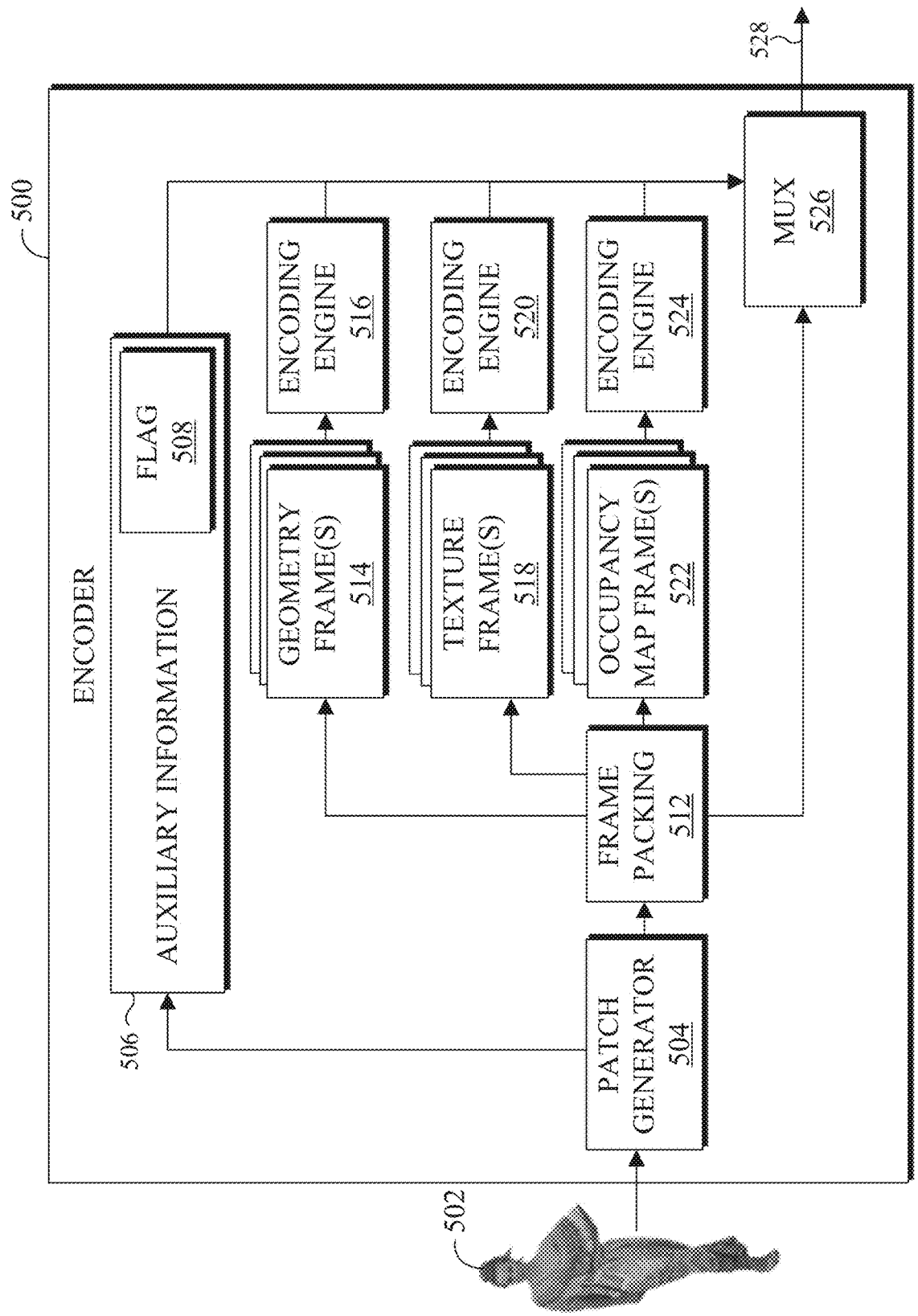
FIG. 5A illustrates an example block diagram of an encoder in accordance with an embodiment of this disclosure.
Figure 5B:
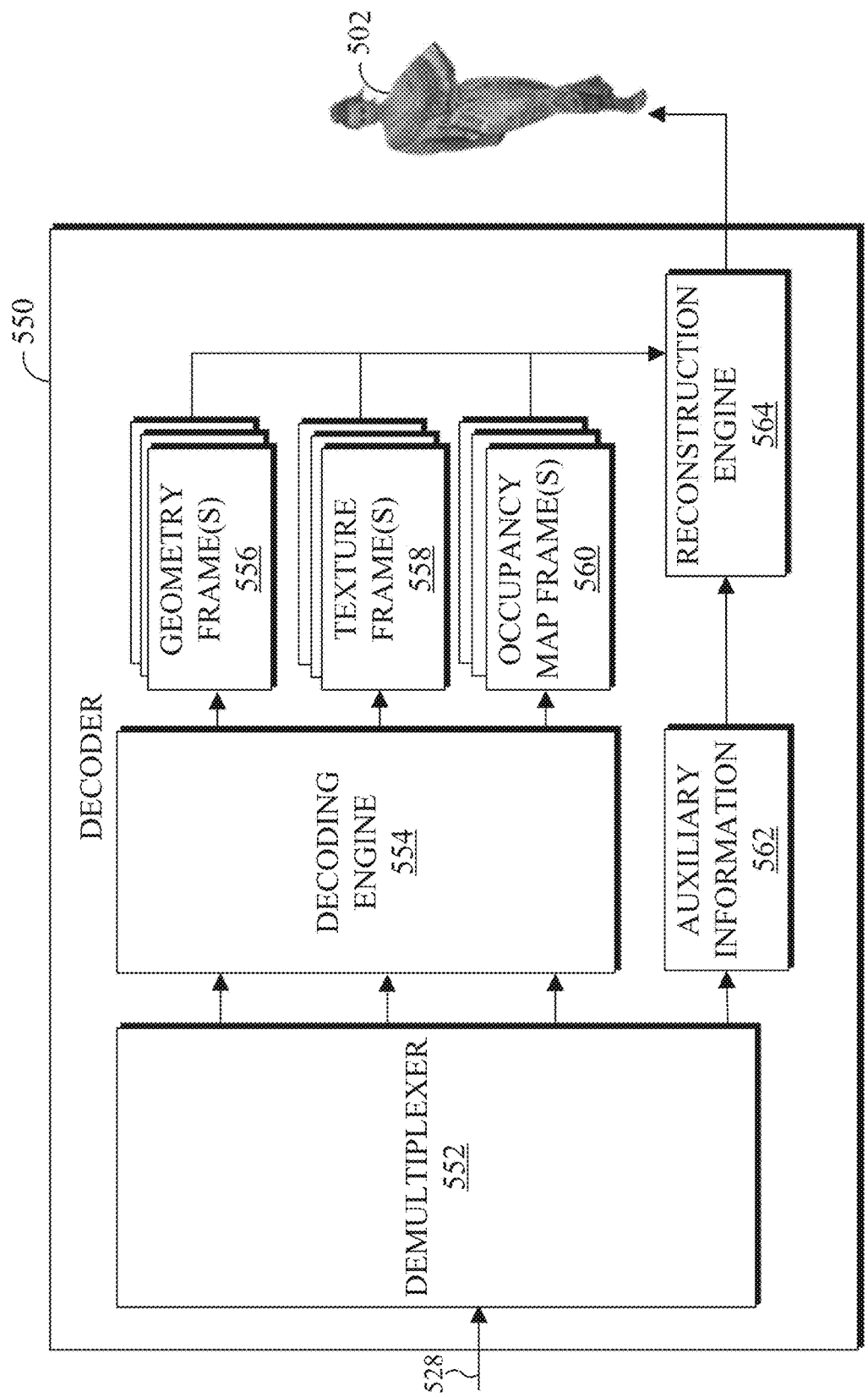
FIG. 5B illustrates an example block diagrams of a decoder in accordance with an embodiment of this disclosure.

FIG. 5A illustrates an example block diagram of an encoder 500 in accordance with an embodiment of this disclosure. FIG. 5B illustrates an example block diagram of a decoder 550 in accordance with an embodiment of this disclosure.

The encoder 500 can be similar to the server 104 of FIG. 1, any of the client devices 106-116 of FIG. 1, and include internal components similar to the server 200 of FIG. 2, as well as the electronic device 300 of FIG. 3. The decoder 550 can be similar to any of the client devices 106-116 of FIG. 1 and include internal components similar to the electronic device 300 of FIG. 3. The encoder 500 can communicate via network 102, of FIG. 1, to the decoder 550. The embodiment of the encoder 500 and the decoder 550 are for illustration only. Other embodiments could be used without departing from the scope of the present disclosure.

The encoder 500 can compress, encode, and transmit a point cloud, a mesh, or both, as an encoded bitstream. In certain embodiments, the encoder 500 generates multiple 2-D frames in which a point cloud or a mesh is mapped or projected onto. For example, the point cloud is unwrapped and mapped onto multiple 2-D frames. For example, the point cloud can be unwrapped along one axis (such as the Y-axis), and the image is mapped along the remaining axis (such as X and Z axis). In another example, a cluster of points of the 3-D point cloud can be projected onto a 2-D frame. For instance, geometric coordinate Z of a point of the 3-D point cloud is projected at an X and Y coordinates of the 2-D frame, where the X and Y coordinate of the 2-D frame correspond to the X and Y coordinate of the point of the 3-D point cloud. In certain embodiments, the encoder 500 generates an occupancy map (such as the occupancy map frames 522) that indicates where each pixel of the point cloud is located when the point cloud is mapped onto the 2-D frame. For example, the occupancy map included in the occupancy map frames 522 indicates valid points and invalid points of each frame. The invalid points are locations of the frame that does not correspond to a point of the point cloud, whereas a valid point is a location of the frame that corresponds to a point in the 3-D point cloud. The occupancy map frames 522 represents as one or more frames that include an occupancy map.

In certain embodiments, the encoder 500 can represent the 3-D point cloud 502 as an equation.

$$p_n = <x_n, y_n, z_n, r_n, g_n, b_n, nx_n, ny_n, nz_n, u_n, v_n>, n=1, \ldots, N \quad \text{Equation 1:}$$

In equation 1, $(x_n, y_n, z_n)$ represent the X, Y, and Z coordinates of the point 'n' of the 3-D point cloud 502 in 3-D space. Additionally, $(r_n, g_n, b_n)$ represent the colors of the point 'n' of the 3-D point cloud 502. Similarly, $(nx_n, ny_n, nz_n)$ represent the normal of the point 'n' of the 3-D point cloud 502 in 3-D space. Further, $(u_n, v_n)$ represent the texture of the point 'n' of the 3-D point cloud 502. In certain embodiments, the point 'n' can have a subset of attributes given in the Equation 1. In certain embodiments, the point 'n' can have additional attributes such as material properties, motion, and the like. Such attributes can be associated with different frames such as the one or more geometry frames 514 and the one or more texture frames 518. Additional sets of frames can be generated by the frame packing 512 to represent additional attributes, such as material properties, motion, and the like.

The function g(y, z) can denote a geometry frame, such as one of the geometry frames 514. An example orthogonal projection of a point, such as point $p_n$ can be expressed as $p_n=<x_n, y_n, z_n>$. For example, an orthogonal projection of a point 'n' onto a geometry frame (Y, Z) plane is expressed as $g(y_n, z_n)=x_n$. That is, at location $(y_n, z_n)$ of a particular frame, the value of the X-coordinate or a quantized version of the X-coordinate is stored. In certain embodiments, the actual location of points in the 2-D frame is not $(y_n, z_n)$. It is noted, that projections on other planes, such as the (X, Z), (X, Y) or an arbitrary plan can be similarly defined. In certain embodiments, the actual value that is compressed is the offset of '$x_n$' where the offset is constant for the entire patch.

In certain embodiments, encoder 500 is a web server, a server computer such as a management server, or any other electronic computing system capable of, mapping the three dimensions of a point cloud into two dimensions, compressing frames, and encoding images for transmission. In certain embodiments, the encoder 500 can be a "cloud" of computers interconnected by one or more networks, where each is a computing system utilizing clustered computers and components to act as a single pool of seamless resources when accessed through network 102 of FIG. 1.

The decoder 550 can decode, decompress, and generate a received encoded bitstream that includes a representation of a point cloud, a mesh, or both. In certain embodiments, the decoder 550 can generate multiple point clouds from a received bitstream that includes multiple 2-D frames. For example, each of the pixels of the point cloud can be mapped based on the information received in the 2-D frames and a received occupancy map.

The encoder 500 illustrates a high-level overview of an embodiment of the present disclosure of an electronic device that encodes and compresses a point cloud for transmission. In certain embodiments, the encoder 500 packages a representation of point cloud for transmission by a bitstream to one or more decoders (such as the decoder 550). The encoder 500 includes a received 3-D point cloud 502, a patch generator 504, an auxiliary information 506, frame packing 512, various frames (such as one or more geometry frames 514, one or more texture frames 518, and one or more occupancy map frames 522), various encoders (such as encoding engine 516, encoding engine 520, and encoding engine 524), and a multiplexer 526.

The 3-D point cloud 502 represents the input into the encoder 500. The 3-D point cloud 502 can be stored in memory that is associated with the encoder 500. The 3-D point cloud 502 can be a single 3-D object or a video that includes movement of the 3-D object.

The patch generator 504 decomposes the 3-D point cloud 502 and creates multiple patches. The patches can be organized by an attribute. For example, the attributes can include geometry, texture, reflectiveness, material, and the like. Additional sets of frames (in addition to the geometry frames 514, the texture frames 518, and the occupancy map frames 522) can represent additional attributes, such as color, reflectiveness, material, intensity, normal, and the like. Geometry (such as the geometry frames 514) is the geographic location of each point of the 3-D point cloud 502. Texture (such as the texture frames 518) represents a single aspect of each point of the 3-D point cloud 502, such as color. As discussed above, additional frames can be created that represent the other attributes. The patch generator 504 can cluster geometry attributes and texture attributes onto different 2-D frames. The clustering can be based on criteria such as a normal direction, distance to projected frames, contiguity, and the like. Each generated cluster is represented as a patch, as described below with respect to FIGS. 6A, 6B, and 6C.

In certain embodiments, the patch generator 504 projects and maps the points of the point cloud onto 2-D frames via a one-to-one mapping. The patch generator 504 can project and map the points of the point onto 2-D frames by projecting the points onto different planes. In certain embodiments, projecting and mapping the points of a point cloud onto 2-D frames can be based on a raster scan mapping, mapping based on the X geometric coordinate, mapping based on the Y geometric coordinate, mapping based on the Z geometric coordinate, mapping based on color, mapping based on normal direction, and the like.

The patch generator 504 also generates the auxiliary information 506. The auxiliary information 506 is information that is associated with each patch, a single frame, multiple frames, or the like. In certain embodiments, the auxiliary information 506 is metadata that indicates to a decoder various modifications that are to be performed when reconstructing the point cloud, based on modifications the encoder performed when generating the frames. For example, patches and frames can include auxiliary information such as (i) scaling, (ii) offsets such as spatial position offsets and depth offsets, (iii) rotation, (iv) size of each point, (v) shape of each point, (vi) resolution, (vii) point density, and the like.

In certain embodiments, the metadata for scale can be represented based on geometric coordinates, 'x,' 'y,' and 'z.' For example, with respect to the x-coordinate, the metadata can be represented as 'scale_metadata_on_axis_x.' With respect to the y-coordinate, the metadata can be represented as 'scale_metadata_on_axis_y.' Similarly, with respect to the z-coordinate, the metadata can be represented as 'scale_metadata_on_axis_z.' In certain embodiments, the points in a point cloud include integer coordinates that are converted to actual physical coordinates using scale.

In certain embodiments, the metadata for offsets can be represented based on geometric coordinates, 'x,' 'y,' and 'z.' For example, with respect to the x-coordinate, the metadata can be represented as 'offset_metadata_on_axis_x.' With respect to the y-coordinate, the metadata can be represented as 'offset_metadata_on_axis_y.' Similarly, with respect to the z-coordinate, the metadata can be represented as 'offset_metadata_on_axis_z.' In certain embodiments, the points in a point cloud include integer coordinates that are converted to actual physical coordinates using offset.

In certain embodiments, the metadata for rotation can be represented based on geometric coordinates, 'x,' 'y,' and 'z.' For example, with respect to regarding the x-coordinate, the metadata can be represented as 'rotation_metadata_on_axis_x.' With respect to the y-coordinate the metadata can be represented as 'rotation_metadata_on_axis_y.' Similarly, with respect to the z-coordinate the metadata can be represented as 'rotation_metadata_on_axis_z.' In certain embodiments, the points in a point cloud include integer coordinates that are converted to actual physical coordinates using rotation. It is noted that in certain embodiments, the points in a point cloud include integer coordinates that are converted to actual physical coordinates using scale, offset and rotation.

In certain embodiments, the metadata for the size of points that are rendered in the decoded point cloud can be represented as 'point_size_metadata.' The point size metadata adjusts the size of a point or pixel of the 3-D point cloud 502 when it is reconstructed by the decoder 550. If a small point size is used, then the reconstructed point cloud can include holes. In contrast, if the point size is too large, then the reconstructed point cloud can appear blurry. Therefore, the points included in a reconstructed point cloud (such as the 3-D point cloud 502 after it is reconstructed by the decoder 550) have an optimal size, such that the point cloud does not include holes, while not appearing blurry. The point size metadata can be predefined. For example, the creator of the 3-D point cloud 502 can signal the optimal point size in the metadata for use by the decoder 550.

Similar to the point size, the metadata for the shape of points that are rendered in the decoded point cloud can be represented as 'point_shape_metadata.' The point shape controls the visual quality of the point cloud. Similar to the size of each point, the shape of each point can ensure that the reconstructed 3-D point cloud does not appear blurry or include holes. Table 1, illustrated below, includes example metadata values that can indicate different shapes of each point. It is noted that additional shapes can be used for the points of the 3-D point cloud 502. It is noted that additional 'Point_Shape' integer values can indicate additional point shapes.

TABLE 1

| Point_Shape | Shape of points |
|---|---|
| 1 | Circle |
| 2 | Square |
| 3 | Diamond |
| ... | ... |

The auxiliary information 506 is used by the decoder, such as the decoder 550, to reconstruct the point cloud. If the encoder 500 modifies the 3-D point cloud while generating the 2-D frames, the auxiliary information (such as metadata) is generated. For example, if the 3-D point cloud is scaled to a smaller size, by subsampling the number of points or pixels included in the 3-D point cloud, the scaling parameter can be represented as metadata and included in the auxiliary information 506. Subsampling the 3-D point cloud to reduce the resolution decreases the number of points included in each 2-D frame which can reduce the bitrate when transmitting the frames as an encoded bitstream 528. A decoder can then reconstruct the point cloud and up-sample the frames based on the scaling parameter and reconstruct the 3-D point cloud at the higher resolution.

Figure 9:
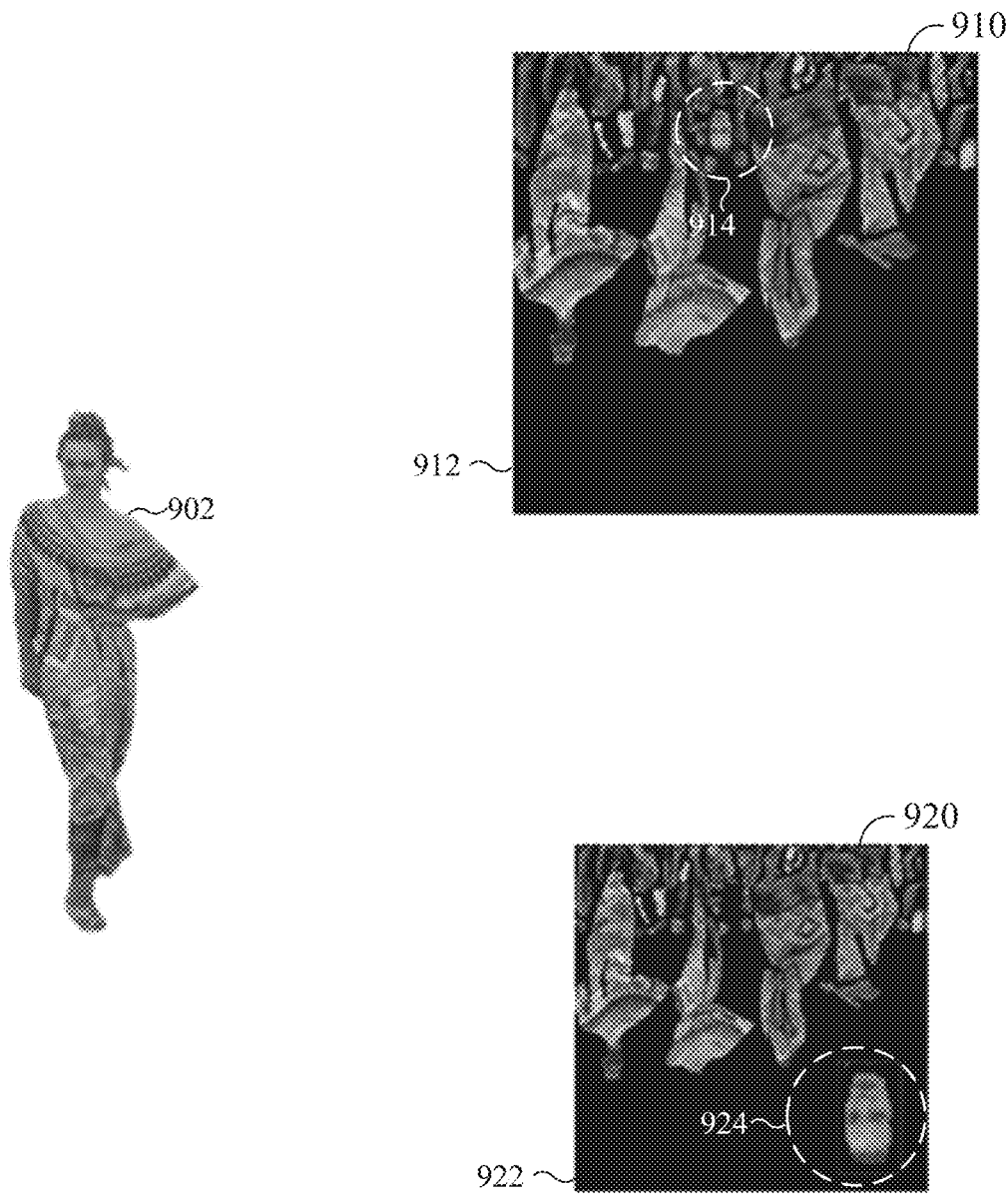
FIG. 9 illustrates a adaptive region of a point cloud density in accordance with an embodiment of this disclosure.

Additionally, the auxiliary information 506 can indicate a ROI of the 3-D point cloud 502. A ROI can indicate a portion of the point cloud that is modified differently than the rest of the 3-D point cloud 502. An ROI can be scaled to a first parameter while the rest of the 3-D point cloud is scaled to another parameter. An ROI can be identified by the creator of the 3-D point cloud 502. For example, the creator of the 3-D point cloud 502 can identify the face of the humanoid as an ROI since the face is important and should be minimally compressed via a scaling parameter compared to the rest of the 3-D point cloud 502. FIG. 9 below further describes an ROI of a 3-D point cloud 502.

The auxiliary information 506 can also include flag 508. The flag 508 indicates when the auxiliary information is applied to a particular patch, set of patches, a single frame, a group of frames, a sequence, or the video, and the like. An access level refers tier or level of the various elements that make up a 2-D representation of the 3-D point cloud, such as a patch, a frame, a group of frames, a sequence, a video, and the like. An access level is one or more groupings of patches or frames. For example, a single patch in a frame can be one access level. Another access level can be a single 2-D frame that includes many patches. Another access level can be a group of frames (GOF) that includes two or more frames with each frame including patches. Another access level can be a sequence. A sequence represents a portion of a video of the 3-D point cloud moving. For instance, if the point cloud is walking on a road, lifting something off the ground, climbing stairs, and the like. A sequence includes one or more GOF. A video can include multiple sequences. It is noted that a single point cloud can be represented by more or less access levels, as the access levels provide various hierarchal categories of the 3-D point cloud 502. For example, the access levels can be represented by a patch, a frame, and a sequence. In another example, there may be an intermediate level between a patch and a frame, referred to as group of patches. Additional or alternative access levels can be defined.

In addition to the types of metadata described above, the metadata can be applied to particular access levels of the point cloud. For example, the metadata for scale can be applied at the patch level to a particular patch. Example metadata adjusting the scale of for the x, y, and z coordinates at an access level representing a patch can be expressed as 'patch_scale_metadata_on_axis_x,' 'patch_scale_metadata_on_axis_y,' and 'patch_scale_metadata_on_axis_z,' respectively. Metadata for offsets, rotation, and the like can be expressed similarly. Additionally, metadata representing different access levels can be expressed in a similar manner for frames, GOF, sequence, video, and the like.

Metadata such as scale, resolution, point density, offset, rotation, point size, point shape, and the like, can be referred to as a parameter set and applied to different access levels. For example, a patch parameter set (PPS) includes a type of metadata for a single patch in a single frame that represents a portion of the 3-D point cloud. It is noted that a patch on a frame representing geometry has a corresponding counterpart on a frame representing another attribute, such as texture, color, material, and the like. In another example, the frame parameter set (FPS) includes a type of metadata related to each frame, so that all patches within that frame have identical frame-level parameters. Similarly, a GOF parameter set (GofPS) defines GOF-level metadata that is identical for all frames included in the GOF. Likewise, sequence parameter set (SPS) includes metadata in the sequence level, which is identical for all of the 2-D frames, and the frames corresponding patches that are included in the sequence. Also, a video parameter set (VPS) includes metadata that is identical for all point cloud sequences, such as when the bitstream includes multiple sequences at different resolutions. In certain embodiments, the order of priority is (i) PPS, (ii) FPS, (iii) GofPS, (iv) SPS, and (v) VPS. It is noted that some of the parameter sets (such as PPS, FPS, GofPS, SPS, and VPS) or access levels may not be necessarily defined for a point cloud. Additionally, additional parameter sets or access levels can be defined for a point cloud.

For example, if a patch-level scale metadata parameter is signaled for a patch, the metadata is considered as the scale value for that patch. In contrast if a patch-level scale metadata parameter is not signaled for the patch but a frame-level scale parameter is signaled for the frame containing the patch, the frame-level scale metadata parameter is assigned to the scale parameter of that patch.

The auxiliary information 506 can include non-orthogonal transform parameters. For example, when the patch generator 504 generates the patches, the patch generator 504 can use a non-orthogonal projection instead of an orthogonal projection. The non-orthogonal transform parameters, when identified at the decoder (such as the decoder 550), are used to reconstruct the 3-D point cloud.

The flag 508 can include one or more control flags that indicate to the decoder when the auxiliary information 506 is applied to the 2-D frames to reconstruct the 3-D point cloud. The flag 508 can signal when the information (such as metadata) that is included in the auxiliary information 506 is applied to each respective access level. In certain embodiments, the flag 508 is separated from the auxiliary information 506, and multiplexed via the multiplexer 526 into the encoded bitstream 528. In certain embodiments, the flag 508 is omitted.

Each access level can have one or more flags 508 that control whether the metadata parameter set is signaled in the bitstream. The various flags 508 can signal when particular metadata is applicable to certain access levels. As discussed above, the metadata can include metadata controlling the as (i) scaling, (ii) offsets, (iii) rotation, (iv) size of each point, (v) shape of each point, and the like. In certain embodiments, the flag 508 can be a single control binary flag by (i) absolute signaling by reusing previously signaled metadata, (ii) conditional signaling by reusing previously signaled metadata, and (iii) using a reference identification. Absolute signaling using two control binary flags are discussed with reference to syntax 1, 2, 3, and 4 below. Absolute signaling using one control binary flag is discussed below with reference to syntax 6 and 7. Absolute signaling by reusing previously signaled metadata is discussed with reference to syntax 8, below. Conditional signaling by reusing previously signaled metadata is discussed with reference to syntax 9, below. Reference identification to signal metadata is discussed with reference to syntax 10, below.

In certain embodiments, two control binary flags 508 can be used to signal the metadata. The two flags 508 can include an (i) enabling flag and a (ii) present flag associated with each type of metadata at each designated access level. An access level can include patch level, a frame level, a GOF level, a sequence level, and a video level, and the like. The number or description of the access levels associated with a point cloud, such as the 3-D point cloud 502, can be predefined or predetermined. In certain embodiments, two access levels are defined such as a patch and a frame. In certain embodiments, multiple access levels are defined, beyond those of a patch level, a frame level, a GOF level, a sequence level, and a video level.

If the flag 508 includes two control flags, such as the enabling flag and the present flag, the enabling flag is signaled one access level higher than the present flag. The present flag is signaled at the same access level if the enabling flag is true.

Syntax 1:

```
// In the frame level
if (frame_metadata_enabled_flag) {
  read frame_metadata_present_flag;
  if (frame_metadata_present_flag) {
    frame_parameter_set_metadata( );
    // Read enabling flags for one level lower.
    read patch_metadata_enabled_flag;
    if (patch_metadata_enabled_flag) {
      read patch_scale_metadata_enabled_flag;
```

Syntax 1:

```
      read patch_offset_metadata_enabled_flag;
      read patch_rotation_metadata_enabled_flag;
      read patch_point_size_metadata_enabled_flag;
      read patch_point_shape_metadata_enabled_flag;
    }
  }
}
```

Syntax 1 illustrates that if the enabling flag at the frame level is true, then the decoder 550 is to read the frame level present flag at the frame level. Thereafter, if the present flag at the frame level is true, then the decoder 550 is to read the frame level metadata parameter set. Thereafter, if the enabling flag at the patch level is true, the decoder 550 reads the enabling flags for each of the various types of patch level metadata, such as the scale, offset, rotation, point size, and point shape.

For example, if a syntax element 'patch_metadata_enabled_flag' is signaled at the frame level (the access level associated with a frame) the syntax element identifies whether there is at least one patch inside the frame for which patch parameter set is signaled. If this flag is true, the syntax element 'patch_metadata_present_flag' is signaled in the patch level and identifies for which patches a patch parameter set is signaled. Sample syntax for scale metadata is shown below. If a flag is not signaled, the flag is inferred by the decoder 550 to be false.

Syntax 2:

```
gof_parameter_set_matadata( )
{
  if (gof_scale_enabled_flag) {
    read gof_scale_on_axis_x;
    read gof_scale_on_axis_y;
    read gof_scale_on_axis_z;
  }
  else {
    gof_scale_on_axis_x = <default_value>;
    gof_scale_on_axis_y = <default_value>;
    gof_scale_on_axis_z = <default_value>;
  }
  if (gof_offset_enabled_flag) {
    read gof_offset_on_axis_x;
    read gof_offset_on_axis_y;
    read gof_offset_on_axis_z;
  }
  else {
    gof_offset_on_axis_x = <default_value>;
    gof_offset_on_axis_y = <default_value>;
    gof_offset_on_axis_z = <default_value>;
  }
  if (gof_rotation_enabled_flag) {
    read gof_rotation_on_axis_x;
    read gof_rotation_on_axis_y;
    read gof_rotation_on_axis_z;
  }
  else {
    gof_rotation_on_axis_x = <default_value>;
    gof_rotation_on_axis_y = <default_value>;
    gof_rotation_on_axis_z = <default_value>;
  }
  if (gof_point_size_enabled_flag) {
    read gof_point_size;
  }
  else {
    gof_point_size = <default_value>;
  }
  if (gof_point_shape_enabled_flag) {
    read gof_point_shape;
  }
```

Syntax 2:

```
    else {
      gof_point_shape = <default_value>;
    }
}
frame_parameter_set_matadata( )
{
  if (fps_scale_enabled_flag) {
    read fps_scale_on_axis_x;
    read fps_scale_on_axis_y;
    read fps_scale_on_axis_z;
  }
  else {
    fps_scale_on_axis_x = gof_scale_on_axis_x;
    fps_scale_on_axis_y = gof_scale_on_axis_y;
    fps_scale_on_axis_z = gof_scale_on_axis_z;
  }
  if (fps_offset_enabled_flag) {
    read fps_offset_on_axis_x;
    read fps_offset_on_axis_y;
    read fps_offset_on_axis_z;
  }
  else {
    fps_offset_on_axis_x = gof_offset_on_axis_x;
    fps_offset_on_axis_y = gof_offset_on_axis_y;
    fps_offset_on_axis_z = gof_offset_on_axis_z;
  }
  if (fps_rotation_enabled_flag) {
    read fps_rotation_on_axis_x;
    read fps_rotation_on_axis_y;
    read fps_rotation_on_axis_z;
  }
  else {
    fps_rotation_on_axis_x = gof_rotation_on_axis_x;
    fps_rotation_on_axis_y = gof_rotation_on_axis_y;
    fps_rotation_on_axis_z = gof_rotation_on_axis_z;
  }
  if (fps_point_size_enabled_flag) {
    read fps_point_size;
  }
  else {
    fps_point_size = gof_point_size;
  }
  if (fps_point_shape_enabled_flag) {
    read fps_point_shape;
  }
  else {
    fps_point_shape = gof_point_shape;
  }
}
patch_parameter_set_matadata_matadata( )
{
  if (pps_scale_enabled_flag) {
    read pps_scale_on_axis_x;
    read pps_scale_on_axis_y;
    read pps_scale_on_axis_z;
  }
  else {
    pps_scale_on_axis_x = fps_scale_on_axis_x;
    pps_scale_on_axis_y = fps_scale_on_axis_y;
    pps_scale_on_axis_z = fps_scale_on_axis_z;
  }
  if (pps_offset_enabled_flag) {
    read pps_offset_on_axis_x;
    read pps_offset_on_axis_y;
    read pps_offset_on_axis_z;
  }
  else {
    pps_offset_on_axis_x = fps_offset_on_axis_x;
    pps_offset_on_axis_y = fps_offset_on_axis_y;
    pps_offset_on_axis_z = fps_offset_on_axis_z;
  }
  if (pps_rotation_enabled_flag) {
    read pps_rotation_on_axis_x;
    read pps_rotation_on_axis_y;
    read pps_rotation_on_axis_z;
  }
  else {
    pps_rotation_on_axis_x = fps_rotation_on_axis_x;
    pps_rotation_on_axis_y = fps_rotation_on_axis_y;
    pps_rotation_on_axis_z = fps_rotation_on_axis_z;
  }
  if (pps_point_size_enabled_flag) {
    read pps_point_size;
  }
  else {
    pps_point_size = fps_point_size;
  }
  if (pps_point_shape_enabled_flag) {
    read pps_point_shape;
  }
  else {
    pps_point_shape = fps_point_shape;
  }
}
```

Further, with respect to two flags 508, the metadata at the highest access level is set to a default value if the enabling flag is false or if the present flag is false. The metadata at the one access level lower than the highest access level is set to the corresponding metadata at the one access level higher if it is not signaled. The metadata may not be signaled if the enabling flag is false or if the present flag is false.

Syntax 3:

```
frame_parameter_set_matadata( ) {
  if (frame_scale_metadata_enabled_flag) {
    read frame_scale_metadata_present_flag;
    if (frame_scale_metadata_present_flag) {
      read frame_scale_metadata_on_axis_x;
      read frame_scale_metadata_on_axis_y;
      read frame_scale_metadata_on_axis_z;
    }
    else {
      frame_metadata_on_axis_x = gof_metadata_on_axis_x;
      frame_metadata_on_axis_y = gof_metadata_on_axis_y;
      frame_metadata_on_axis_z = gof_metadata_on_axis_z;
    }
  }
  // Other frame-level metadata
  ...
}
```

Syntax 3 above illustrates various metadata parameters sets (PS) at different access levels, such as the GOF parameter set ('syntax element 'GofPS'), frame parameter set ('syntax element 'FPS'), and patch parameter set ('syntax element 'PPS'). Each parameter set includes a flag (such as flag 508) that indicates whether the metadata parameter set is signaled in the bitstream. Within each parameter set, each metadata has a flag that controls whether that metadata is signaled in the parameter set. For example, the metadata parameters in the GofPS are initialized to default values. The metadata parameters in the FPS are initialized to their corresponding parameters in the GofPS. Thereafter the metadata parameters in the PPS are initialized to their corresponding parameters in the FPS. Additionally, the syntax 2, illustrates metadata for scale, offset, rotation, point size, point shape.

Syntax 3 illustrates that if the enabling flag is present at the frame level, the decoder 550 performs one of two actions. If the present flag at the frame level exists, the decoder 550 reads and applies the scale metadata to the x, y, and z coordinates respectively. If the enabling flag at the frame level does not exist, then the decoder 550 uses the metadata for the x, y, and z metadata from one access level higher of the frame access level. In certain embodiments, one access level higher can be the GOF access level.

Syntax 4 below illustrates applying two control flags, the enabling flag and the present flag (represented as the flag 508) to signal whether the metadata is applied at a particular access level.

| Line | Syntax 4:<br>Syntax |
|---|---|
| 1 | bitstream_header( ) { |
| 2 |     pcc_category2_container_magic_number |
| 3 |     pcc_category2_container_version |
| 4 |     bitstream_size_in_bytes |
| 5 |     gof_metadata_enabled_flag |
| 6 |     if (gof_metadata_enabled_flag) { |
| 7 |         gof_scale_metadata_enabled_flag |
| 8 |         gof_offset_metadata_enabled_flag |
| 9 |         gof_rotation_metadata_enabled_flag |
| 10 |         gof_point_size_metadata_enabled_flag |
| 11 |         gof_point_shape_metadata_enabled_flag |
| 12 |     } |
| 13 | } |
| 14 | group_of_frames_header( ) { |
| 15 |     group_of_frames_size |
| 16 |     frame_width |
| 17 |     frame_height |
| 18 |     occupancy_resolution |
| 19 |     radius_to_smoothing |
| 20 |     neighbor_count_smoothing |
| 21 |     radius2_boundary_detection |
| 22 |     threshold_smoothing |
| 23 |     lossless_geometry |
| 24 |     lossless_texture |
| 25 |     no_attributes |
| 26 |     lossless_geometry_444 |
| 27 |     absolute_d1_coding |
| 28 |     binary_arithmetic_coding |
| 29 |     ByteCount += 16 |
| 30 |     if (gof_metadata_enabled_flag) { |
| 31 |         gof_metadata_present_flag |
| 32 |         ByteCount += 1 |
| 33 |         if (gof_metadata_present_flag) |
| 34 |             gof_parameter_set_metadata( ) |
| 35 |     frame_metadata_enabled_flag |
| 36 |     ByteCount += 1 |
| 37 |     if (frame_metadata_enabled_flag) { |
| 38 |         frame_scale_metadata_enabled_flag |
| 39 |         frame_offset_metadata_enabled_flag |
| 40 |         frame_rotation_metadata_enabled_flag |
| 41 |         frame_point_size_metadata_enabled_flag |
| 42 |         frame_point_shape_metadata_enabled_flag |
| 43 |         ByteCount += 5 |
| 44 |     } |
| 45 |     } |
| 46 | } |
| 47 | gof_parameter_set_matadata( ) { |
| 48 |     if (gof_scale_metadata_enabled_flag) { |
| 49 |         gof_scale_metadata_present_flag |
| 50 |         ByteCount += 1 |
| 51 |         if (gof_scale_metadata_present_flag) { |
| 52 |             gof_scale_metadata_on_axis_x |
| 53 |             gof_scale_metadata_on_axis_y |
| 54 |             gof_scale_metadata_on_axis_z |
| 55 |             ByteCount += 12 |
| 56 |         } |
| 57 |     } |
| 58 |     if (gof_offset_metadata_enabled_flag) { |
| 59 |         gof_offset_metadata_present_flag |
| 60 |         ByteCount += 1 |
| 61 |         if (gof_offset_metadata_present_flag) { |
| 62 |             gof_offset_metadata_on_axis_x |
| 63 |             gof_offset_metadata_on_axis_y |
| 64 |             gof_offset_metadata_on_axis_z |
| 65 |             ByteCount += 12 |
| 66 |         } |
| 67 |     } |

-continued

| Line | Syntax 4:<br>Syntax |
|---|---|
| 68 |     if (gof_rotation_metadata_enabled_flag) { |
| 69 |         gof_rotation_metadata_present_flag |
| 70 |         ByteCount += 1 |
| 71 |         if (gof_rotation_metadata_present_flag) { |
| 72 |             gof_rotation_metadata_on_axis_x |
| 73 |             gof_rotation_metadata_on_axis_y |
| 74 |             gof_rotation_metadata_on_axis_z |
| 75 |             ByteCount += 12 |
| 76 |         } |
| 77 |     } |
| 78 |     if (gof_point_size_metadata_enabled_flag) { |
| 79 |         gof_point_size_metadata_present_flag |
| 80 |         ByteCount += 1 |
| 81 |         if (gof_point_size_metadata_present_flag) { |
| 82 |             gof_point_size_metadata |
| 83 |             ByteCount += 2 |
| 84 |         } |
| 85 |     } |
| 86 |     if (gof_point_shape_metadata_enabled_flag) { |
| 87 |         gof_point_shape_metadata_present_flag |
| 88 |         ByteCount += 1 |
| 89 |         if (gof_point_shape_metadata_present_flag) { |
| 90 |             gof_point_shape_metadata |
| 91 |             ByteCount += 1 |
| 92 |         } |
| 93 |     } |
| 94 | } |
| 95 | frame_auxiliary_information( ) { |
| 96 |     patch_count |
| 97 |     occupancy_precision |
| 98 |     max_candidate_count |
| 99 |     bit_count_u0 |
| 100 |     bit_count_v0 |
| 101 |     bit_count_u1 |
| 102 |     bit_count_v1 |
| 103 |     bit_count_d1 |
| 104 |     occupancy_aux_stream_size |
| 105 |     if (frame_metadata_enabled_flag) { |
| 106 |         frame_metadata_present_flag |
| 107 |         ByteCount += 1 |
| 108 |         if (frame_metadata_present_flag) |
| 109 |             frame_parameter_set_metadata( ) |
| 110 |         patch_metadata_enabled_flag |
| 111 |         ByteCount += 1 |
| 112 |         if (patch_metadata_enabled_flag) { |
| 113 |             patch_scale_metadata_enabled_flag |
| 114 |             patch_offset_metadata_enabled_flag |
| 115 |             patch_rotation_metadata_enabled_flag |
| 116 |             patch_point_size_metadata_enabled_flag |
| 117 |             patch_point_shape_metadata_enabled_flag |
| 118 |             ByteCount += 5 |
| 119 |         } |
| 120 |     } |
| 121 |     ByteCount += 15 |
| 122 |     for( i = 0; i < patch_count; i++ ) { |
| 123 |         patchList[i].patch_u0 |
| 124 |         patchList[i].patch_v0 |
| 125 |         patchList[i].patch_u1 |
| 126 |         patchList[i].patch_v1 |
| 127 |         patchList[i].patch_d1 |
| 128 |         patchList[i].delta_size_u0 |
| 129 |         patchList[i].delta_size_v0 |
| 130 |         patchList[i].normal_axis |
| 131 |         if (patch_metadata_enabled_flag) { |
| 132 |             patch_metadata_present_flag |
| 133 |             ByteCount += 1 |
| 134 |             if (patch_metadata_present_flag) |
| 135 |                 patch_parameter_set_metadata( ) |
| 136 |         } |
| 137 |     } |
| 138 |     for( i = 0; i < blockCount; i++ ) { |
| 139 |         if( candidatePatches[i].size( ) == 1 ) |
| 140 |             blockToPatch[i] = candidatePatches[i][0] |
| 141 |         else { |
| 142 |             candidate_index |

Syntax 4:

| Line | Syntax |
|---|---|
| 143 |                 if( candidate_index == max_candidate_count ) |
| 144 |                   blockToPatch[i] = patch_index |
| 145 |                 else |
| 146 |                   blockToPatch[i] = candidatePatches[i][candidate_index] |
| 147 |         } |
| 148 |     } |
| 149 |     ByteCount += occupancy_auxilary_stream_size |
| 150 | } |
| 151 | frame_parameter_set_matadata( ) { |
| 152 |     if (frame_scale_metadata_enabled_flag) { |
| 153 |         frame_scale_metadata_present_flag |
| 154 |         ByteCount += 1 |
| 155 |         if (frame_scale_metadata_present_flag) { |
| 156 |             frame_scale_metadata_on_axis_x |
| 157 |             frame_scale_metadata_on_axis_y |
| 158 |             frame_scale_metadata_on_axis_z |
| 159 |             ByteCount += 12 |
| 160 |         } |
| 161 |     } |
| 162 |     if (frame_offset_metadata_enabled_flag) { |
| 163 |         frame_offset_metadata_present_flag |
| 164 |         ByteCount += 1 |
| 165 |         if (frame_offset_metadata_present_flag) { |
| 166 |             frame_offset_metadata_on_axis_x |
| 167 |             frame_offset_metadata_on_axis_y |
| 168 |             frame_offset_metadata_on_axis_z |
| 169 |             ByteCount += 12 |
| 170 |         } |
| 171 |     } |
| 172 |     if (frame_rotation_metadata_enabled_flag) { |
| 173 |         frame_rotation_metadata_present_flag |
| 174 |         ByteCount += 1 |
| 175 |         if (frame_rotation_metadata_present_flag) { |
| 176 |             frame_rotation_metadata_on_axis_x |
| 177 |             frame_rotation_metadata_on_axis_y |
| 178 |             frame_rotation_metadata_on_axis_z |
| 179 |             ByteCount += 12 |
| 180 |         } |
| 181 |     } |
| 182 |     if (frame_point_size_metadata_enabled_flag) { |
| 183 |         frame_point_size_metadata_present_flag |
| 184 |         ByteCount += 1 |
| 185 |         if (frame_point_size_metadata_present_flag) { |
| 186 |             frame_point_size_metadata |
| 187 |             ByteCount += 2 |
| 188 |         } |
| 189 |     } |
| 190 |     if (frame_point_shape_metadata_enabled_flag) { |
| 191 |         frame_point_shape_metadata_present_flag |
| 192 |         ByteCount += 1 |
| 193 |         if (frame_point_shape_metadata_present_flag) { |
| 194 |             frame_point_shape_metadata |
| 195 |             ByteCount += 1 |
| 196 |         } |
| 197 |     } |
| 198 | } |
| 199 | patch_parameter_set_matadata( ) { |
| 200 |     if (patch_scale_metadata_enabled_flag) { |
| 201 |         patch_scale_metadata_present_flag |
| 202 |         ByteCount += 1 |
| 203 |         if (patch_scale_metadata_present_flag) { |
| 204 |             patch_scale_metadata_on_axis_x |
| 205 |             patch_scale_metadata_on_axis_y |
| 206 |             patch_scale_metadata_on_axis_z |
| 207 |             ByteCount += 12 |
| 208 |         } |
| 209 |     } |
| 210 |     if (patch_offset_metadata_enabled_flag) { |
| 211 |         patch_offset_metadata_present_flag |
| 212 |         ByteCount += 1 |
| 213 |         if (patch_offset_metadata_present_flag) { |
| 214 |             patch_offset_metadata_on_axis_x |
| 215 |             patch_offset_metadata_on_axis_y |
| 216 |             patch_offset_metadata_on_axis_z |
| 217 |             ByteCount += 12 |
| 218 |         } |
| 219 |     } |
| 220 |     if (patch_rotation_metadata_enabled_flag) { |
| 221 |         patch_rotation_metadata_present_flag |
| 222 |         ByteCount += 1 |
| 223 |         if (patch_rotation_metadata_present_flag) { |
| 224 |             patch_rotation_metadata_on_axis_x |
| 225 |             patch_rotation_metadata_on_axis_y |
| 226 |             patch_rotation_metadata_on_axis_z |
| 227 |             ByteCount += 12 |
| 228 |         } |
| 229 |     } |
| 230 |     if (patch_point_size_metadata_enabled_flag) { |
| 231 |         patch_point_size_metadata_present_flag |
| 232 |         ByteCount += 1 |
| 233 |         if (patch_point_size_metadata_present_flag) { |
| 234 |             patch_point_size_metadata |
| 235 |             ByteCount += 2 |
| 236 |         } |
| 237 |     } |
| 238 |     if (patch_point_shape_metadata_enabled_flag) { |
| 239 |         patch_point_shape_metadata_present_flag |
| 240 |         ByteCount += 1 |
| 241 |         if (patch_point_shape_metadata_present_flag) { |
| 242 |             patch_point_shape_metadata |
| 243 |             ByteCount += 1 |
| 244 |         } |
| 245 |     } |
| 246 | } |

Syntax 4 illustrates the flags 508 signaling when the metadata is applicable to different access levels. The decoder 550 can receive the encoded bitstream 528. The encoded bitstream 528 can include the auxiliary information 506 including both the flags 508 and the metadata. Line 1 through line 13 of syntax 4 illustrates an example bitstream header. Starting at line 14, of syntax 4, the GOF header syntax is illustrated. The GOF syntax header corresponds to an access level of the GOF. Starting at line 47 the GOF metadata syntax is illustrated. The GOF metadata syntax is represented as a GOF parameter set. Starting at line 95, the frame auxiliary information is illustrated. Starting at line 151, the frame-level metadata syntax is illustrated. The frame metadata syntax is represented as a frame parameter set. The frame level corresponds to an access level of the frames. Additionally, starting at line 199, the patch level metadata syntax is illustrated. The patch metadata syntax is represented as a patch parameter set. The patch level corresponds to an access level of the patches. When a default value is assigned to metadata of a particular access level, the default value can be predetermined or the metadata can be assigned the values from the next highest access level. In certain embodiments, a predetermined value is assigned only to the highest access level, and lower level access level is assigned the values from the next highest access level. It is noted that a flag can be set interchangeably to zero or false. It is also noted that a flag can be set interchangeably to one or true.

Referring to syntax 4, above, the syntax elements of 'gof_metadata_enabled_flag,' 'gof_scale_enabled_flag,' 'gof_offset_enabled_flag,' 'gof_rotation_enabled_flag,' 'gof_point_size_enabled_flag,' and 'gof_point_shape_enabled_flag,' are included in the bitstream header semantics. The syntax element 'gof_metadata_enabled_flag,' of line 5 and 6 of the syntax 4, indicates whether GOF-level metadata parameter set is signaled in the bitstream. If 'gof_metadata_enabled_flag' is equal to one (or true), indicates to the decoder 550 that at the GOF-level metadata parameter set may be signaled for some GOF. Alternatively, if 'gof_metadata_enabled_flag' is equal to zero (or false), indicates to the decoder 550 that GOF-level metadata parameter set is not signaled. When the GOF-level metadata parameter set is not signaled, the metadata parameters in the GOF level are assigned default values. For example, the default values can be the values from the next highest access level. In another example, the default values can be a predefined value, if the GOF access level is the highest defined access level.

The syntax element 'gof_scale_metadata_enabled_flag,' of lines 7 and 48 of syntax 4, indicates whether GOF-level scale metadata parameters are signaled in the bitstream. If 'gof_scale_metadata_enabled_flag' is equal to one (or true), indicates to the decoder 550 that GOF-level scale metadata parameters may be signaled for some GOFs. Alternatively, if 'gof_scale_metadata_enabled_flag' is equal to zero (or false), indicates to the decoder 550 that GOF-level scale metadata parameters are not signaled. When the GOF-level scale metadata parameters are not signaled, the scale metadata parameters in the GOF level are assigned default values. For example, the default values can be the values from the next highest access level. In another example, the default values can be a predefined value, if the GOF access level is the highest defined access level. It is noted that if 'gof_scale_metadata_enabled_flag' is not present in syntax 4, it is assumed to be zero.

Similarly, the syntax element 'gof_offset_metadata_enabled_flag,' of lines 8 and 58 of syntax 4, indicates whether GOF-level offset metadata parameters are signaled in the bitstream. If 'gof_offset_metadata_enabled_flag' is equal to one (or true), indicates to the decoder 550 that GOF-level offset metadata parameters may be signaled for some GOFs. Alternatively, if 'gof_offset_metadata_enabled_flag' is equal to zero (or false), indicates that GOF-level offset metadata parameters are not signaled. When the GOF-level offset metadata parameters are not signaled, the offset metadata parameters in the GOF level are assigned default values. For example, the default values can be the values from the next highest access level. In another example, the default values can be a predefined value, if the GOF access level is the highest defined access level. It is noted that if 'gof_offset_metadata_enabled_flag' is not present in syntax 4, it is assumed to be zero.

Additionally, the syntax element 'gof_rotation_metadata_enabled_flag,' of lines 9 and 68 of syntax 4, indicates whether GOF-level rotation metadata parameters are signaled in the bitstream. If 'gof_rotation_metadata_enabled_flag' is equal to one (or true), indicates to the decoder 550 that GOF-level rotation metadata parameters may be signaled for some GOFs. Alternatively, if 'gof_rotation_metadata_enabled_flag' is equal to zero (or false), indicates that GOF-level rotation metadata parameters are not signaled. When GOF-level rotation metadata parameters are not signaled, the rotation metadata parameters in the GOF level are assigned default values. For example, the default values can be the values from the next highest access level. In another example, the default values can be a predefined value, if the GOF access level is the highest defined access level. It is noted that if 'gof_rotation_metadata_enabled_flag' is not present in syntax 4, it is assumed to be zero.

Further, the syntax element 'gof_point_size_metadata_enabled_flag,' of lines 10 and 78 of syntax 4, indicates whether a GOF-level point size metadata parameter is signaled in the bitstream. If 'gof_point_size_metadata_enabled_flag' is equal to one (or true), indicates to the decoder 550 that a GOF-level point size metadata parameter may be signaled for some GOFs. Alternatively, if 'gof_point_size_metadata_enabled_flag' is equal to zero (or false), indicates that a GOF-level point size metadata parameter is not signaled. When the GOF-level point size metadata parameter is not signaled, the point size metadata parameter in the GOF level is assigned to its default value. For example, the default value can be the values from the next highest access level. In another example, the default value can be a predefined value, if the GOF access level is the highest defined access level. It is noted that if 'gof_point_size_metadata_enabled_flag' is not present in syntax 4, it is assumed to be zero.

Also, the syntax element 'gof_point_shape_metadata_enabled_flag,' of lines 11 and 86 of syntax 4, indicates whether a GOF-level point shape metadata parameter is signaled in the bitstream. If 'gof_point_shape_metadata_enabled_flag' is equal to one (or true), indicates to the decoder 550 that a GOF-level point shape metadata parameter may be signaled for some GOFs. Alternatively, if 'gof_point_shape_metadata_enabled_flag' is equal to zero (or false), indicates that a GOF-level point shape metadata parameter is not signaled. When the GOF-level point shape metadata parameter is not signaled, the point shape metadata parameter in the GOF level is assigned to its default value. For example, the default value can be the values from the next highest access level. In another example, the default value can be a predefined value, if the GOF access level is the highest defined access level. It is noted that if 'gof_point_shape_metadata_enabled_flag' is not present in syntax 4, it is assumed to be zero.

Referring to syntax 4, above, the syntax elements 'gof_metadata_present_flag,' 'gof_scale_metadata_present_flag,' 'gof_offset_metadata_enabled_flag,' 'gof_rotation_metadata_enabled_flag,' 'gof_point_size_metadata_present_flag,' 'gof_point_shape_metadata_present_flag,' 'frame_metadata_enabled_flag,' 'frame_scale_metadata_enabled_flag,' 'frame_offset_metadata_enabled_flag,' 'frame_rotation_metadata_enabled_flag,' 'frame_point_size_metadata_enabled_flag,' and 'frame_point_shape_metadata_enabled_flag" are included in the group of frames header semantics.

The syntax element 'gof_metadata_present_flag' of lines 31 and 33 of syntax 4, indicates whether gof-level metadata parameter set is signaled for the current GOF. If 'gof_metadata_present_flag' is equal to one (or true), indicates to the decoder 550 that gof-level metadata parameter set is signaled for the current GOF. Alternatively, if 'gof_metadata_present_flag,' is equal to zero (or false), indicates to the decoder 550 that gof-level metadata parameter set is not signaled for the current GOF. When the gof-level metadata parameter set is not signaled for the current GOF, the scale metadata parameters in the current GOF are assigned default values. For example, the default values can be the values from the next highest access level. In another example, the default values can be a predefined value, if the GOF access level is the highest defined access level. It is noted that if 'gof_metadata_present_flag' is not present in syntax 4, it is assumed to be zero.

Similarly, the syntax element 'gof_scale_metadata_present_flag' of lines 49 and 51 of syntax 4, indicates whether GOF-level scale metadata parameters are signaled for the current GOF. If 'gof_scale_metadata_present_flag' is equal to one (or true), indicates to the decoder 550 that GOF-level scale metadata parameters along x, y, and z axes are signaled for the current GOF. The syntax elements 'gof_scale_metadata_on_axis_x,' 'gof_scale_metadata_on_axis_y,' and 'gof_scale_metadata_on_axis_z' indicate the value of the GOF-level scale along the x axis, y axis, and z axis for the current GOF, respectively. If 'gof_scale_metadata_present_flag' is equal to zero (or false), indicates to the decoder 550 that GOF-level scale metadata parameters are not signaled for the current GOF. When the GOF-level scale metadata parameters are not signaled for the current GOF to the syntax elements 'gof_scale_metadata_on_axis_x,' 'gof_scale_metadata_on_axis_y,' and 'gof_scale_metadata_on_axis_z' are set to the default value, such as one. If 'gof_scale_metadata_present_flag' is not present is not present in syntax 4, it is assumed to be zero.

The syntax element 'gof_offset_metadata_enabled_flag', of line 58 of the syntax 4 indicates whether GOF-level offset metadata parameters are signaled for the current GOF. If 'gof_offset_metadata_present_flag' is equal to one (or true), indicates to the decoder 550 that GOF-level offset metadata parameters along x, y, and z axes are signaled for the current GOF. For example, 'gof_offset_metadata_on_axis_x,' 'gof_offset_metadata_on_axis_y,' and 'gof_offset_metadata_on_axis_z' indicate the value of the GOF-level offset along the x axis, y axis, and z axis for the current GOF, respectively. Alternatively, if 'gof_offset_metadata_present_flag' is equal to zero (or false), indicates to the decoder 550 that GOF-level offset metadata parameters are not signaled for the current GOF. When the GOF-level offset metadata parameters are not signaled for the current GOF, 'gof_offset_metadata_on_axis_x,' 'gof_offset_metadata_on_axis_y,' and 'gof_offset_metadata_on_axis_z' are set to a default value, such as zero. For example, the default values can be the values from the next highest access level. In another example, the default values can be a predefined value, if the GOF access level is the highest defined access level. If 'gof_offset_metadata_present_flag' is not present is not present in syntax 4, it is assumed to be zero.

The syntax element 'gof_rotation_metadata_enabled_flag' of lines 68 of syntax 4, indicates whether GOF-level rotation metadata parameters are signaled for the current GOF. If 'gof_rotation_metadata_present_flag' is equal to one (or true), indicates to the decoder 550 that GOF-level rotation metadata parameters along x, y, and z axes are signaled for the current GOF. Alternatively, if 'gof_rotation_metadata_present_flag' is equal to zero (or false), indicates that GOF-level rotation metadata parameters are not signaled for the current GOF. When the GOF-level rotation metadata parameters are not signaled for the current GOF the syntax elements 'gof_rotation_metadata_on_axis_x,' 'gof_rotation_metadata_on_axis_y,' and 'gof_rotation_metadata_on_axis_z' are set to the default value, such as zero. For example, the default value can be the values from the next highest access level. In another example, the default value can be a predefined value, if the GOF access level is the highest defined access level. It is noted that if 'gof_rotation_metadata_present_flag' is not present is not present in syntax 4, it is assumed to be zero.

Referring to the rotational metadata, the syntax element 'gof_rotation_metadata_on_axis_x' indicates the value of GOF-level rotation angle along the x axis for the current GOF, in units of $2^{-16}$ degrees. The value of 'gof_rotation_metadata_on_axis_x' range from $-180*2^{16}$ to $180*2^{16}-1$. Similarly, the syntax element 'gof_rotation_metadata_on_axis_y' indicates the value of GOF-level rotation angle along the y axis for the current GOF, in units of $2^{-16}$ degrees. The value of 'gof_rotation_metadata_on_axis_y' are range from $-180*2^{16}$ to $180*2^{16}-1$. Additionally, the syntax element 'gof_rotation_metadata_on_axis_z' indicates the value of GOF-level rotation angle along the z axis for the current GOF, in units of $2^{-16}$ degrees. The value of 'gof_rotation_metadata_on_axis_z' range from $-180*2^{16}$ to $180*2^{16}-1$. In certain embodiments, it is possible to send the rotation angle at a lower precision, such as $2^{-8}$.

The syntax element 'gof_point_size_metadata_present_flag' of lines 79 and 81 of syntax 4, indicates whether a GOF-level point size metadata parameter is signaled for the current GOF. If 'gof_point_size_metadata_present_flag' is equal to one (or true), indicates to the decoder 550 that a GOF-level point size metadata parameter is signaled for the current GOF. Alternatively, if 'gof_point_size_metadata_present_flag' is equal to zero (or false), indicates that a GOF-level point size metadata parameter is not signaled for the current GOF. When the GOF-level point size metadata parameter is not signaled, the gof_point_size_metadata is set to the default value, such as one. It is noted that if 'gof_point_size_metadata_present_flag' is not present is not present in syntax 4, it is assumed to be zero. Additionally the term 'gof_point_size_metadata' indicates the value of GOF-level point size for the current GOF Similarly, the syntax element 'gof_point_shape_metadata_present_flag' of line 87 of syntax 4 indicates whether a GOF-level point shape metadata parameter is signaled for the current GOF. If 'gof_point_shape_metadata_present_flag' is equal to one (or true), indicates that a GOF-level point shape metadata parameter is signaled for the current GOF. Alternatively, if 'gof_point_shape_metadata_present_flag' is equal to zero (or false), indicates that a GOF-level point shape metadata parameter is not signaled for the current GOF. When the GOF-level point shape metadata parameter is not signaled 'gof_point_shape_metadata' is set to the default value, such as zero. For example, the default value can be the value from the next highest access level. In another example, the default value can be a predefined value, if the GOF access level is the highest defined access level. It is noted that if 'gof_point_shape_metadata_present_flag' is not present is not present in syntax 4, it is assumed to be zero. Additionally, the syntax element 'gof_point_shape_metadata' indicates the value of GOF-level point shape for the current GOF. The value of the GOF-level point shape for the current GOF can be identified similar to that of Table 1, above.

The syntax element 'frame_metadata_enabled_flag' of line 105 of syntax 3 indicates whether frame-level metadata parameter set is signaled in the bitstream. If 'frame_metadata_enabled_flag' equal to one (or true), indicates to the decoder 550 that frame-level metadata parameter set may be signaled for some frames. Alternatively, if 'frame_metadata_enabled_flag' is equal to zero (or false), indicates that frame-level metadata parameter set is not signaled, so metadata parameters in the frame level are assigned corresponding values from the GOF level.

The syntax element 'frame_scale_metadata_enabled_flag' of lines 38 and 152 of syntax 4 indicates whether frame-level scale metadata parameters are signaled in the bitstream. If 'frame_scale_metadata_enabled_flag' is equal to one (or true), indicates that frame-level scale metadata parameters may be signaled for some frames. Alternatively, if 'frame_scale_metadata_enabled_flag' is equal to zero (or false), indicates that frame-level scale metadata parameters are not signaled. If the frame-level scale metadata parameters are not signaled, the scale metadata parameters in the frame level are assigned to a corresponding values from the GOF level. It is noted that if 'frame_scale_metadata_enabled_flag' is not present in syntax 4, it is assumed to be zero.

Similarly, the syntax element 'frame_offset_metadata_enabled_flag' of lines 39 and 162 of syntax 4, indicates whether frame-level offset metadata parameters are signaled in the bitstream. If 'frame_offset_metadata_enabled_flag' is equal to one (or true), indicates to the decoder 550 that frame-level offset metadata parameters may be signaled for some frames. Alternatively, if 'frame_offset_metadata_enabled_flag' is equal to zero (or false), indicates that frame-level offset metadata parameters are not signaled. If the frame-level offset metadata parameters are not signaled then the offset metadata parameters in the frame level are assigned corresponding values from the GOF level. It is noted that if 'frame_offset_metadata_enabled_flag' is not present in syntax 4, it is assumed to be zero.

Similarly, the syntax element 'frame_rotation_metadata_enabled_flag' of lines 40 and 172 of syntax 4, indicates whether frame-level rotation metadata parameters are signaled in the bitstream. If 'frame_rotation_metadata_enabled_flag' is equal to one (or true), indicates that frame-level rotation metadata parameters may be signaled for some frames. Alternatively, if 'frame_rotation_metadata_enabled_flag' is equal to zero (or false), indicates that frame-level rotation metadata parameters are not signaled. If the frame-level rotation metadata parameters are not signaled, then the rotation metadata parameters in the frame level are assigned corresponding values from the GOF level. It is noted that if 'frame_rotation_metadata_enabled_flag is not present in syntax 4, it is assumed to be zero.

Additionally, the syntax element 'frame_point_size_metadata_enabled_flag' of lines 41 and 182 of syntax 3, indicates whether a frame-level point size metadata parameter is signaled in the bitstream. If 'frame_point_size_metadata_enabled_flag' is equal to one (or true), indicates that a frame-level point size metadata parameter may be signaled for some frames. Alternatively, if the 'frame_point_size_metadata_enabled_flag' is equal to zero (or false), indicates that a frame-level point size metadata parameter is not signaled. If a frame-level point size metadata parameter is not signaled, then the point size metadata parameter in the frame level is assigned a corresponding value from the GOF level. If 'frame_point_size_metadata_enabled_flag' is not present in syntax 4, it is assumed to be zero.

Further, the syntax element 'frame_point_shape_metadata_enabled_flag' indicates whether a frame-level point shape metadata parameter is signaled in the bitstream. If 'frame_point_shape_metadata_enabled_flag' is equal to one (or true), indicates to the decoder 550 that a frame-level point shape metadata parameter may be signaled for some frames. Alternatively, if 'frame_point_shape_metadata_enabled_flag is equal to zero (or false), indicates that a frame-level point shape metadata parameter is not signaled. If a frame-level point shape metadata parameter is not signaled, then the point shape metadata parameter in the frame level is assigned to a corresponding value in the GOF level. It is noted that if 'frame_point_shape_metadata_enabled_flag' is not present in syntax 4, it is assumed to be zero.

Referring to syntax 4 above, the syntax elements 'frame_metadata_present_flag,' 'frame_scale_metadata_present_flag,' 'frame_offset_metadata_enabled_flag,' 'frame_rotation_metadata_enabled_flag,' 'frame_point_size_metadata_present_flag,' 'frame_point_shape_metadata_present_flag, 'patch_metadata_enabled_flag' 'patch_scale_metadata_enabled_flag' 'patch_offset_metadata_enabled_flag' 'patch_rotation_metadata_enabled_flag' 'patch_point_size_metadata_enabled_flag,' and 'patch_point_shape_metadata_enabled_flag' are included in the group of frames auxiliary information semantics. These elements are specified one per group of frames.

For example, the syntax element 'frame_metadata_present_flag' of lines 106 and 108 of syntax 4 indicates whether frame-level metadata parameter set is signaled for the current frame. If 'frame_metadata_present_flag' is equal to one (or true), indicates to the decoder 550 that frame-level metadata parameter set is signaled for the current frame. Alternatively, if 'frame_metadata_present_flag' is equal to zero (or false), indicates that frame-level metadata parameter set is not signaled for the current frame. When the frame-level metadata parameter set is not signaled for the current frame, the scale metadata parameters in the current frame are assigned corresponding values from the GOF level. If 'frame_metadata_present_flag' is not present in syntax 4, it is assumed to be zero.

Similarly, the syntax element 'frame_scale_metadata_present_flag' of lines 153 and 155 of syntax 4 indicates whether frame-level scale metadata parameters are signaled for the current frame. If 'frame_scale_metadata_present_flag' is equal to one (or true), indicates to the decoder 550 that that frame-level scale metadata parameters along x, y, and z axes are signaled for the current frame. For example, the syntax elements 'frame_scale_metadata_on_axis_x,' 'frame_scale_metadata_on_axis_y,' and 'frame_scale_metadata_on_axis_z,' indicate the value of the frame-level scale along the x axis, y axis, and z axis for the current frame, respectively. Alternatively, if 'frame_scale_metadata_present_flag' is equal to zero (or false), indicates that frame-level scale metadata parameters are not signaled for the current frame, so 'frame_scale_metadata_on_axis_x,' 'frame_scale_metadata_on_axis_y,' and 'frame_scale_metadata_on_axis_z' are set to the default value, such as one. It is noted that if 'frame_scale_metadata_present_flag' is not present in syntax 4, it is assumed to be zero.

The syntax element 'frame_offset_metadata_enabled_flag' of line 162 through line 171 of syntax 4 indicates whether frame-level offset metadata parameters are signaled for the current frame. The syntax elements of 'frame_offset_metadata_on_axis_x,' 'frame_offset_metadata_on_axis_y,' and 'frame_offset_metadata_on_axis_z' indicate the values of the frame-level offset along the x axis, y axis, and z axis for the current frame. If 'frame_offset_metadata_present_flag' is equal to one (or true), indicates to the decoder 550 that frame-level offset metadata parameters along x, y, and z axes are signaled for the current frame. Alternatively, if 'frame_offset_metadata_present_flag' is equal to zero (or false), indicates that frame-level offset metadata parameters are not signaled for the current frame. It is noted that if the frame-level offset metadata parameters are not signaled for the current frame, then the 'frame_offset_metadata_on_axis_x,' 'frame_offset_metadata_on_axis_y,' and 'frame_offset_metadata_on_axis_z' are set to the default value, such as zero. For example, the default value can be the values from the next highest access level, such as the GOF access level. In another example, the default value can be a predefined value, if the frame access level is the highest defined access level. If 'frame_offset_metadata_present_flag' is not present in syntax 4, it is assumed to be zero.

The syntax element 'frame_rotation_metadata_enabled_flag' of line 172 of syntax 4 indicates whether frame-level rotation metadata parameters are signaled for the current frame. If 'frame_rotation_metadata_present_flag' equal to one (or true), indicates that frame-level rotation metadata parameters along x, y, and z axes are signaled for the current frame. Alternatively, if 'frame_rotation_metadata_present_flag' is equal to zero (or false), indicates, that frame-level rotation metadata parameters are not signaled for the current frame are not signaled for the current frame. When the frame-level rotation metadata parameters are not signaled 'frame_rotation_metadata_on_axis_x,' 'frame_rotation_metadata_on_axis_y,' and 'frame_rotation_metadata_on_axis_z' are set to the default value, such as zero. For example, the default value can be the values from the next highest access level, such as the GOF access level. In another example, the default value can be a predefined value, if the frame access level is the highest defined access level. It is noted that if 'frame_rotation_metadata_present_flag' is not present in syntax 4, it is assumed to be zero.

Referring to the frame rotational metadata, the syntax element 'frame_rotation_metadata_on_axis_x' indicates the value of frame-level rotation angle along the x axis for the current frame, in units of $2^{-16}$ degrees. Similarly, 'frame_rotation_metadata_on_axis_y' indicates the value of frame-level rotation angle along the y axis for the current frame, in units of $2^{-16}$ degrees. Additionally, 'frame_rotation_metadata_on_axis_z' indicates the value of frame-level rotation angle along the z axis for the current frame, in units of $2^{-16}$ degrees. The value of 'frame_rotation_metadata_on_axis_x,' 'frame_rotation_metadata_on_axis_y,' and 'frame_rotation_metadata_on_axis_z' range from $-180*2^{16}$ to $180*2^{16}-1$.

The syntax element 'frame_point_size_metadata_present_flag' of lines 183 of syntax 4 indicates whether a frame-level point size metadata parameter is signaled for the current frame. If 'frame_point_size_metadata_present_flag' is equal to one (or true), indicates to the decoder 550 that a frame-level point size metadata parameter is signaled for the current frame. Alternatively, if 'frame_point_size_metadata_present_flag' is equal to zero (or false), indicates that a frame-level point size metadata parameter is not signaled for the current frame. When the frame-level point size metadata parameter is not signaled for the current frame the 'frame_point_size_metadata' is set to the default value, such as one. It is noted that if 'frame_point_size_metadata_present_flag' is not present in syntax 4, the term is assumed to be zero. Additionally, 'frame_point_size_metadata' of line 186 of syntax 4, indicates the value of frame-level point size for the current frame.

Further, the syntax element 'frame_point_shape_metadata_present_flag' of line 191 of syntax 4, indicates whether a frame-level point shape metadata parameter is signaled for the current frame. If 'frame_point_shape_metadata_present_flag' is equal to one (or true), indicates to the decoder 550 that a frame-level point shape metadata parameter is signaled for the current frame. Alternatively if 'frame_point_shape_metadata_present_flag' is equal to zero (or false), indicates that a frame-level point shape metadata parameter is not signaled for the current frame If a frame-level point shape metadata parameter is not signaled for the current frame, the syntax element 'frame_point_shape_metadata' is set to the default value, such as zero. For example, the default value can be the values from the next highest access level, such as the GOF access level. In another example, the default value can be a predefined value, if the frame access level is the highest defined access level. It is noted that if 'frame_point_shape_metadata_present_flag' is not present in syntax 4, it is assumed to be zero. Additionally the syntax element 'frame_point_shape_metadata' indicates the value of frame-level point shape for the current frame. The value of frame-level point shape for the current frame can be identified similar to that of Table 1, above.

The syntax element 'patch_metadata_enabled_flag' of lines 110 and 112 of syntax 4 indicates whether patch-level metadata parameter set is signaled in the bitstream. If 'patch_metadata_enabled_flag' is equal to one (or true), indicates to the decoder 550 that patch-level metadata parameter set may be signaled for some patches. Alternatively, patch_metadata_enabled_flag is equal to zero (or false), indicates that patch-level metadata parameter set is not signaled. When the patch-level metadata parameter set is not signaled, the metadata parameters in the patch level are assigned corresponding values from the frame level.

Further, the syntax element 'patch_scale_metadata_enabled_flag' of lines 113 and 200 of syntax 4 indicates whether patch-level scale metadata parameters are signaled in the bitstream. If 'patch_scale_metadata_enabled_flag' is equal to one (or true), indicates to the decoder 550 that patch-level scale metadata parameters may be signaled for some patches. Alternatively, if 'patch_scale_metadata_enabled_flag' is equal to zero (or false), indicates that patch-level scale metadata parameters are not signaled. If the patch-level scale metadata parameters are not signaled the scale metadata parameters in the patch level are assigned corresponding values from the GOF level. It is noted that if 'patch_scale_metadata_enabled_flag' is not present, the it is assumed to be zero.

The syntax element 'patch_offset_metadata_enabled_flag' of lines 114 and 210 of syntax 4 indicates whether patch-level offset metadata parameters are signaled in the bitstream. If 'patch_offset_metadata_enabled_flag' is equal to one (or true), indicates to the decoder 550 that patch-level offset metadata parameters may be signaled for some patches. Alternatively, if 'patch_offset_metadata_enabled_flag' is equal to zero (or false), indicates that patch-level offset metadata parameters are not signaled. If the patch-level offset metadata parameters are not signaled, the offset metadata parameters in the patch level are assigned corresponding values in the frame level. It is noted that if 'patch_offset_metadata_enabled_flag' is not present in syntax 4, it is assumed to be zero.

Similarly, the syntax element 'patch_rotation_metadata_enabled_flag' of lines 115 and 220 of syntax 4 indicates whether patch-level rotation metadata parameters are signaled in the bitstream. If 'patch_rotation_metadata_enabled_flag' is equal to one (or true), indicates to the decoder 550 that patch-level rotation metadata parameters may be signaled for some patches. Alternatively, if 'patch_rotation_metadata_enabled_flag' is equal to zero (or false), indicates that patch-level rotation metadata parameters are not signaled. If the patch-level rotation metadata parameters are not signaled, the rotation metadata parameters in the patch level are assigned corresponding values of the frame level. It is noted that if 'patch_rotation_metadata_enabled_flag' is not present in syntax 4, it is assumed to be zero.

The syntax element 'patch_point_size_metadata_enabled_flag' of lines 116 and 230 of syntax 4 indicates whether a patch-level point size metadata parameter is signaled in the bitstream. If 'patch_point_size_metadata_enabled_flag' is equal to one (or true), indicates that a patch-level point size metadata parameter may be signaled for some patches. Alternatively, if 'patch_point_size_metadata_enabled_flag' is equal to zero (or false), indicates that a patch-level point size metadata parameter is not signaled. If the patch-level point size metadata parameter is not signaled, then the point size metadata parameter in the patch level is assigned a corresponding value of the frame level. It is noted that if 'patch_point_size_metadata_enabled_flag' is not present in syntax 4, it is assumed to be zero.

Additionally, the syntax element 'patch_point_shape_metadata_enabled_flag' of lines 117 and 238 of syntax 4 indicates whether a patch-level point shape metadata parameter is signaled in the bitstream. If 'patch_point_shape_metadata_enabled_flag' is equal to one (or true), indicates to the decoder 550 that a patch-level point shape metadata parameter may be signaled for some patches. Alternatively, if 'patch_point_shape_metadata_enabled_flag' is equal to zero (or false), indicates that a patch-level point shape metadata parameter is not signaled. If a patch-level point shape metadata parameter is not signaled, the point shape metadata parameter in the patch level is assigned a corresponding value from the frame level. It is noted that if 'patch_point_shape_metadata_enabled_flag' is not present in syntax 4, it is assumed to be zero.

Referring to syntax 4 above, the syntax elements 'patch_metadata_present_flag,' 'patch_scale_metadata_present_flag,' 'patch_offset_metadata_enabled_flag,' 'patch_rotation_metadata_enabled_flag,' 'patch_point_size_metadata_present_flag,' and 'patch_point_shape_metadata_present_flag,' are specified once per patch.

For example, the syntax element 'patch_metadata_present_flag' of lines 132 and 134 of syntax 4, indicates whether patch-level metadata parameter set is signaled for the current patch. If 'patch_metadata_present_flag' is equal to one (or true), indicates to the decoder 550 that patch-level metadata parameter set is signaled for the current patch. Alternatively, if 'patch_metadata_present_flag' is equal to zero (or false), indicates that patch-level metadata parameter set is not signaled for the current patch. If the patch-level metadata parameter set is not signaled for the current patch the scale metadata parameters in the current patch are assigned corresponding values from the frame level. It is noted that if 'patch_metadata_present_flag' is not present in syntax 4, it is assumed to be zero.

The syntax element 'patch_scale_metadata_present_flag' of lines of syntax 4 indicates whether patch-level scale metadata parameters are signaled for the current patch. If 'patch_scale_metadata_present_flag' is equal to one (or true), indicates that patch-level scale metadata parameters along x, y, and z axes are signaled for the current patch. Alternatively, if 'patch_scale_metadata_present_flag' is equal to zero (or false), indicates that patch-level scale metadata parameters are not signaled for the current patch, so 'patch_scale_metadata_on_axis_x,' 'patch_scale_metadata_on_axis_y,' and 'patch_scale_metadata_on_axis_z' are set to a default value, such as one. It is noted that if 'patch_scale_metadata_present_flag' is not present in syntax 4, it is assumed to be zero. Further, the syntax elements 'patch_scale_metadata_on_axis_x,' 'patch_scale_metadata_on_axis_y,' and 'patch_scale_metadata_on_axis_z,' indicate the values of the patch-level scale along the x axis, y axis, and axis for the current patch, respectively.

Additionally, the syntax element 'patch_offset_metadata_enabled_flag' of lines 114 and 210 of syntax 4 indicate whether patch-level offset metadata parameters are signaled for the current patch. If 'patch_offset_metadata_present_flag' is equal to one (or true), indicates to the decoder 550 that patch-level offset metadata parameters along x, y, and z axes are signaled for the current patch. Alternatively, if the 'patch_offset_metadata_present_flag' is equal to zero (or false), indicates that patch-level offset metadata parameters are not signaled for the current patch, so patch_offset_metadata_on_axis_x, patch_offset_metadata_on_axis_y, and patch_offset_metadata_on_axis_z are set to the default value, such as zero. For example, the default value can be the values from the next highest access level, such as the frame access level. In another example, the default value can be a predefined value, if the patch access level is the highest defined access level. It is noted that if 'patch_offset_metadata_present_flag' is not present in syntax 4, it is assumed to be zero. The syntax elements, 'patch_offset_metadata_on_axis_x,' 'patch_offset_metadata_on_axis_y,' and 'patch_offset_metadata_on_axis_z,' indicate the values of the patch-level offset along the x axis, y axis, and z axis for the current patch, respectively.

Further the syntax element 'patch_rotation_metadata_enabled_flag' of lines 115, and 220 of syntax 4 indicate whether patch-level rotation metadata parameters are signaled for the current patch. If 'patch_rotation_metadata_present_flag' is equal to one (or true), indicates to the decoder 550 that patch-level rotation metadata parameters along x, y, and z axes are signaled for the current patch. Alternatively, if 'patch_rotation_metadata_present_flag' is equal to zero (or false), indicates that patch-level rotation metadata parameters are not signaled for the current patch. If the patch-level rotation metadata parameters are not signaled for the current patch, then the 'patch_rotation_metadata_on_axis_x,' 'patch_rotation_metadata_on_axis_y,' and 'patch_rotation_metadata_on_axis_z' are set to the default value, such as zero. For example, the default value can be the values from the next highest access level, such as the frame access level. In another example, the default value can be a predefined value, if the patch access level is the highest defined access level. It is noted that if 'patch_rotation_metadata_present_flag' is not present in syntax 4, it is assumed to be zero.

Referring to the rotational metadata, the syntax element 'patch_rotation_metadata_on_axis_x' indicates the value of patch-level rotation angle along the x axis for the current patch, in units of $2^{-16}$ degrees. Similarly, the syntax element 'patch_rotation_metadata_on_axis_y' indicates the value of patch-level rotation angle along the y axis for the current patch, in units of $2^{-16}$ degrees. Further, the syntax element 'patch_rotation_metadata_on_axis_z' indicates the value of patch-level rotation angle along the z axis for the current patch, in units of $2^{-16}$ degrees. The value of 'patch_rotation_metadata_on_axis_x', 'patch_rotation_metadata_on_axis_y,' and 'patch_rotation_metadata_on_axis_z' range from $-180*2^{16}$ to $180*216^{-1}$.

The syntax element 'patch_point_size_metadata_present_flag' of lines 231 and 233 of syntax 4 indicates whether a patch-level point size metadata parameter is signaled for the current patch. For example, if 'patch_point_size_metadata_present_flag' is equal to one (or true), indicates to the decoder 550 that a patch-level point size metadata parameter is signaled for the current patch. Alternatively, if 'patch_point_size_metadata_present_flag' is equal to zero (or false), indicates that a patch-level point size metadata parameter is not signaled for the current patch. If a patch-level point size metadata parameter is not signaled for the current patch, then patch_point_size_metadata is set to the default value, such as one. It is noted that if 'patch_point_size_metadata_present_flag' is not present in syntax 4, it is assumed to be zero. The syntax element 'patch_point_size_metadata' indicates a value of patch-level point size for the current patch.

Finally the syntax element 'patch_point_shape_metadata_present_flag' of lines 239 and 241 of syntax 4 indicate whether a patch-level point shape metadata parameter is signaled for the current patch. For example, if 'patch_point_shape_metadata_present_flag' is equal to one (or true), indicates to the decoder 550 that a patch-level point shape metadata parameter is signaled for the current patch. Alternatively, if 'patch_point_shape_metadata_present_flag' is equal to zero (or false), indicates that a patch-level point shape metadata parameter is not signaled for the current patch. If a patch-level point shape metadata parameter is not signaled for the current patch, then the 'patch_point_shape_metadata' is set to the default value, such as zero. For example, the default value can be the values from the next highest access level, such as the frame access level. In another example, the default value can be a predefined value, if the patch access level is the highest defined access level. It is noted that if the syntax element 'patch_point_shape_metadata_present_flag' is not present in syntax 4, it is assumed to be zero. Additionally, the syntax element 'patch_point_shape_metadata' indicates the value of patch-level point shape for the current patch. The value of patch-level point shape for the current patch can be identified similar to that of Table 1, above.

In certain embodiments, at the highest access level, only the present flag is signaled and the enabling flag is not signaled. In certain embodiments, at the highest access level, enabling flag is assumed to be one (or true).

The types of metadata, such as the scale, offset, rotation, point size, and point shape can modify how the decoder 550 reconstructs the 3-D point cloud 502. In particular, the metadata can (i) modify a point cloud that was sparse, (ii) perform a progressive scaling, indicate an ROI and modify a portion of the point cloud as the indicated ROI differently than the rest of the point cloud, as well as (iii) perform adaptive point size and shape rendering to reduce or remove holes in the point cloud, when the decoder 550 reconstructs the point cloud.

In certain embodiments, the after projecting and mapping the points of the point cloud onto the 2-D frame, the points can be sorted and packed in the 2-D frame. The frame packing 512 sorts and packs the points within a patch.

The frame packing 512 sorts and packs the patches into the one or more geometry frames 514 and the one or more texture frames 518. In certain embodiments, the patch generator generates one or more occupancy maps and the frame packing 512 packs the occupancy maps onto one or more occupancy map frames 522 with the one or more occupancy map frames 522 corresponding to the one or more geometry frames 514 and the one or more texture frames 518. The geometry and texture information corresponding to the patches generated by the patch generator 504 are packed into separate video frames, such as the one or more geometry frames 514 and the one or more texture frames 518. In certain embodiments, the frame packing 512 creates the one or more geometry frames 514 and the one or more texture frames 518. The frame packing 512 can determine the height and width of the frames based on how the patches are arranged and packed into a frame. In certain embodiments, the patches included in a single frame are arranged to occupy minimum space in a frame. That is, the size of the frame is determined based on the location of each patch, within the frame. Therefore, the frame is the smallest possible size based on how the patches are oriented and positioned within the frame, under the constraint that the frame size is constant at least for each GOF. In certain embodiments, the frame size is also constant for each video sequence.

The occupancy map frames 522 represents an occupancy map that indicates the pixel location in the frames (such as the one or more geometry frames 514 and the one or more texture frames 518) that contain valid points of the point cloud that are projected or mapped onto the respective frames. For example, the occupancy map frames 522 indicates whether each pixel on each frame (such as the one or more geometry frames 514 and the one or more texture frames 518) is a valid pixel or blank. A valid pixel on the occupancy map indicates a pixel on the 2-D frame that corresponds to a 3-D point in the point cloud. In certain embodiments, the occupancy map, included in the occupancy map frames 522, can be the same for each frame, which is similar to the one or more geometry frames 514 and the one or more texture frames 518. In certain embodiments, the occupancy map frames 522 represents multiple occupancy maps, where each occupancy map corresponds to a single frame (such as the one or more geometry frames 514 and the one or more texture frames 518). In certain embodiments, the occupancy map frames 522 can be transmitted as metadata as a separate bitstream.

The one or more geometry frames 514 and the one or more texture frames 518 are encoded via encoding engine 516 and the encoding engine 520, respectively. The encoding engine 524 also encodes the occupancy map frames 522. In certain embodiments, the auxiliary information 506 is encoded by another encoding engine. The encoding engines 516, 520, and 524 can be separate encoding engines or the same encoding engine. For example, encoding engines 516, 520, and 524 are the same component, such that the one or more geometry frames 514, the one or more texture frames 518, and the one or more occupancy map frames are encoded by the same encoding engine. In certain embodiments, the encoding engines 516, 520, and 524 can be configured to support either a 8-bit, a 10-bit, a 12-bit, a 14-bit, or a 16-bit, precision of data. The encoding engines 516, 520, and 524 can be a video or image codec such as HEVC, AVC, VP9, VP8, JVNET, and the like can be used to compress the 2-D frames representing the 3-D point cloud.

The auxiliary information 506, the encoded one or more geometry frames 514, the encoded one or more texture frames 518, and the encoded one or more occupancy map frames 522 are multiplexed via multiplexer 526. The multiplexer 526 combines the auxiliary information 506, the encoded one or more geometry frames 514, the encoded one or more texture frames 518, and the encoded one or more occupancy map frames 522 to create a single encoded bitstream 528. In certain embodiments, the encoding engine 516, the encoding engine 520, and the encoding engine 524 are a single encoding engine.

The encoding engines 516, 520, and 522 can include lossy point cloud compression or lossless point cloud compression. If lossy point cloud is used, the occupancy map frames 522 are included in the bitstream and transmitted to the decoder (such as the decoder 550). The decoder 550 uses the occupancy map frames 522 to identify valid points in each frame, such as the one or more geometry frames 514 and the one or more texture frames 518. If lossless compression is used to compress the frames (such as the one or more geometry frames 514) the decoder 550 can derive the valid points directly from the one or more geometry frames 514. For example, the decoder 550 can use the one or more geometry frames 514 in a similar manner as it would the occupancy map included in the occupancy map frames 522. As a result, the occupancy map frames 522 can be omitted from the bitstream to improve the compression ratio. For instance, the patch generator 504, and the frame packing 512 do not create the occupancy map frames 522 and therefore the multiplexer 526 does not multiplex the occupancy map frames 522 with the encoded one or more geometry frames 514 (from the encoding engine 516), the encoded one or more texture frames 518 (from the encoding engine 520) and the auxiliary information 506.

Equation 1 above addresses an orthogonal projection. In certain embodiments, the 3-D point cloud 502 is sparse, such that there are holes within the point cloud. A sparse point cloud occurs when the points or pixels are not densely populated within the point cloud. Holes in a point cloud can deteriorate the compression performance of the encoding engines 516, 520, and 524. A non-orthogonal projection with scaling can subsample the point cloud effectively condensing the point cloud itself. For example, g(y, z) is a geometry frame (such as one of the geometry frames 514). An example non-orthogonal projection of a point $p_n = \langle x_n, y_n, z_n \rangle$ on the geometry frame (y, z) plane is given by the following equation.

$$G(\langle y_n/\text{scale\_fractor\_y} + \text{offset\_y}, z_n/\text{scale\_fractor\_z} + \text{offset\_z}\rangle) = x_n/\text{scale\_fractor\_x} \qquad \text{Equation 2:}$$

In Equation 2, 'scale_fractor_y,' 'scale_fractor_z,' and 'scale_fractor_x' denote the scaling factors used to scale the geometry coordinates in the projection of the 3-D point cloud 502 onto the 2-D frames (such as the geometry frames 514). The 'offset_y,' 'offset_z,' and 'offset_x' denote the location in the image where the projection patch is stored. It is noted, that projections on other planes, such as the (X, Z), (X, Y) or an arbitrary plan can be similarly defined. In certain embodiments, the offsets for patch locations in the frames are zero unless a specific offset value is identified in the equations, or metadata. The equations and metadata that indicate the scaling or offset can be included auxiliary information 506. In certain embodiments, if the scale factor is set to '2' then the 3-D point cloud is subsampled by a factor of eight. For example, if an original point cloud is represented by a 1024, 1024, 1024 voxel cube and is then subsampled by a factor of 4, then the subsampled point cloud is represented by 512, 512, 512 voxel cube.

In certain embodiments, scale factors are encoded as metadata and transmitted to a receiver that includes a decoder (such as the decoder 550). The one or more scale factors can be transmitted to the decoder without losing generality. In certain embodiments, the scale factors can have the same value for all coordinates. For example, the scale factor for the x-coordinate is the same as the scale factor for the y-coordinate, which is the same as the scale factor for the z-coordinate. In certain embodiments, the scale factors can have different values for each coordinate. For example, the scale factor for the x-coordinate is different than the scale factor for the y-coordinate, which is different than the scale factor for the z-coordinate. Example syntax is provided below to illustrate the scale factor metadata.

Syntax 5:

```
if(flag_single_scale_factor)
  float scale_factor;
else
  float scale_factor_x;
  float scale_factor_y;
  float scale_factor_z;
end
```

Syntax 5 illustrates the application of a scale factor to points of a 3-D point cloud, such as the 3-D point cloud 502. The term 'single_scale_factor' is flag that indicates whether the same scale factor is used for all geometry coordinates. The term 'scale_factor' indicates a common scale factor that is used for all geometry coordinates. The term 'scale_factor_x' is the common scale factor for 'x' geometry coordinates. Similarly, the term 'scale_factor_y' is the common scale factor for 'y' geometry coordinates. Additionally, the term 'scale_factor_z' is the common scale factor for 'z' geometry coordinates. In certain embodiments, the scale factors can be transmitted once per point cloud, once per 2-D frame (such as one of the geometry frames 514, once per region of a 2-D frame (such as one of the geometry frames 514), or once per patch (that is included in one of the geometry frames 514).

In certain embodiments, the point density within a point cloud can be varied by controlling the scale factor at particular different patches, or particular regions of the point cloud. For example, a face or hands of a humanoid point cloud can be coded with higher point cloud density (such as resolution) where another body part (such as an arm or a leg) can be coded with a lower point cloud density (such as resolution).

To scale a portion of a 3-D point cloud by a scaling factor, the encoder 500 can include in the compressed bitstream a list of scale factors. For example, the list of scale factors can be included in the auxiliary information 506. In another example, the list of scale factors can be included in the encoded bitstream 528 by the multiplexer 526. For every patch, an index into the list of scale factors can be used. The index can be used to signal the scale factors to use the points in the patch. Equation 3 below illustrates a non-orthogonal transform to scale a portion of a 3-D point cloud.

$$\begin{bmatrix} x'_n \\ y'_n \\ z'_n \\ h'_n \end{bmatrix} = \begin{bmatrix} a & b & c & d \\ e & f & g & h \\ i & j & k & l \\ m & n & o & p \end{bmatrix} \begin{bmatrix} x_n \\ y_n \\ z_n \\ 1 \end{bmatrix} \qquad \text{Equation 3}$$

Equation 3, above, illustrates an example matrix of applying a scaling factor in a non-orthogonal transform. The point identified by the coordinate $(x_n, y_n, z_n)$ represent the X, Y, and Z coordinates of the point 'n' of the 3-D point cloud 502 in 3-D space. The corresponding projected values are indicated by $(x'_n, y'_n, z'_n)$. Therefore $x'_n = g(y'_n, z'_n)$ indicates the geometry coordinate information as encoded in a frame, such as the geometry frames 514. It is noted, that projections on other planes such as $z'_n = g(x'_n, y'_n)$ or $y'n = g(x'_n, z'_n)$. The decoder (such as the decoder 550, discussed in greater detail below) extracts from the video frame to obtain the $(x_n, y_n, z_n)$ coordinates of the point in 3-D space. In certain embodiments, a matrix, similar to that of equation 3, can be used to apply the metadata to a certain portion of the point cloud. For example, the scaling metadata can be applied to one portion of the point cloud, but not the entirety of the point cloud.

In certain embodiments, the point attribute information is stored in a co-located location. The co-located location corresponds to the projection location of the geometry coordinates in another video frame. For example, the color coordinate that corresponds to the point $(x_n, y_n, z_n)$ can be stored in a frame f, when $x'_n = g(y'_n, z'_n)$. For instance, the red component of the point in the point cloud can be represented by $f(y'_n, z'_n, 1)$. Similarly, the blue component of the point in the point cloud can be represented by $f(y'_n, z'_n, 2)$, and the green component of the point in the point cloud can be represented by $f(y'_n, z'_n, 3)$. In certain embodiments, the point attribute information is stored with a spatial offset in the same frame, such as one of the geometry frames 514.

Non-orthogonal projections can scale a portion of a 3-D point cloud, such as the 3-D point cloud 502. For example, ROI coding, progressive or scaling coding, coding a sparse point clouds and the like can use non-orthogonal projections. Region of interest coding is described in greater detail below with respect to FIG. 9. Progressive or scaling coding is described in greater detail below with respect to FIG. 8. Coding a sparse point clouds is described in greater detail below with respect to FIGS. 7B and 7C.

The decoder 550 illustrates a high-level overview of an embodiment of the present disclosure of an electronic device that decodes and reconstructs a point cloud for rendering. In certain embodiments, the decoder extracts the compressed geometry and attributes from the encoded bitstream 528. In certain embodiments, the decoder 550 maps the geometry and attribute to generate the 3-D point cloud 502. The decoder 550 includes a demultiplexer 552, a decoding engine 554, decoded geometry frames 556, decoded texture frames 558, decoded occupancy map frames 560, auxiliary information 562, and a reconstruction engine 564. In certain embodiments, the decoder 650 includes two or more decoding engines 554. The one or more geometry frames 514 of the encoder 500 are the decoded geometry frames 556 of the decoder 550. Similarly, the one or more texture frames 518 of the encoder 500 are the decoded texture frames 558 of the decoder 550. Additionally the one or more occupancy map frames 522 of the encoder 500 are the decoded occupancy map frames 560 of the decoder 550. The auxiliary information 506 of the encoder 500 is the auxiliary information 562 of the decoder 550.

The decoder 550 uses information within the patches of the various frames (such as the one or more geometry frames 514, the one or more texture frames 518, the one or more occupancy map frames 522), and the auxiliary information 506, to reconstruct the 3-D point cloud. The decoder 550 receives the encoded bitstream 528 that originated from the encoder 500. Upon receiving the encoded bitstream 528, the demultiplexer 552 separates various streams of data from the encoded bitstream 528. For example, the demultiplexer 552 separates various streams of data such as the geometry frame information, texture frame information, and the occupancy map information, and the auxiliary information 562. The decoding engine 554 decodes the geometry frame information to generate the decoded geometry frames 556. Similarly, the decoding engine 554 decodes the texture frame information to generate the decoded texture frames 558. In certain embodiments, there are separate decoding engines for each set of information included in the encoded bitstream 528. For example, separate, parallel decoding engines similar to the decoding engine 554, can process each received stream. The decoding engine 554 decompresses the various data streams. In certain embodiments, decoding engine 554 can be lossless or lossy. In certain embodiments, the decoding engine 554 can reconstruct the signal from the lossy or losslessly encoded bitstream 528.

The auxiliary information 562 includes the metadata such as the (i) scale, (ii) offset, (iii) rotation, (iv) point size, (v) point shape, and the like. The auxiliary information 562 can also include one or more flags (such as the flags 508) that indicate where the metadata is to be applied with respect to reconstructing the 3-D point cloud. In certain embodiments, the auxiliary information 562 can include metadata and a technique for signaling when to apply the metadata. For example, the metadata can be signaled using (i) single control flag (such as flag 508), (ii) two flags (such as flag 508) such as the enabling flag and the present flag, (iii) absolute singling by reusing previously signaled metadata, (iv) and conditional singling by reusing previously signaled metadata, and (v) and reusing previously signaled metadata with a reference identification.

The reconstruction engine 564, reconstructs the 3-D point cloud based on the data received from the various frames (the geometry frames 556, the texture frames 558, the occupancy map frames 560) and the auxiliary information. The 3-D point cloud 502 points is reconstructed from points included in the patches of the geometry frames 556 and texture frames 558. The patches included in each frame (the geometry frames 556 and texture frames 558) from decoded auxiliary patch information 670) can be modified based on the metadata included in the auxiliary information 562. The reconstruction engine 564 determines where to apply the each type of metadata based on the flag. For example, the flag can signal which metadata and when the metadata is applied to certain portions of the patches or frames.

As discussed above with respect to flag 508, the flag can include two flags an enabling flag and a present flag associated with each type of metadata. The flags control whether the metadata parameter is signaled or not signaled. The flags can be associated with various access levels such as a patch level, a frame level, a GOF level, a sequence level, a video level, and the like. Depending on which access level a flag is associated with will indicate whether the metadata is applied to that particular access level and all the data included in that access level, such as a hieratical tiered structure. For example, if the metadata is signaled at a patch level, then that specific patch is modified by the metadata. In this example, the metadata might not be applied to other patches or other frames. In another example, if the metadata is signaled at a frame level (such as in one frame of the geometry frames 556) then the metadata is applied to one or more patches within that frame. In this example, the metadata might not be applied to patches of another frame. In another example, if the metadata is signed at a GOF level, then the metadata is applied to one or more frames and various patches included in the frames. In this example, the metadata might not be applied to patches of another GOF.

As discussed above with respect to flag 508 of FIG. 5A, the flag 508 can signal when metadata is applied at the decoder, such as the decoder 550 of FIG. 5B. In addition to the absolute signaling using two binary control flags (the enabling flag and the present flag, discussed above with respect to syntax 1, 2, 3, and 4), the auxiliary information 506 can include additional signaling techniques to indicate when the metadata is applied to modify a point cloud. In certain embodiments, the metadata can be signaled by (i) absolute signaling using a single control binary flag (ii) absolute signaling by reusing previously signaled metadata, (iii) conditional signaling by reusing previously signaled metadata, and (iv) reference identification.

For example, the encoder 500 can indicate via a single control binary flag when the decoder should apply the metadata to a point cloud. Each parameter set has an enabling flag that controls whether that metadata parameter set is signaled in the bitstream.

Syntax 6:

```
read video_metadata_present_flag;
if (video_metadata_present_flag) {
  video_parameter_set_matadata( );
}
...
read seq_metadata_ present _flag;
if (seq_metadata_present_flag) { seq_parameter_set_matadata( );
}
...
read gof_metadata_ present _flag;
if (gof_metadata_present_flag) {
  gof_parameter_set_matadata( );
}
...
read frame_metadata_present_flag;
if (frame_metadata_present_flag) {
  frame_parameter_set_matadata( );
}
...
read patch_metadata_present_flag;
if (patch_metadata_present_flag) {
  patch_parameter_set_matadata( );
}
```

Syntax 6, illustrates metadata parameters within the highest-level parameter set are first read from the bitstream if they are signaled, otherwise the parameter sets are set to some default values. Next, the metadata parameters within one lower level parameter set is read from the bitstream if they are signaled. Otherwise, parameter sets are set to the values of their corresponding parameters at one level higher. This process continues until the metadata parameters within the lowest level parameter set is either read from the bitstream or assigned from the corresponding parameters at one level higher. Syntax 7, below illustrates metadata parameter set for scaling.

Syntax 7:

```
// Read video-level metadata.
video_parameter_set_matadata( )
{
  // Read video-level present flags.
  read video_metadata_present_flag;
  if (video_metadata_present_flag) {
    read video_scale_metadata_present_flag;
    // read other video-level metadata present flags.
    ...
  }
  else {
    video_scale_metadata_present_flag = false;
    ...
  }
  // Read video-level scale metadata.
  if (video_scale_metadata_present_flag) {
    read video_scale_metadata_on_axis_x;
    read video_scale_metadata_on_axis_y;
    read video_scale_metadata_on_axis_z;
  }
  else {
    video_scale_metadata_on_axis_x = <default_value>;
    video_scale_metadata_on_axis_y = <default_value>;
    video_scale_metadata_on_axis_z = <default_value>;
  }
  // Read other video-level metadata.
  ...
}
// Read sequence-level metadata.
seq_parameter_set_matadata( )
{
  // Read sequence-level present flags.
  read seq_metadata_present_flag;
  if (seq_metadata_present_flag) {
    read seq_scale_metadata_present_flag;
```

Syntax 7:

```
  // Read other sequence-level metadata present flags.
  ...
  }
  // Read sequence-level scale metadata.
  if (seq_scale_metadata_present_flag) {
    read seq_scale_metadata_on_axis_x;
    read seq_scale_metadata_on_axis_y;
    read seq_scale_metadata_on_axis_z;
  }
  else {
    seq_scale_metadata_on_axis_x =
       video_scale_metadata_on_axis_x;
    seq_scale_metadata_on_axis_y =
       video_scale_metadata_on_axis_y;
    seq_scale_metadata_on_axis_z =
       video_scale_metadata_on_axis_z;
  }
  // Read other sequence-level metadata.
  ...
}
// Read frame-level metadata.
frame_parameter_set_matadata( )
{
  ...
}
// Read patch-level metadata.
patch_parameter_set_matadata( )
{
  ...
}
```

Syntax 7 illustrates that when the scaling parameter set is not present at a certain level, the value is inferred to be the parameter value at the next higher level. For instance, if syntax element of 'patch_resolution_metadata' is not present, the value of 'patch_resolution_metadata' is inferred from 'frame_resolution_metadata,' which is one access level higher. If the parameter set is not present (such that the value of present flag for that parameter set is false), the values for all metadata parameters in that parameter set are inferred from those at the next higher level. At the highest access level (such as the video parameter set, in certain embodiments), if a particular parameter is not present its value is inferred to be a default value. As a result, at each level, each parameter is assigned a valid value, either through inference or through explicit signaling in the bitstream.

In another example, the encoder 500 can indicate via absolute signaling by reusing previously signaled metadata, to instruct the decoder 550 as to when to apply the metadata to the point cloud. For instance, a flag (such as flag 508 of FIG. 5) indicates whether the parameter-set metadata is same as the previous set. Either one single flag or different flags can indicate different metadata parameters within each parameter set. Similarly one single flag or different flags can indicate different parameter sets. Syntax 8 below illustrates the scale metadata parameter, where the present flag is checked before the reuse flag. If a flag is not signaled, it is inferred false.

Syntax 8:

```
// In the video level
...
read video_scale_metadata_reuse_flag;
if (video_scale_metadata_reuse_flag) {
  video_scale_metadata_on_axis_x =
    previous_video_scale_metadata_on_axis_x;
  video_scale_metadata_on_axis_y =
```

Syntax 8:

```
    previous_video_metadata_scale_on_axis_y;
    video_scale_metadata_on_axis_z =
    previous_video_metadata_scale_on_axis_z;
} else {
    read video_scale_metadata_present_flag;
    if (video_scale_metadata_present_flag) {
        read video_scale_metadata_on_axis_x;
        read video_scale_metadata_on_axis_y;
        read video_scale_metadata_on_axis_z;
    }
}
if (!video_scale_metadata_reuse_flag &&
!video_scale_metadata_present_flag) {
    video_scale_metadata_on_axis_x = <default_value>;
    video_scale_metadata_on_axis_y = <default_value>;
    video_scale_metadata_on_axis_z = <default_value>;
}
...
```

In syntax 8, similar syntax elements can be expressed at the sequence access level, the GOF access level, the frame access level and the patch access level. In another example, one binary flag is signaled to determine whether a metadata parameter is either read from the bitstream or assigned to the one previously signaled.

In another example, the encoder 500 can indicate via conditional signaling by reusing previously signaled metadata, to instruct the decoder 550 as to when to apply the metadata to the point cloud. For instance, two binary flags (or one integer flag) can indicate whether the parameter set is assigned to or predicted from the previous set.

Syntax 9:

```
// In the video level
read video_scale_metadata_reuse_flag;
if (video_scale_metadata_reuse_flag) {
    video_scale_metadata_on_axis_x =
    previous_video_scale_metadata_on_axis_x;
    video_scale_metadata_on_axis_y =
    previous_video_scale_metadata_on_axis_y;
    video_scale_metadata_on_axis_z =
    previous_video_scale_metadata_on_axis_z;
} else
    read video_scale_metadata_predict_flag;
    if (video_scale_metadata_predict_flag) {
        read video_scale_metadata_on_axis_x;
        read video_scale_metadata_on_axis_y;
        read video_scale_metadata_on_axis_z;
        video_scale_metadata_on_axis_x +=
    previous_video_scale_metadata_on_axis_x;
        video_scale_metadata_on_axis_y +=
    previous_video_scale_metadata_on_axis_y;
        video_scale_metadata_on_axis_z +=
    previous_video_scale_metadata_on_axis_z;
    }
}
if (!video_scale_metadata_reuse_flag &&
!video_scale_metadata_predict_flag) {
    video_scale_metadata_on_axis_x = <default_value>;
    video_scale_metadata_on_axis_y = <default_value>;
    video_scale_metadata_on_axis_z = <default_value>;
}
...
```

In syntax 9, similar syntax elements can be expressed at the sequence access level, the GOF access level, the frame access level and the patch access level. Syntax 9 illustrates assigning to the previous set has priority over prediction from the previous set. It is noted that the predictions can signaled in a different order.

In another example, the encoder 500 can indicate via reference identification in order to instruct the decoder 550 as to when to apply the metadata to the point cloud. That is, a list is used to maintain a number of previous explicitly-signaled metadata parameter sets at different access levels. Thereafter, each parameter set uses a reference or identification parameter to reference one of those parameter sets in the list Syntax 10:

```
read reference_id;
if (reference_id equal 0)
    read_parameter_set_metadata( );
else
    // Assign a previous parameter set according to reference_id.
    assign_parameter_set_metadata(reference_id);
```

In syntax 10, a fixed-size buffer of parameter set is used with a set rule for filling the list: For example, all parameter sets at sequence access level and GOF access level are included. The remaining list is filled using the previously signaled parameter sets.

Figure 6C:
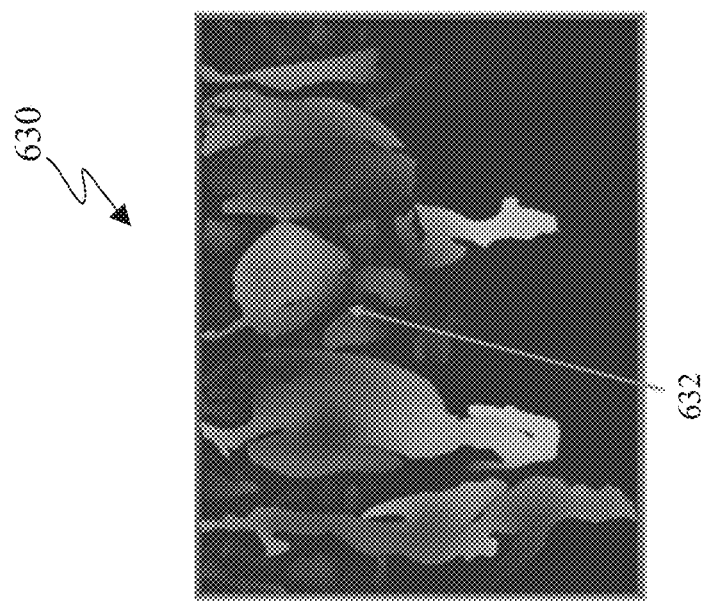
FIGS. 6A, 6B, and 6C illustrate an example 3-D point cloud and 2-D frames, that represent the 3-D point cloud in accordance with an embodiment of this disclosure.
Figure 6B:
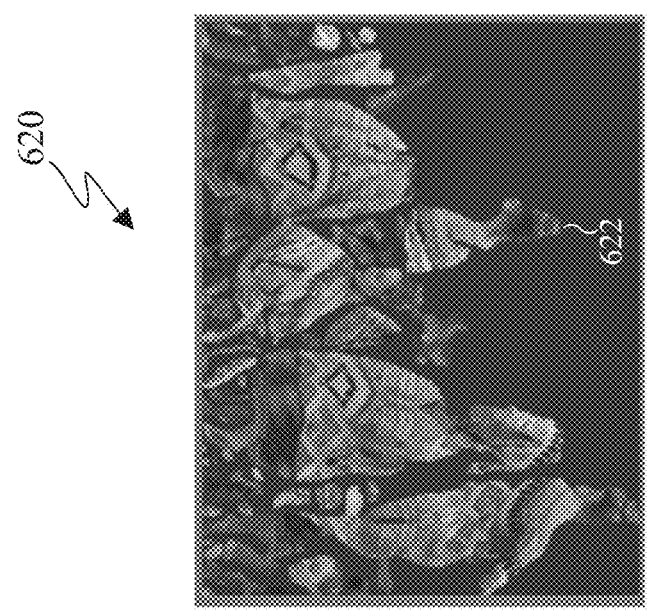
Figure 6A:

FIGS. 6A, 6B, and 6C illustrate an example 3-D point cloud and 2-D frames that represent the 3-D point cloud in accordance with an embodiment of this disclosure. In particular, FIG. 6A illustrates a 3-D point cloud 610, and FIGS. 6B, 6C, illustrate 2-D frames, including regular patches. The embodiment of FIGS. 6A, 6B, and 6C, are for illustration only and other embodiments could be used without departing from the scope of this disclosure.

The 3-D point cloud 610 is similar to the point cloud 405 of FIG. 4, the mesh 410 of FIG. 4, the 3-D point cloud 502 FIGS. 5A and 5B. The 3-D point cloud 610 is a set of data points in 3-D space. Each point of the 3-D point cloud includes (i) a geometric position that provides the structure of the 3-D point cloud and (ii) one or more textures that provide information about each point such as color, reflectiveness, material, and the like.

FIGS. 6B and 6C, illustrate the 2-D frames 620 and 630 respectively. The frames 620, depicts regular patches (such as patch 622) representing the texture of the 3-D point cloud 610. The frame 630, depicts regular patches (such as patch 632) representing the depth values of the 3-D point cloud 610. The frames 620 and 630 can be similar to the one or more texture frames 518 and the one or more geometry frames 514 of FIG. 5A.

FIGS. 7A through 10B, discussed in greater detail below, illustrate modifying a 3-D point cloud using the metadata such as scale, offset, rotation, point size and point shape. Non-orthogonal projections can adjust the scale of a 3-D point cloud, to indicate a ROI, progressive coding, and manipulating a sparse point cloud. For example, scale and offset can normalize a 3-D point cloud (similar to the point cloud 405 of FIG. 4, the mesh 410 of FIG. 4, the 3-D point cloud 502 of FIGS. 5A and 5B, and the 3-D point cloud 610 of FIG. 6A) to a voxelized grid. After receiving a compressed bitstream, a decoder such as the decoder 550 of FIG. 5B, decompresses the received bitstream. The point cloud can be scaled back to the original coordinates if the global scale and offset metadata is made available to the decoder.

Adaptive streaming is the streaming of the same 3-D point cloud at different bit rates and resolutions. For example, 3-D point clouds of different bit rates and resolutions can be created and stored in an information repository such as a database, or server. The rendering client requests a particular bit rate/resolution depending on the network bandwidth. If the resolution of the received point cloud is different than the display resolution of the device, the device appropriately scales the point cloud. Different resolution point clouds are be created by either (i) subsampling the point cloud on the original voxel grid resolution, or (ii) the voxel grid can be reduced. Subsampling the point cloud can lead to sparse point cloud. In contrast, reducing the voxel grid can lead to a dense point cloud, by scaling the geometry coordinates. The scale factor included in the scale metadata alters the voxel grid at the encoder and at the decoder the metadata is used to return the point cloud it original coordinate system.

Scaling a point cloud is via a non-orthogonal projection can resolve a sparse point cloud. For example, x, y, and z are coordinates of a spare point cloud, the xs, ys, and zs are the coordinates of the scaled point cloud input into the encoder, such as the encoder 500 of FIG. 5A. The scaled point cloud is in the x coordinate is represented as 'xs=(x+offset_x)*scale_factor_x.' The scaled point cloud is in the y coordinate is represented as 'ys=(y+offset_y)*scale_factor_y.' The scaled point cloud is in the z coordinate is represented as 'zs=(z+offset_z)*scale_factor_z'. If xr, yr, and zr are the coordinates at the reconstructed point cloud at the output of a decoder, such as the decoder 550 of FIG. 5B, and xo, yo, and zo are the coordinates of a point of the final scaled point cloud, then the output of each point is represented by equation 4 below.

$$xo = xr/\text{scale\_factor\_}x + \text{offset\_}x$$

$$yo = yr/\text{scale\_factor\_}y + \text{offset\_}y$$

$$zo = zr/\text{scale\_factor\_}x + \text{offset\_}z \quad \text{Equation 4:}$$

Rotational metadata is used to control the plane of projection. For example, the patch generator 504 of FIG. 5A generates patches of the point cloud. Patch boundary artifacts arise at the boundary line of patches when the patches are reconstructed into the point cloud at the decoder to avoid patch boundary artifacts, the point cloud can be rotated so a patch is not created over a particular part of the point cloud. For example, if a patch would have been created over the face of a humanoid point cloud, the encoder can rotate the point cloud to avoid the face of the point cloud being split between two or more patches. Rotating the point cloud can result in the face appearing on a single patch. The magnitude of rotation is stored as rotational metadata, to enable the decoder to reconstruct the point cloud. The rotation metadata is based to inverse rotation the decompressed point cloud back to the original coordinates.

Figure 7A:
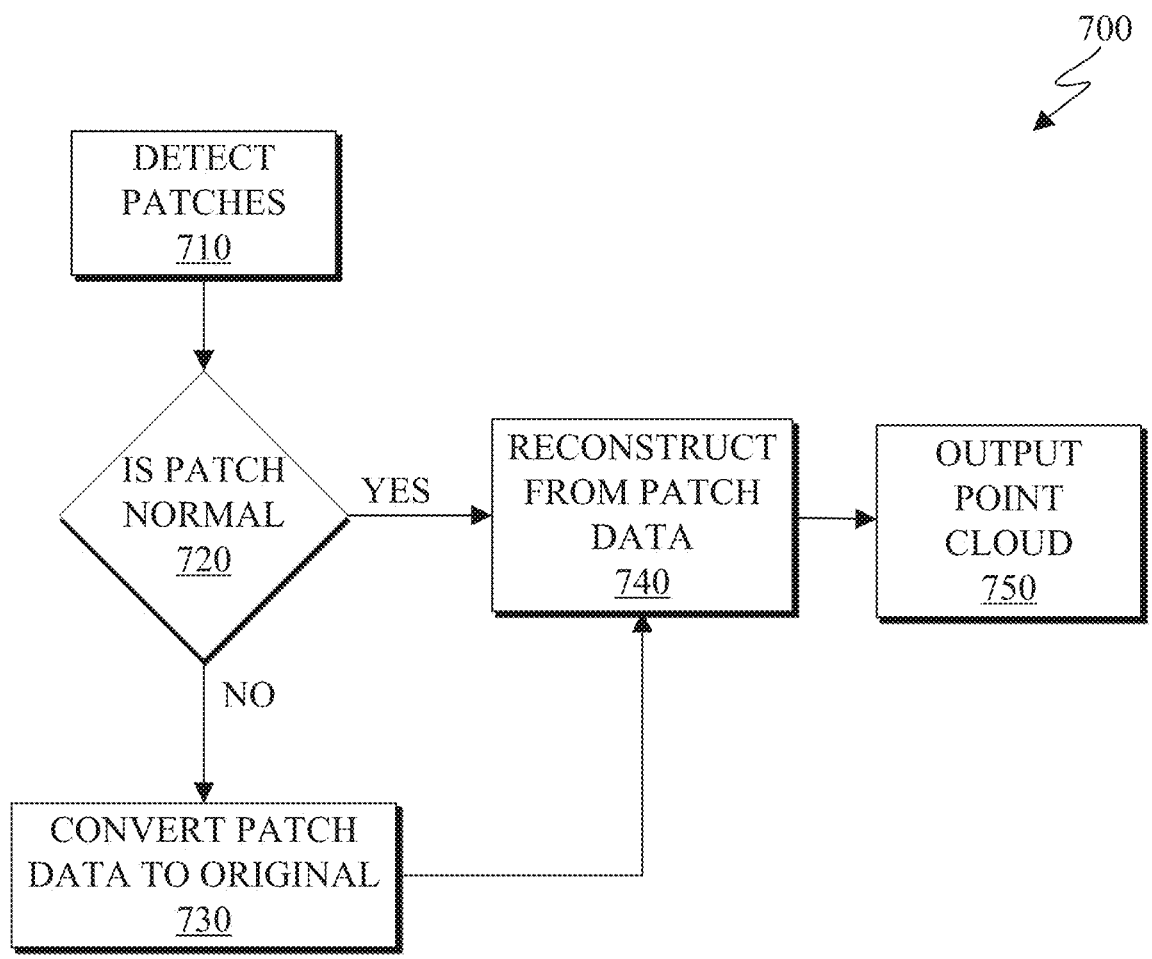
FIG. 7A illustrates an example flowchart to receive a patch at a scaled resolution in accordance with an embodiment of this disclosure.
Figure 7B:
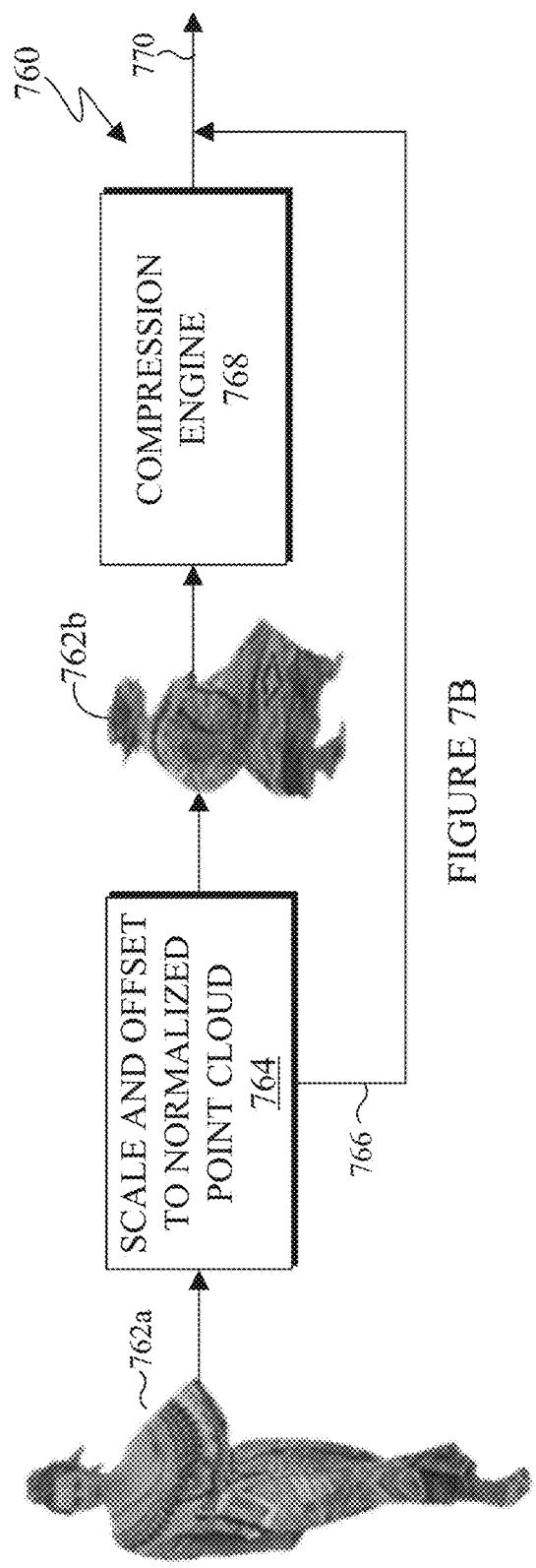
FIGS. 7B and 7C illustrate process of creating a bitstream including a patch and receive the bitstream in accordance with an embodiment of this disclosure.
Figure 7C:
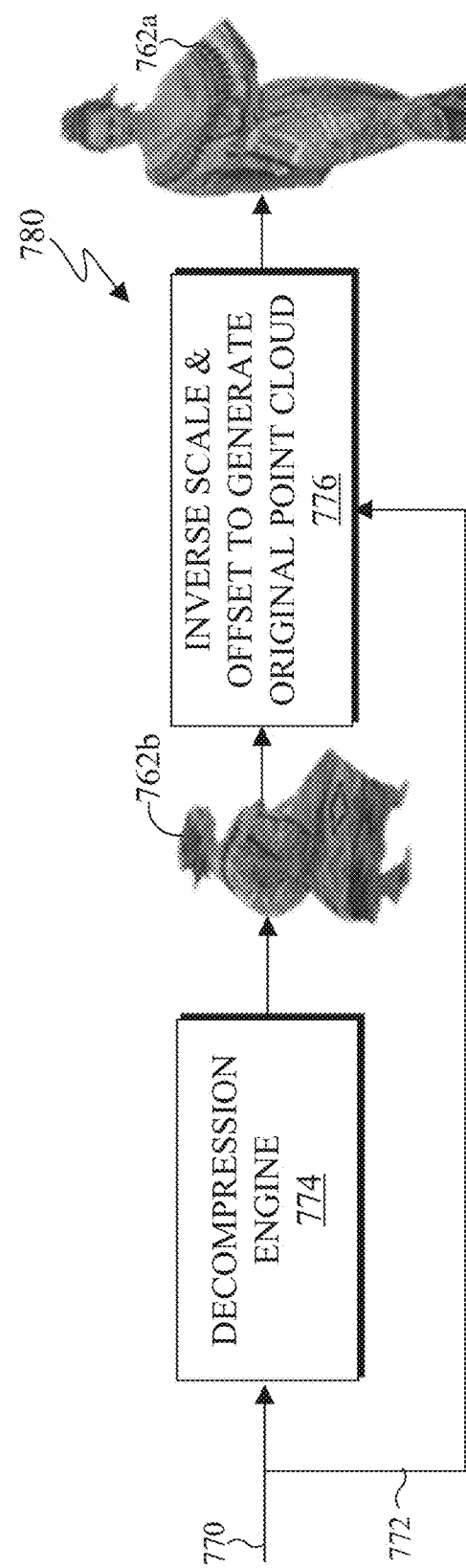

FIGS. 7A and 7B illustrate a process to reconstruct a point cloud from patches. In particular, FIG. 7A illustrates an example flowchart 700 to receive a patch at a scaled resolution in accordance with an embodiment of this disclosure. FIGS. 7B and 7C illustrate process 760 of creating a bitstream including a patch and a process 780 of receive the bitstream in accordance with an embodiment of this disclosure. The embodiment of FIGS. 7A, 7B, and 7C are for illustration only and other embodiments could be used without departing from the scope of this disclosure.

The flowchart 700 is described as implemented by any one of client devices 106-114 of FIG. 1, the decoder 550 of FIG. 5B, and include internal components similar to those of the server 200 00 of FIG. 2, the electronic device 300 of FIG. 3. The process begins with the decoder 550 detecting patches within the decompressed frames, such as the geometry frames 556 and the texture frames 558 (710). The process determines the patch is normal (720). That is, the decoder, 550 determines whether the patch underwent a density, resolution, or scale change, by an encoder, similar to the encoder 500 of FIG. 5A.

If the patch did not undergo a modification, then the decoder 550 reconstructs the patch into the 3-D point cloud (740). If the patch underwent a density, resolution, or scale change, by an encoder, the patch data is modified to return the patch to the patch's original form (730). After the patch is returned to its original form, the decoder 550 reconstructs the patch into the 3-D point cloud (740). After the decoder reconstructs the patches the decoder outputs the reconstructed 3-D point cloud. (750). The reconstructed 3-D point cloud can be displayed on a display (such as the display 355 of FIG. 3) for a user to view.

FIG. 7B illustrates a process 760 of creating a bitstream of a 3-D point cloud 762a. The 3-D point cloud 762a is represented as patches by an encoder, similar to the encoder 500 of FIG. 5A. The encoder scales and offsets the point cloud to a normalized 3-D point cloud 762b (764). The compression engine 768 compresses the normalized 3-D point cloud 762b into an encoded bitstream 770. The scale of offset metadata 766 is multiplexed into the encoded bitstream 770.

FIG. 7C illustrates the process 780 of a decoder, such as the decoder 550 of FIG. 5B, receiving the encoded bitstream 770. The encoded bitstream 770 is demultiplexed into the scale and offset metadata 772 and compressed normalized 3-D point cloud 762b. In certain embodiments, the scale and offset metadata 766 and the scale and offset metadata 772 are the same, such that the scale and offset metadata 766 is created by an encoder, such as encoder 500, included in the encoded bitstream 770, and used by the decoder, such as the decoder 550, to reconstruct the 3-D point cloud 762a. The decompression engine 774 decompresses the compressed normalized 3-D point cloud 762b. The decoder then takes an inverse of the scale and offset metadata 772 to generate the original 3-D point cloud 762a (776).

Figure 8A:
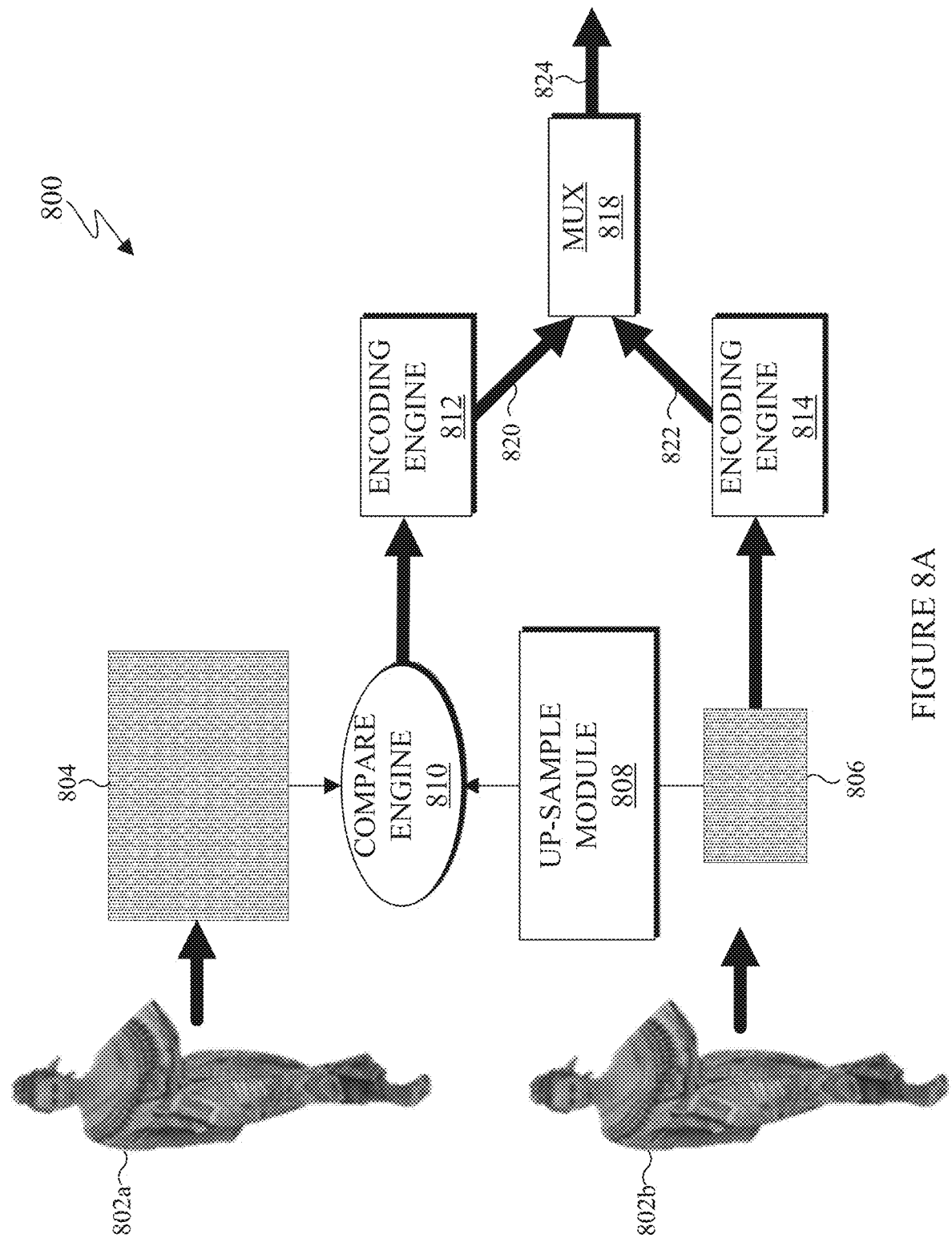
FIG. 8A illustrates process to generate a progressive non-orthogonal projection of a point cloud in accordance with an embodiment of this disclosure.
Figure 8B:
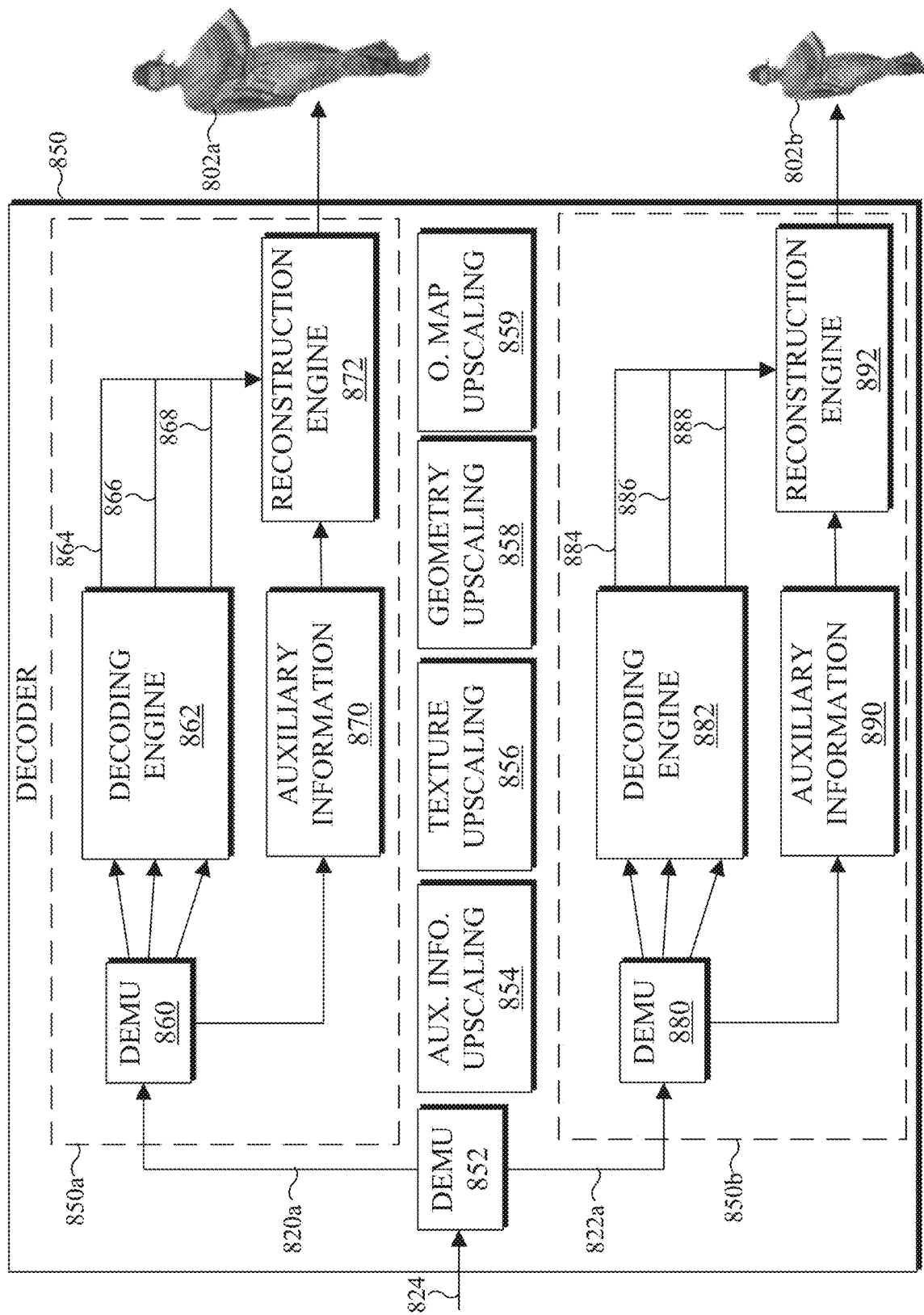
FIG. 8B illustrates an example block diagrams of a decoder in accordance with an embodiment of this disclosure.

FIG. 8A illustrates process 800 to generate a progressive non-orthogonal projection of a point cloud in accordance with an embodiment of this disclosure. FIG. 8B illustrates an example block diagram of a decoder that receives a scaled point cloud in accordance with an embodiment of this disclosure. FIG. 8A is similar to the encoder 500 of FIG. 5A. Similarly, FIG. 8B is similar to the decoder 550 of FIG. 5B. The embodiment of FIGS. 8A and 8B are for illustration only and other embodiments could be used without departing from the scope of this disclosure.

Progressive and adaptive bitrate transmission of a 3-D point cloud from a source device, such as a server 104 of FIG. 1, to a client device, such as any of the client devices 106-116, allows for varying network conditions as well as the devices (such as the decoder 550 or client devices 106-116) individual capability. For example, the decoder can receive a compressed bitstream that includes a lower level of detail (LLOD) when the network bandwidth the processing capability of the decoder, the processing capability of the device that renders the 3-D point cloud, or a combination thereof, is low. In contrast, the decoder can receive a compressed bitstream that includes a high level of detail (HLOD), when the network bandwidth, or the device processing capabilities are high. LLOD can be created by performing a non-orthogonal projection of the 3-D point cloud into the 2-D frames, similar to equation 2 and equation 3 above.

Process 800 is similar to the encoder 500 of FIG. 5A, such that a point cloud is projected onto frames and multiplexed into a compressed bitstream. The 3-D point clouds 802a and 802b are similar to the 3-D point cloud 762a of FIGS. 7B and 7C, the 3-D point cloud 610 of FIG. 6A, the 3-D point cloud 502 of FIGS. 5A and 5B, the point cloud 405 and the point mesh 410 of FIG. 4. The 3-D point cloud 802a is a HLOD, while the 3-D point cloud 802b is a LLOD. In certain embodiments, the 3-D point cloud 802b is a compact version of the 3-D point cloud 802a, by scaling transform or through a non-orthogonal projection onto a smaller video frame, such as the frames 806.

The 3-D point cloud 802a can be projected via an orthogonal projection onto the frames 804. The 3-D point cloud 802b can be projected via a non-orthogonal projection onto the frames 806. The frames 804 and 806 can be similar to the geometry frames 514, the texture frames 518 and the occupancy map frames 522 of FIG. 5A. It is noted that the frames 806 (the non-orthogonal projection) is smaller than the frames 804 (the orthogonal projection). The frames 804 and 806 represent the frames of the various attributes (such as geometry, texture, occupancy map, and the like) the represent the 3-D point clouds 802a and 802b, respectively. The frames 806 are smaller than the frames 804 and therefore use less bandwidth when the frames 806 are transmitted to a decoder.

The up-sample module 808, up-samples the frames 806 such that the frame is the same or similar dimensions as the frames 804. In certain embodiments, the amount the up-sample module 808 up-samples the frames 806 is predetermined. In certain embodiments, the up-sample module 808 identifies the dimension of the frames 804, and up-samples the frames 806 to a corresponding amount such that the dimension of the frames 804 and the dimension of the frames 806 are the same.

The compare engine 810, compares the frames 804 to the up sampled frames 806, and extracts the residual difference between the frames. For example, the compare engine 810 extracts the residual difference between each geometry frame, each texture frame that represent the 3-D point cloud 802a, and the 3-D point cloud 802b. That is, the compare engine 810 extracts the differences between each of the frames 804 and each of the frames 806. The differences between each of the frames 804 and each of the frames 806 represent the difference in resolution between the HLOD of the 3-D point cloud 802a and the LLOD of the 3-D point cloud 802b.

The encoding engine 812 and the encoding engine 814 are similar to the encoding engines 516, 520, and 524 of FIG. 5A. In certain embodiments, the encoding engines 812 and 814 represent multiple encoding engines that encode the different types of frames, such as geometry frames, texture frames, occupancy map frames, and the like. The encoding engine 814 encodes the LLOD frames 806. The encoding engine 814 then generates an encoded bitstream 822 of the LLOD point cloud 802b. The encoding engine 812 encodes the extracted differences between the LLOD frames 806 and the HLOD frames 804. The encoding engine 812 then generates an encoded bitstream 820 of the HLOD point cloud 802a.

In certain embodiments, the encoded bitstream 820 and the encoded bitstream 822 are transmitted separately to a decoder. The encoded bitstream 822 is the base layer and the encoded bitstream 820 is the enhanced layer. The enhanced layer and base layer can be transmitted to the decoder, and the decoder determines whether to decode only the base layer, or both the base layer and the enhanced layer.

In certain embodiments, the encoded bitstream 820 and the encoded bitstream 822 are multiplexed together by a multiplexer 818 and transmitted as a single compressed bitstream 824 to a decoder. The multiplexer 818 is similar to the multiplexer 526 of FIG. 5A.

FIG. 8B illustrates decoder 850. The decoder 850 illustrates a high-level overview of an embodiment of the present disclosure of an electronic device that decodes and reconstructs a point cloud for rendering. The decoder 850 is similar to the decoder 550 of FIG. 5B. The decoder 850 includes two sub-decoders, the decoder 850a, and the decoder 850b. The decoder 850a decodes the HLOD, and the decoder 850b decodes the LLOD. The decoder 850 receives the compressed bitstream 824 from FIG. 8A. The decoder 850 includes a demultiplexer 852, auxiliary information upscaling 854, texture upscaling 856, geometry upscaling 858, and occupancy map upscaling 859.

The auxiliary information upscaling 854, texture upscaling 856, geometry upscaling 858, and occupancy map upscaling 859 represent metadata that up-samples decoded content from the decoder 850b (via the bitstream 822a). The up-scaled content from the decoder 850b augments the information (the bitstream 820a) of the decoder 850a. For example, the decoder 850b decodes LLOD frames (frames 806 of FIG. 8A) that represent the 3-D point cloud 802b, while the decoder 850a decodes the extracted difference between the HLOD of the 3-D point cloud 802a and the LLOD of the 3-D point cloud 802b. The content that the decoder 850a receives is insufficient to reconstruct the 3-D point cloud 802a, as the content is the difference between the HLOD of the 3-D point cloud 802a and the LLOD the 3-D point cloud 802b. Therefore, the upscaling metadata (auxiliary information upscaling 854, texture upscaling 856, geometry upscaling 858, and occupancy map upscaling 859) is applied to the various data elements of the decoder 850b, which is then augments the corresponding content of the decoder 850a. Thereby enabling the decoder 850a can reconstruct the HLOD of the 3-D point cloud 802a.

The demultiplexer 852 is similar to the demultiplexer 552 of FIG. 5B. It is noted that the decoder 850 includes two separate decoders similar to that of the decoder 550, that of the decoder 850a and the decoder 850b. The decoder 850a includes a demultiplexer 860, a decoding engine 862 (that decodes geometry frames 864, texture frames 866, and occupancy map frames 868), auxiliary information 870, and a reconstruction engine 872. The components of the decoder 850a are similar to the respective components of the decoder 550 of FIG. 5B. For example, the demultiplexer 860 is similar to the demultiplexer 552, the decoding engine 862 is similar to the decoding engine 554, and the reconstruction engine 872 is similar to the reconstruction engine 564. Similarly, the decoder 850b includes demultiplexer 880, decoding engine 882 (that decodes geometry frames 884, texture frames 886, and occupancy map frames 888), auxiliary information 890, and reconstruction engine 892. The components of the decoder 850b are similar to the respective components of the decoder 550 of FIG. 5B. For example, the demultiplexer 880 is similar to the demultiplexer 552, the decoding engine 882 is similar to the decoding engine 554, and the reconstruction engine 892 is similar to the reconstruction engine 564.

If a single bitstream is received, such as the bitstream 824, the demultiplexer 852 separates the received bitstream into the enhanced layer bitstream 820a (similar to the enhanced layer bitstream 820 of FIG. 8A), and the base layer bitstream 822a (similar to the base layer bitstream 822 of FIG. 8A). The enhanced layer bitstream 820a, is then further demulitplexed by the demultiplexer 860. The base layer bitstream 822a, is then further demulitplexed by the demultiplexer 880.

In certain embodiments, the decoder 850 can receive two separate bitstreams (and not the single bitstream 824), that of the enhanced layer bitstream 820*a* (similar to the enhanced layer bitstream 820 of FIG. 8A), and the base layer bitstream 822*a* (similar to the base layer bitstream 822 of FIG. 8A) (not shown). The bitstreams are directed to the respective decoders 850*a* and 850*b* and bypass the demultiplexer 852. The enhanced layer bitstream 820 (of FIG. 8A), is demulitplexed by the demultiplexer 860. The base layer bitstream 822 (of FIG. 8A), is demulitplexed by the demultiplexer 880.

The process of reconstructing the respective 3-D point clouds 802*a* and 802*b* is similar to that of the decoder 550 of FIG. 5B described above. The process of reconstructing the respective 3-D point clouds 802*a* augments the content of the received bitstream 820*a* with the up-scaling metadata as applied to the content included in the bitstream 822*a*. The geometry upscaling 858 up-samples the decoded LLOD geometry frames 884. The LLOD geometry frames 884 are the decoded geometry frames from the frames 806 of FIG. 8A. Up-sampling of the LLOD geometry frames 884 includes both up-sampling both spatial and depth values.

For example, up-sampling of the LLOD geometry frames 884 spatially scales two of the geometry coordinates, while up-sampling the depth values of the LLOD geometry frames 884 scales the third geometry coordinate of the point cloud. The up-scaled geometry coordinates are then included in the decoded geometry frames 864. The decoded geometry frame 864 represents both the extracted difference between the up sampled LLOD frames 806 the HLOD frames 804 as well as the up-scaled geometry frames 884.

The texture upscaling 856 up-samples the decoded LLOD texture frames 886. The LLOD texture frames 886 are decoded texture frames of the frames 806 of FIG. 8A. The up-scaled texture frames are then included in the decoded texture frames 866. The decoded texture frames 866 represent both the extracted difference between the up sampled LLOD frames 806 the HLOD frames 804 as well as the up-scaled texture frames 886.

The auxiliary information upscaling 854 up-samples the any auxiliary information 890 that is associated with the decoded LLOD geometry and texture frames 884 and 886, respectively. Thereafter the up-sampled auxiliary information 890 is applied to the auxiliary information 870.

The occupancy map included in the occupancy map frames 888 is a binary map. Therefore the occupancy map upscaling 859 uses the nearest neighbor interpretation to up-sample the occupancy map frames 888. The up-sampled occupancy map frames 888 can be applied to the occupancy map frames 868.

It is noted that the patch information between the base layer (represented in the bitstream 822*a*) and the enhanced layer (represented in the bitstream 820*a*) are synchronized to ensure correlation between the LLOD frames and the HLOD frames. In certain embodiments, the encoder synchronizes the respective bitstreams.

FIG. 9 illustrates an adaptive region of a point cloud density in accordance with an embodiment of this disclosure. The embodiment of the modifying a ROI according to FIG. 9 is for illustration only and other embodiments could be used without departing from the scope of this disclosure.

ROI coding can assign a higher quality to a ROI and a lower quality to an area of a 3-D point cloud that is not included in the ROI. For example, assigning a higher quality to a ROI can be performed by increasing the point cloud density and reducing the quantization error of geometry and color attributes in the ROI. For example, if a ROI is assigned to a face of a humanoid point cloud, then the face of the point cloud can be coded differently than the rest of the point cloud.

FIG. 9 includes a 3-D point cloud 902 and two frames, frame 910 and frame 920. The 3-D point cloud 902 is similar to the 3-D point clouds 802*a* and 802*b* of FIGS. 8A and 8B, the 3-D point cloud 762*a* of FIGS. 7B and 7C, the 3-D point cloud 610 of FIG. 6A, the 3-D point cloud 502 of FIGS. 5A and 5B, the point cloud 405 and the point mesh 410 of FIG. 4. The frame 910 and the frame 920 represent patches of the 3-D point cloud 902. The frame 910 is a uniform point density of all patches, whereas the frame 920 indicates a region of adaptive point density based on a ROI.

The frame 910 includes numerous patches such as patch 914. The patch 914 depicts the face of the 3-D point cloud 902. The patch 914 is encoded with the same point density as the other patches included in the frame. The frame 920 includes numerous patches such as patch 924. The patch 924 that depicts the face of the 3-D point cloud 902. The patch 924 is projected at a higher point density than that of the other patches included in the frame 920. Patch 924 has a higher point density by scaling the patch 924 to a different scaling factor. The different scaling factors can be included in the metadata of the auxiliary information 506 of the encoder 500 of FIG. 5A. The flags 508, of the encoder 500, are used to signal that the decoder 550 is to apply the scale factors on a per patch basis when reconstructing the 3-D point cloud 902. When the face is designated as a ROI, encoding the face of the point cloud, as indicated by patch 924, with a higher point density as compared to the rest of the point cloud enables the face of the 3-D point cloud 902 have a higher quality as compared to the body of the 3-D point cloud 902. In certain embodiments, that if a ROI is indicated, that the frame 910 is not transmitted in the compressed bitstream while the frame 920 is transmitted in the compressed bitstream. In certain embodiments, scale factors that alter a ROI can modify the point density, resolution, scale, and the like, on a per-patch basis.

Non-orthogonal projections can be used to indicate a ROI of a point cloud at a patch level. For example, x, y, and z are coordinates of a point in a patch of a point cloud, the xs, ys, and zs are the coordinates of the scaled point cloud patch input into the encoder, such as the encoder 500 of FIG. 5A. The scaled point cloud is in the x coordinate is represented as 'xs=(x+offset_x)*scale_factor_x.' The scaled point cloud is in the y coordinate is represented as 'ys=(y+offset_y)*scale_factor_y.' The scaled point cloud is in the z coordinate is represented as 'zs=(z+offset_z)*scale_factor_z'. If xr, yr, and zr are the coordinates at the reconstructed patch of the point cloud at the output of a decoder, such as the decoder 550 of FIG. 5B, and xo, yo, and zo are the coordinates of a point of the final scaled output in the patch, then the output of each point is represented by equation 4 below.

$$xo = xr/\text{scale\_factor\_}x + \text{offset\_}x$$

$$yo = yr/\text{scale\_factor\_}y + \text{offset\_}y$$

$$zo = zr/\text{scale\_factor\_}x + \text{offset\_}z \qquad \text{Equation 5:}$$

In certain embodiments, non-neighboring portions of a point cloud can be positioned as neighboring patches on a 2-D frame. For example, the frame packing 512 of FIG. 5A organizes and places the various patches on a frame at a position such that to minimize the size of the frame. As a result, often non-neighboring portions of a point cloud can be positioned as neighboring patches on a 2-D frame. If non-neighboring patches are next to each other on a 2-D frame, when the patches are reconstructed into the point cloud, pixels of one patch that border another might be mixed with the bordering patch, which results in an artifact. An artifact is a visible disfiguring of the point cloud that occurs when the decoder reconstructs the point cloud.

Figure 10:
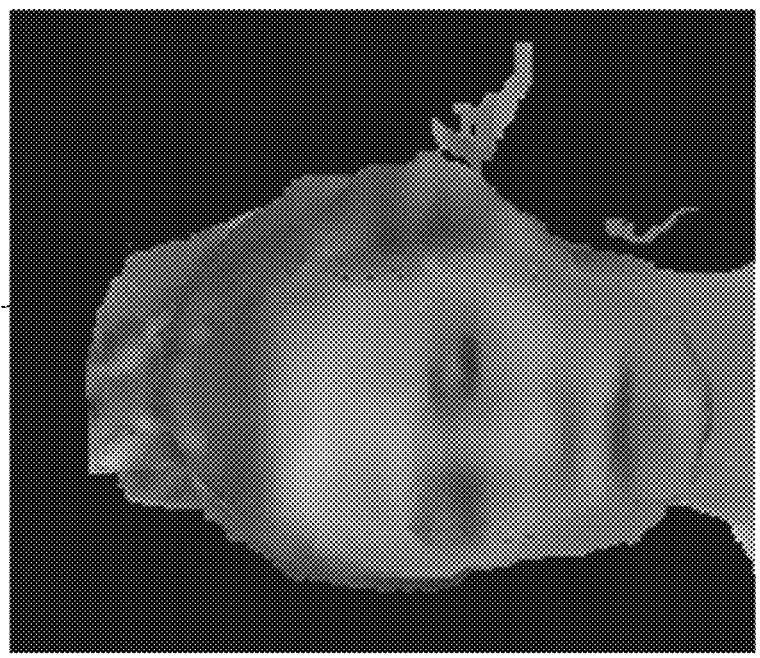
FIG. 10 illustrates an adaptive point size and shape of a point cloud in accordance with an embodiment of this disclosure.
Figure 10:
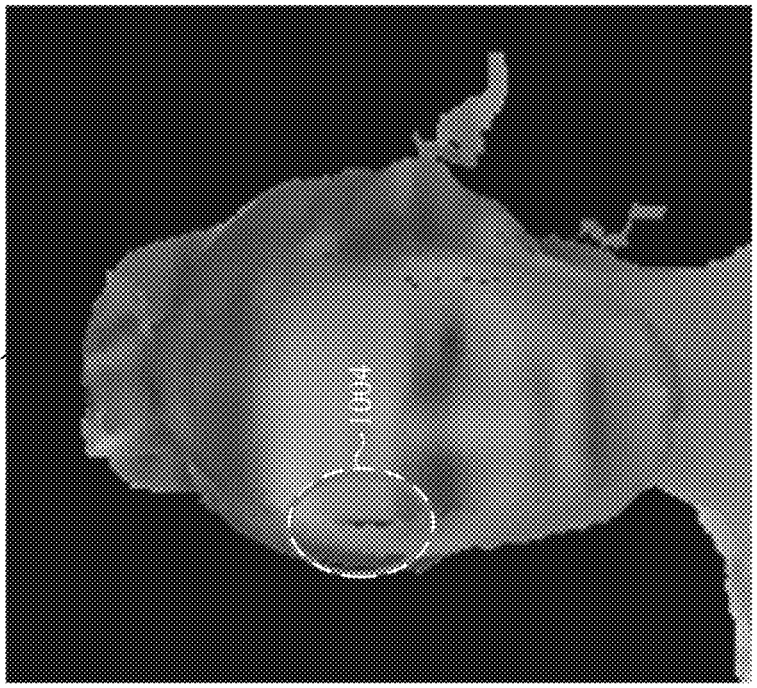

FIG. 10 illustrates an adaptive point size and shape of a point cloud in accordance with an embodiment of this disclosure. The embodiment of adapting the shape and size of a point of a point cloud according to FIG. 10 is for illustration only and other embodiments could be used without departing from the scope of this disclosure.

FIG. 10 includes a reconstructed point cloud 1002a and a reconstructed point cloud 1002b. The reconstructed point cloud 1002a includes an artifact 1004. The reconstructed point cloud 1002b is the reconstructed point cloud 1002a after adjusting the shape of a point, size of a point or a combination thereof to remove the artifact 1004.

In certain embodiments, when reconstructing a point cloud, a decoder can perform a smoothing step at boundary lines of patches in order to minimize a visible artifact. In certain embodiments, a decoder can adjust the size of the points along the boundary of a patch in order to minimize a visible artifact. In certain embodiments, a decoder can adjust the shape of the points along the boundary of a patch in order to minimize a visible artifact.

A decoder, such as decoder 550 of FIG. 5B can reconstruct a 3-D point cloud from multiple 2-D frames. When reconstructing the 3-D point cloud, each point of the reconstructed point cloud is displayed as a single pixel on a display device, such as the display 355 of the electronic device 300 of FIG. 3. For example, the ratio of a point size to a pixel on the display can be adjusted to remove an artifact at a boundary of a patch. By increasing a single point can reduce the resolution of the displayed point cloud.

To adjust a point size at a patch boundary, a decoder identifies points that are near the boundaries of the reconstructed point cloud. The decoder can then exclude points that are different than the neighboring points. For example, the decoder can identify points that are not similar to the neighboring points, based on color, texture, geometric location, and the like. The decoder can compare the points to identify any points that are dissimilar beyond a threshold level. If points are excluded, the decoder can increase the point size of points near the patch boundary to reduce the presence of any holes in the reconstructed point cloud. The encoder can include metadata that signals average point size the decoder should to use when rendering the point cloud. In certain embodiments, the decoder can change the shape of the points near the patch boundary to reduce the presence of any holes in the reconstructed point cloud. The encoder can include metadata similar to that of Table 1 to indicate the shape of one or more points. Additionally, based on the received metadata and signaling, the point size can be changed on a patch, a ROI, or a region of the point cloud.

Figure 11:
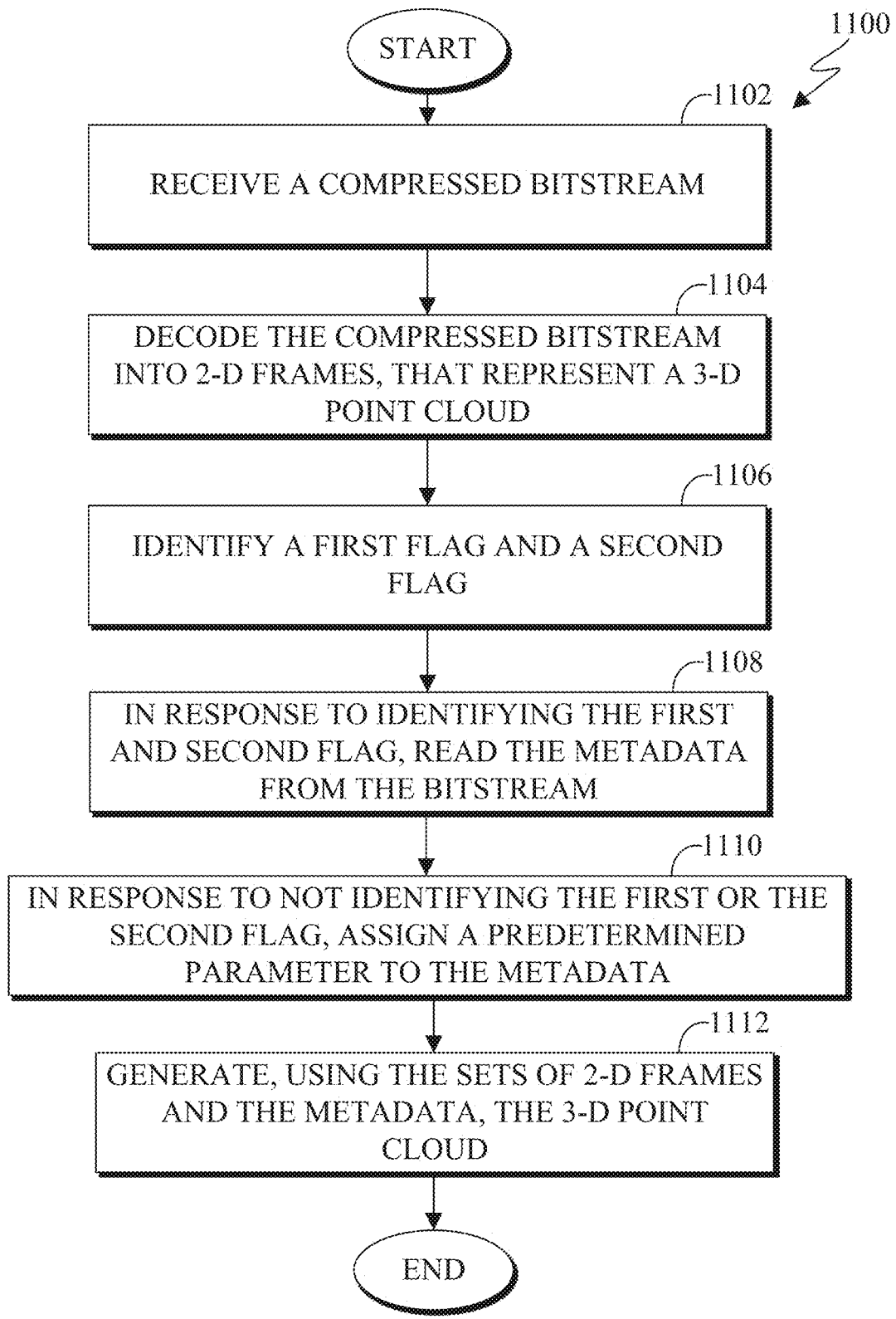
FIG. 11 illustrates an example flowchart for decoding a point cloud in accordance with an embodiment of this disclosure.

FIG. 11 illustrates an example flowchart for decoding a point cloud in accordance with an embodiment of this disclosure. FIG. 11 depicts flow chart 1100, for point cloud decoding. For example, the process depicted in FIG. 11 is described as implemented by any one of client devices 106-114 of FIG. 1, the decoder 550 of FIG. 5B, the decoder of FIG. 8B, and include internal components similar to those of the server 200 00 of FIG. 2, the electronic device 300 of FIG. 3. The embodiment of the flow chart 1100 is for illustration only and other embodiments could be used without departing from the scope of this disclosure.

The process begins with the decoder, such as decoder 550, receiving a compressed bitstream (1102). The received bitstream can include an encoded point cloud that was mapped onto multiple 2-D frames, compressed, and then transmitted and ultimately received by the decoder.

The process decodes the compressed bitstream (1104). The decoder 550 decodes the compressed bitstream into two 2-D frames that represent a 3-D point cloud. Each of the 2-D frames including a set of patches. Each patch of the set of patches including a cluster of points of the 3-D point cloud. The cluster of points corresponding to an attribute associated with the 3-D point cloud, such as geometry and texture. One patch of the set of patches, the set of patches, and the 2-D frames correspond to respective access levels that represent the 3-D point cloud.

The process then identifies metadata indicating modification of one of the respective access levels (1106). The metadata can indicate modifications of at least one of scale, resolution, point density, offset, rotation, point size, and point shape of the respective access levels that represent the 3-D point cloud.

The process can also identify a first flag and a second flag (1108). The first flag signals when metadata is applied to a first access level of the respective access levels. The first flag can be referred to as the enabling flag. The second flag indicates the metadata associated with modification of the first access level. The second flag can be referred to as the present flag. If the first flag can be included one access level above the first access level, the first flag indicates whether a portion of first access level is modified. The second flag is included, at the first access level to indicate portions of the first access level that is modified by the metadata.

When the first access level corresponds to the set of patches included within one 2-D frame, the first flag is signaled in the one 2-D frame. Similarly, when the first access level corresponds to the set of patches included within one 2-D frame the second flag is signaled at the first access level, and the second flag indicates certain patches that are modified by the metadata.

When the first access level corresponds to the one 2-D frame, the first flag is signaled at the 2-D frames. Similarly, when the first access level corresponds to the one 2-D frame, the second flag is signaled at the first access level, and the second flag indicates that the set of patches included in the one 2-D frame are modified by the metadata.

When the first access level corresponds to the 2-D frames, the first flag is signaled at a sequence of frames. Similarly, when the first access level corresponds to the 2-D frames, the second flag is signaled at the first access level, and the second flag indicates that each of the 2-D frames included in the sequence of frames are modified by the metadata.

The process can also read the metadata from the bitstream in response to identifying both the first flag and the second flag (1108). The bitstream includes the metadata that indicates a modification of an access level. For example, when the decoder identifies both flags, it indicates to the decoder that metadata exists in the bitstream that is used to modify the content within the 2-D frames when generating the 3-D point cloud.

The process can also assign a predetermined parameter to the metadata, in response to identifying the first flag or the second flag (1110). That is, if the decoder identifies only one of the two flags, a predetermined parameter is assigned to the metadata. The predetermined parameter is a default value when the access level the metadata is applied to is the top most level. For example, if the access levels include (i) patch, (ii) frame, (iii) GOF, (iv) sequence, and (v) video, the top most level is the video level. The predetermined parameter can be the metadata of the access level that is one level above the current access level. For example, the metadata that is applied to the frame level can be the metadata applied to the GOF level.

The process generates, using the sets of 2-D frames and the metadata, the 3-D point cloud (1112). The decoder can apply any received metadata to the patches when reconstructing the 3-D point cloud. In certain embodiments, if metadata is identified with the patches, the decoder 550 identifies whether the metadata is a scaling factor. In response to identifying that the metadata is a scaling factor, the decoder 550 applies an inverse of the scaling factor to each point of the 3-D point cloud to increase resolution of the set of 2-D frames.

In certain embodiments, if the decoder 550 receives two bitstreams of different resolutions, where one resolution is lower than the other. The decoder can, decode both bitstreams. The decoder 550 can identify whether the metadata includes a scale factor and an offset. Thereafter, the decoder applies the scale factor, the offset, and the patches included in the bitstream of the higher resolution.

The decoder can also identify points included in the set of patches that are located at a boundary of each patch, based on a generated occupancy map. Thereafter the decoder 550 can adjust at least one of a size of the points that are located at the boundary of each patch, and a shape of the points that are located at the boundary of each patch, based on the metadata.

Figure 12:
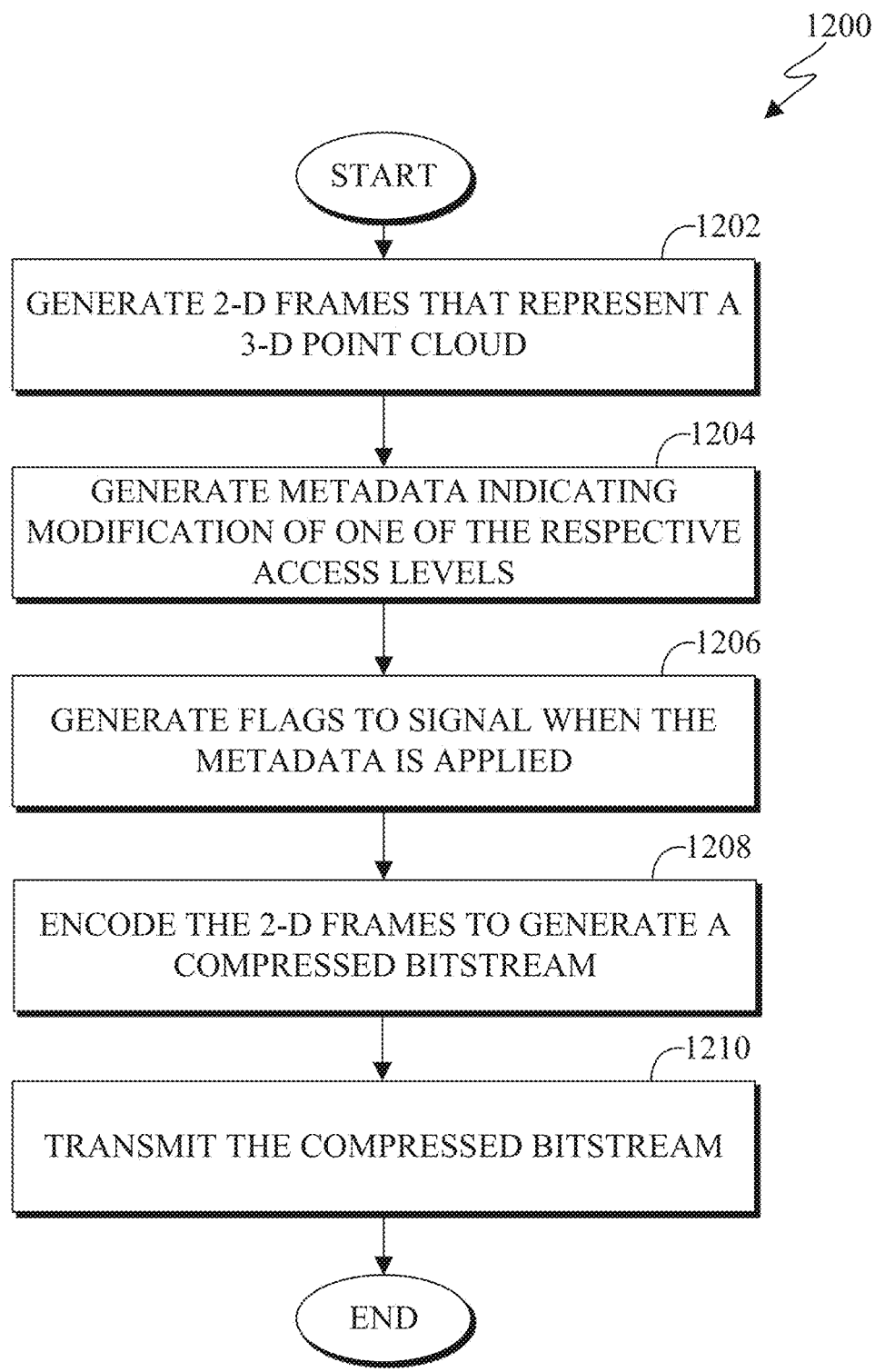
FIG. 12 illustrates an example flowchart for encoding a point cloud in accordance with an embodiment of this disclosure.

FIG. 12 illustrates an example flowchart for encoding a point cloud in accordance with an embodiment of this disclosure. FIG. 12 depicts flow chart 1200 for point cloud encoding. For example, the process depicted in FIG. 12 is described as implemented by the server 104 of FIG. 1, any one of client devices 106-114 of FIG. 1, the encoder 500 of FIG. 5A, and include internal components similar to those of the server 200 00 of FIG. 2, the electronic device 300 of FIG. 3. The embodiment of the flow chart 1200 is for illustration only and other embodiments could be used without departing from the scope of this disclosure.

The process beings with an encoder, such as the encoder 500 of FIG. 5A, generating 2-D frames that represent a 3-D point cloud (1202). Each of the 2-D frames including a set of patches. Each patch of the set of patches including a cluster of points of the 3-D point cloud. The cluster of points corresponds to an attribute associated with the 3-D point cloud. One patch of the set of patches, the set of patches, and the 2-D frames correspond to respective access levels that represent the 3-D point cloud.

In certain embodiments, the 2-D frames include a first set of 2-D frames and a second set of 2-D frames. When second set of 2-D frames are generated, the encoder 500 applies a scaling to each point of the 3-D point cloud to decrease resolution of the second set of 2-D frames as compared to the first set of 2-D frames. The encoder 500 up-samples the second set of 2-D frames to match a dimensional size of the first set of 2-D frames. The encoder then compares the first set of 2-D frames with the up-sampled second set of 2-D frames. After comparing the first set of 2-D frames with the up-sampled second set of 2-D frames, the encoder 500 extracts a difference of points between the first set of 2-D frames and the up-sampled second set of 2-D frames.

In certain embodiments, when the encoder 500 is generating the 2-D frames the encoder 500 identifies points included in the set of patches that are located at a boundary of each patch, based on a generated occupancy map. The encoder 500 then generate metadata to adjust at least one of a size of the points that are located at the boundary of each patch, and a shape of the points that are located at the boundary of each patch.

The process generates metadata indicating modification of one of the respective access levels. (1204). The metadata indicates modification of at least one of scale, resolution, point density, offset, rotation, point size, and point shape of the respective access levels that represent the 3-D point cloud.

The process generates flags to signal when the metadata is applied to a first access level of the respective access levels (1206). In certain embodiments, the flags include a first flag and a second flag. For example, the first flag is the enabling flag, and the second flag is the present flag. The first flag can signal when the metadata is applied to a first access level, and the second flag indicates the metadata associated with the modification of the first access level. To signal when the metadata is applied to the first access level, the encoder 500, includes the first flag one access level above the first access level, the first flag indicates whether a portion of first access level is modified. The decoder also includes the second flag, at the first access level to indicate portions of the first access level that is modified by the metadata.

When the first access level corresponds to the set of patches included within one 2-D frame, the first flag is signaled in the one 2-D frame. Similarly, the first access level corresponds to the set of patches included within one 2-D frame, the second flag is signaled at the first access level, and the second flag indicates certain patches that are modified by the metadata.

When the first access level corresponds to the one 2-D frame, the first flag is signaled at the 2-D frames, the second flag is signaled at the first access level. Similarly, when the first access level corresponds to the one 2-D frame, the first flag is signaled at the 2-D frames, the second flag indicates that the set of patches included in the one 2-D frame are modified by the metadata.

When the first access level corresponds to the 2-D frames, the first flag is signaled at a sequence of frames. Similarly, when the first access level corresponds to the 2-D frames the second flag is signaled at the first access level, and the second flag indicates that each of the 2-D frames included in the sequence of frames are modified by the metadata.

The process encodes the 2-D frames, the flags, and the metadata to generate a compressed bitstream (1208). The process transmits the compressed bitstream (1210). The compressed bitstream can be ultimately transmitted to a decoder, such as the decoder 550.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
a communication interface configured to receive a compressed bitstream; and
a processor operably coupled to the communication interface, wherein the processor is configured to:
decode the compressed bitstream into two-dimensional (2-D) frames, that represent a three-dimensional (3-D) point cloud, each of the 2-D frames including a set of patches, each patch of the set of patches including a cluster of points of the 3-D point cloud, the cluster of points corresponding to an attribute associated with the 3-D point cloud, wherein one patch of the set of patches, the set of patches, and the 2-D frames correspond to respective access levels that represent the 3-D point cloud,
identify whether a first flag, that signals when modification of metadata applied to a first access level of the respective access levels is enabled, is included in the compressed bitstream and set to true,
identify whether a second flag, indicating a presence of the metadata associated with modification of the first access level of the respective access levels, is included in the compressed bitstream and set to true,
in response to identifying the first flag and the second flag are included in the compressed bitstream and set to true, read the metadata from the compressed bitstream,
in response to identifying at least one of the first flag or the second flag are either not included in the compressed bitstream or set to false, assign a predetermined parameter to the metadata, and
generate, based on the metadata and using the 2-D frames, the 3-D point cloud.

2. The decoding device of claim 1, wherein:
when the first flag is included in the first access level and the first access level is tiered above any of the respective access levels, the first flag indicates whether the modification of the metadata applied to the first access level or a portion of the first access level is enabled,
when the first flag is included one access level above the first access level, the first flag indicates whether the modification of the metadata applied to the first access level or a portion of the first access level is enabled,
when the second flag is included at the first access level, the second flag indicates the presence of the metadata associated with the modification of the first access level or portions of the first access level, and
to generate the 3-D point cloud, the processor is configured to apply the metadata to at least one of the respective access levels that is at the first access level and lower.

3. The decoding device of claim 1, wherein:
when the first access level corresponds to one patch of the set of patches included within one 2-D frame, the first flag is signaled in a frame access level associated with the 2-D frames, the second flag is signaled at a patch access level associated with the one patch, and the second flag indicates the presence of the metadata associated with modification of the cluster of points as included in the one patch;
when the first access level corresponds to one set of 2-D frames within a group of frames, the first flag is signaled at a group of frames access level, the second flag is signaled at the frame access level, and the second flag indicates the presence of the metadata associated with the modification of the cluster of points included in each of the one set of 2-D frames included in the group of frames; and
when the first access level corresponds to one group of frames within a sequence of the 3-D point cloud, the first flag is signaled at a sequence access level, the second flag is signaled at the group of frames access level, and the second flag indicates the presence of the metadata associated with the modification of the cluster of points included in each of the one group of frames included in the sequence of the 3-D point cloud.

4. The decoding device of claim 1, wherein the processor is further configured to:
identify whether the metadata is a scaling factor; and
in response to identifying that the metadata is a scaling factor, apply an inverse of the scaling factor to each point of the 3-D point cloud to modify resolution of the 2-D frames.

5. The decoding device of claim 1, wherein:
the 2-D frames are a first resolution, and
to generate the 3-D point cloud, the processor is further configured to:
decode, the compressed bitstream into the 2-D frames and an enhanced layer, the enhanced layer represents an extracted difference between a second resolution version of the 3-D point cloud and the 2-D frames, and the first resolution is lower than the second resolution;
identify whether the metadata includes a scale factor and an offset; and
apply the scale factor, the offset, and the enhanced layer to the 2-D frames generate the 3-D point cloud.

6. The decoding device of claim 1, wherein the processor is further configured to:
identify points included in the set of patches that are located at a boundary of each patch, based on a generated occupancy map; and
adjust at least one of a size of the points that are located at the boundary of each patch, and a shape of the points that are located at the boundary of each patch, based on the metadata.

7. The decoding device of claim 1, wherein the metadata indicates modification of at least one of scale, resolution, point density, offset, rotation, point size, and point shape of the respective access levels that represent the 3-D point cloud.

8. An encoding device for point cloud encoding, the encoding device comprising:
a processor configured to:
generate two-dimensional (2-D) frames that represent a three-dimensional (3-D) point cloud, each of the 2-D frames including a set of patches, each patch of the set of patches including a cluster of points of the 3-D point cloud, the cluster of points corresponding to an attribute associated with the 3-D point cloud, wherein one patch of the set of patches, the set of patches, and the 2-D frames correspond to respective access levels that represent the 3-D point cloud, generate metadata indicating modification of one of the respective access levels, generate a first flag that signals when modification of the metadata applied to a first access level of the respective access levels is enabled, generate a second flag indicating a presence of the metadata associated with modification of the first access level of the respective access levels, encode the 2-D frames, the first flag, the second flag, and the metadata to generate a compressed bitstream, and a communication interface operably coupled to the processor, the communication interface configured to transmit the compressed bitstream.

9. The encoding device of claim 8, wherein the processor is further configured to:

when the metadata is signaled by at least one of the first flag or the second flag, assign the metadata to at least one of the respective access levels that is at the first access level or lower; when the first flag is included in the first access level and the first access level is tiered above any of the respective access levels, the first flag indicates whether the modification of the metadata applied to the first access level or a portion of the first access level is enabled;

when the first flag is included one access level above the first access level, the first flag indicates whether the modification of the metadata applied to the first access level or a portion of the first access level is enabled; and when the second flag is included at the first access level, the second flag indicates the presence of the metadata associated with the modification of the first access level or portions of the first access level.

10. The encoding device of claim 8, wherein:

when the first access level corresponds to one patch of the set of patches included within one 2-D frame, the first flag is signaled in a frame access level associated with the 2-D frames, the second flag is signaled at a patch access level that is associated with the one patch, and the second flag indicates the presence of the metadata associated with modification of the cluster of points as included in the one patch;

when the first access level corresponds to one set of 2-D frames within a group of frames, the first flag is signaled at a group of frames access level, the second flag is signaled at the frame access level, and the second flag indicates the presence of the metadata associated with the modification of the cluster of points included in each of the one set of 2-D frames included in the group of frames; and when the first access level corresponds to one group of frames within a sequence of the 3-D point cloud, the first flag is signaled at a sequence access level, the second flag is signaled at the group of frames access level, and the second flag indicates the presence of the metadata associated with the modification of the cluster of points included in each of the one group of frames included in the sequence of the 3-D point cloud.

11. The encoding device of claim 8, wherein:

the 2-D frames are a first set of 2-D frames;
the metadata is a scaling factor; and
the processor is further configured to:
generate a second set of 2-D frames that represent the 3-D point cloud, each of the second set of 2-D frames include patches, each patch of the patches including the cluster of points of the 3-D point cloud, while generating the second set of 2-D frames, apply the scaling factor to each point of the 3-D point cloud to decrease resolution of the second set of 2-D frames as compared to the first set of 2-D frames, and encode the first set of 2-D frames and the second set of 2-D frames to generate the compressed bitstream.

12. The encoding device of claim 11, wherein to encode the first set of 2-D frames and the second set of 2-D frames to generate the compressed bitstream, the processor is further configured to:

up-sample the second set of 2-D frames to match a dimensional size of the first set of 2-D frames;

compare the first set of 2-D frames with the up-sampled second set of 2-D frames to extract a difference of points between the first set of 2-D frames and the up-sampled second set of 2-D frames; and encode the second set of 2-D frames as a base layer bitstream and encode the extracted differences as an enhanced layer bitstream to generate two compressed bitstreams.

13. The encoding device of claim 8, wherein the processor is further configured to:

identify points included in the set of patches that are located at a boundary of each patch, based on a generated occupancy map; and generate the metadata to adjust at least one of a size of the points that are located at the boundary of each patch, and a shape of the points that are located at the boundary of each patch.

14. The encoding device of claim 8, the metadata indicates modification of at least one of scale, resolution, point density, offset, rotation, point size, and point shape of the respective access levels that represent the 3-D point cloud.

15. A method for point cloud decoding, the method comprising:

receiving a compressed bitstream;

decoding the compressed bitstream into two-dimensional (2-D) frames, that represent a three-dimensional (3-D) point cloud, each of the 2-D frames including a set of patches, each patch of the set of patches including a cluster of points of the 3-D point cloud, the cluster of points corresponding to an attribute associated with the 3-D point cloud, wherein one patch of the set of patches, the set of patches, and the 2-D frames correspond to respective access levels that represent the 3-D point cloud;

identifying whether a first flag, that signals when modification of metadata applied to a first access level of the respective access levels is enabled, is included in the compressed bitstream and set to true;

identifying whether a second flag, indicating a presence of the metadata associated with modification of the first access level of the respective access levels, is included in the compressed bitstream and set to true;

in response to identifying the first flag and the second flag are included in the compressed bitstream and set to true, reading the metadata from the compressed bitstream;

in response to identifying at least one the first flag or the second flag are either not included in the compressed bitstream or set to false, assigning a predetermined parameter to the metadata; and generating, based on the metadata and using the 2-D frames, the 3-D point cloud.

16. The method of claim 15, wherein:

when the first flag is included in the first access level and the first access level is tiered above any of the respective access levels, the first flag indicates whether the modification of the metadata applied to the first access level or a portion of the first access level is enabled, when the first flag is included one access level above the first access level, the first flag indicates whether the modification of the metadata applied to the first access level or a portion of the first access level is enabled, when the second flag is included at the first access level, the second flag indicates the presence of the metadata associated with the modification of the first access level or portions of the first access level, and generating the 3-D point cloud further comprises, applying the metadata to at least one of the respective access levels that is at the first access level and lower.

17. The method of claim 15, wherein:

when the first access level corresponds to one patch of the set of patches included within one 2-D frame, the first flag is signaled in a frame access level associated with the 2-D frames, the second flag is signaled at a patch access level associated with the one patch, and the second flag indicates the presence of the metadata associated with modification of the cluster of points as included in the one patch;

when the first access level corresponds to one set of 2-D frames within a group of frames, the first flag is signaled at a group of frames access level, the second flag is signaled at the frame access level, and the second flag indicates the presence of the metadata associated with the modification of the cluster of points included in each of the one set of 2-D frames included in the group of frames; and when the first access level corresponds to one group of frames within a sequence of the 3-D point cloud, the first flag is signaled at a sequence access level, the second flag is signaled at the group of frames access level, and the second flag indicates the presence of the metadata associated with the modification of the cluster of points included in each of the one group of frames included in the sequence of the 3-D point cloud.

18. The method of claim 15, wherein, the 2-D frames are a first set of 2-D frames and the method further comprises:

decoding a second set of 2-D frames that represent the 3-D point cloud, each of the second set of 2-D frames include patches, each patch of the patches including the cluster of points of the 3-D point cloud;

identifying whether the metadata is a scaling factor; and in response to identifying that the metadata is a scaling factor, applying an inverse of the scaling factor to each point of the 3-D point cloud to modify resolution of the second set of 2-D frames.

19. The method of claim 15, wherein:

2-D frames are a first resolution; and generating the 3-D point cloud comprises:

decoding, the compressed bitstream into the 2-D frames and an enhanced layer, the enhanced layer represents an extracted difference between a second resolution version of the 3-D point cloud and the 2-D frames, and the first resolution is lower than the second resolution, identifying whether the metadata includes a scale factor and an offset, and applying the scale factor, the offset, and the enhanced layer to the 2-D frames generate the 3-D point cloud.

20. The method of claim 15, further comprising:

identifying points included in the set of patches that are located at a boundary of each patch, based on a generated occupancy map; and adjusting at least one of a size of the points that are located at the boundary of each patch, and a shape of the points that are located at the boundary of each patch, based on the metadata.

* * * * *